United States Patent [19]
Kojima et al.

[11] Patent Number: 4,983,027
[45] Date of Patent: Jan. 8, 1991

[54] COMPACT ZOOM LENS SYSTEM WITH A HIGH ZOOM RATIO

[75] Inventors: Ayako Kojima; Hisayuki Masumoto, both of Osaka, Japan

[73] Assignee: Minolta Camera Kabushiki Kaisha, Osaka, Japan

[21] Appl. No.: 331,627

[22] Filed: Mar. 30, 1989

[30] Foreign Application Priority Data

| Mar. 31, 1988 | [JP] | Japan | 63-80148 |
| Mar. 31, 1988 | [JP] | Japan | 63-80149 |
| Jun. 14, 1988 | [JP] | Japan | 63-147536 |
| Jul. 5, 1988 | [JP] | Japan | 63-168132 |
| Jul. 5, 1988 | [JP] | Japan | 63-168133 |

[51] Int. Cl.$^5$ .................. G02B 15/14; G02B 13/18
[52] U.S. Cl. .................................. 350/427; 350/432
[58] Field of Search .............. 350/423, 427, 432–435

[56] References Cited

U.S. PATENT DOCUMENTS

| 4,773,744 | 9/1988 | Yamanashi | 350/432 X |
| 4,822,152 | 4/1989 | Yamanashi | 350/427 |
| 4,854,682 | 8/1989 | Yamanashi | 350/427 |

FOREIGN PATENT DOCUMENTS 1204013  8/1989  Japan.

Primary Examiner—Scott J. Sugarman
Attorney, Agent, or Firm—Price, Gess & Ubell

[57] ABSTRACT

A compact zoom lens system with a high zoom ratio is provided which comprises from the object side to the image side, a first lens unit of a positive refractive power, a second lens unit of a positive refractive power with a first variable air space formed between the first and second lens units, and a third lens unit of a negative refractive power, wherein the first lens unit and the third lens units are shiftable from the image side to the object side and the second lens unit is shiftable so that the first variable air space increases and the second variable air space decreses in the zooming operation from the shortest focal length to the longest focal length, wherein the second or third lens units includes at least an aspherical surface, and wherein the second or third lens units are shiftable in the focusing operation. Further, a diaphragm is located at the image side or the object side of the second lens element.

38 Claims, 42 Drawing Sheets

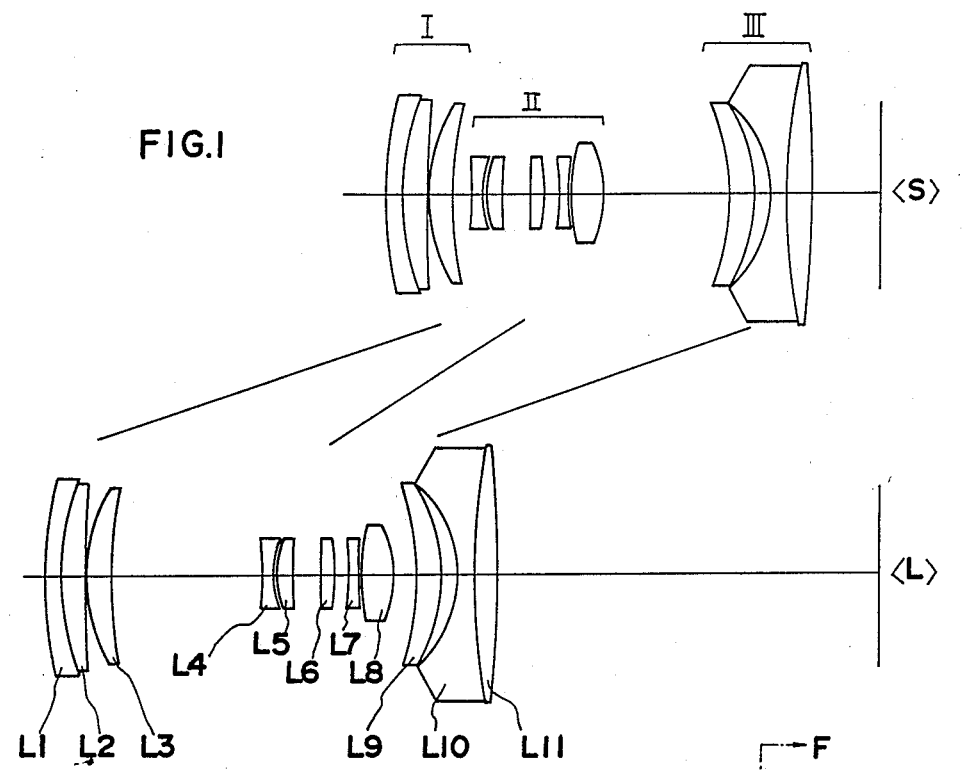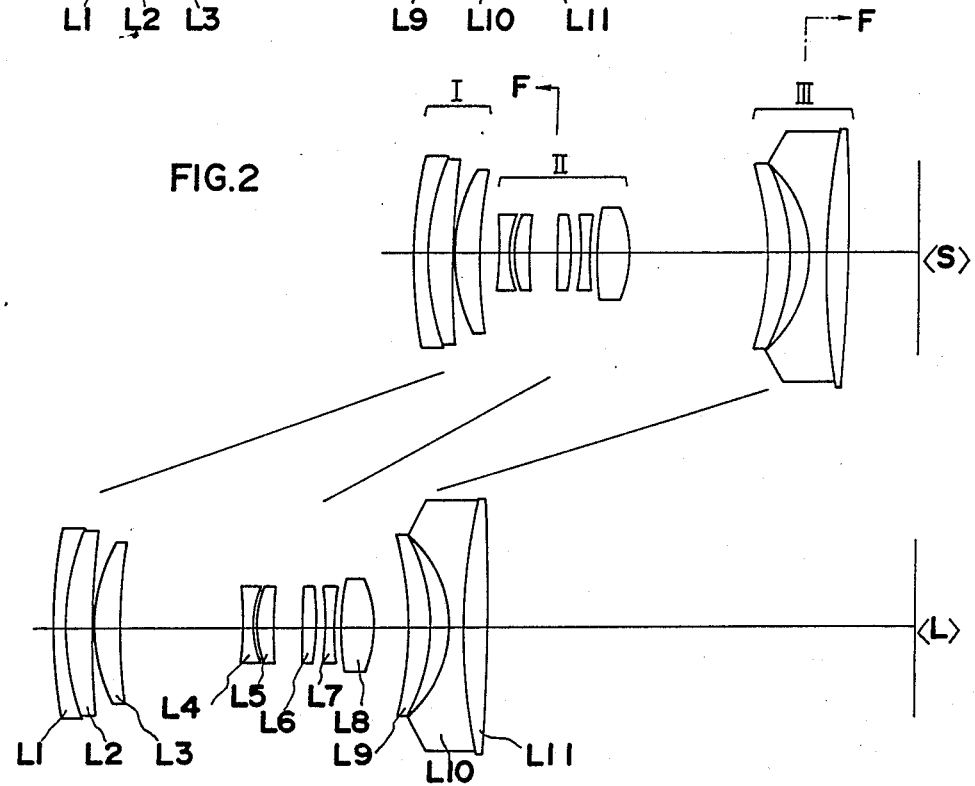

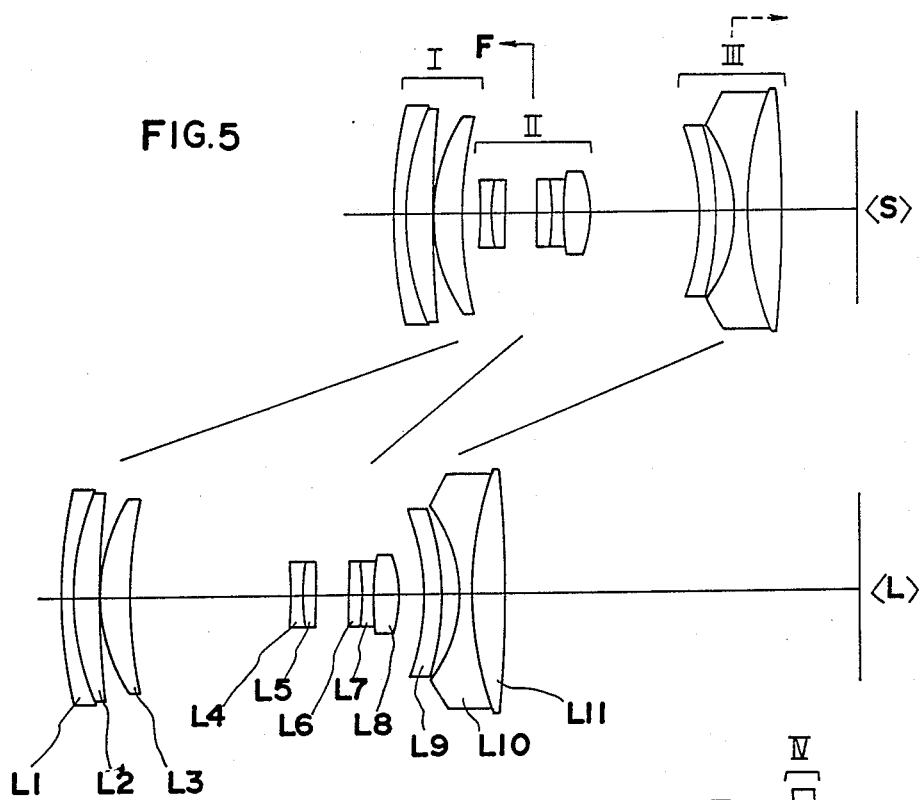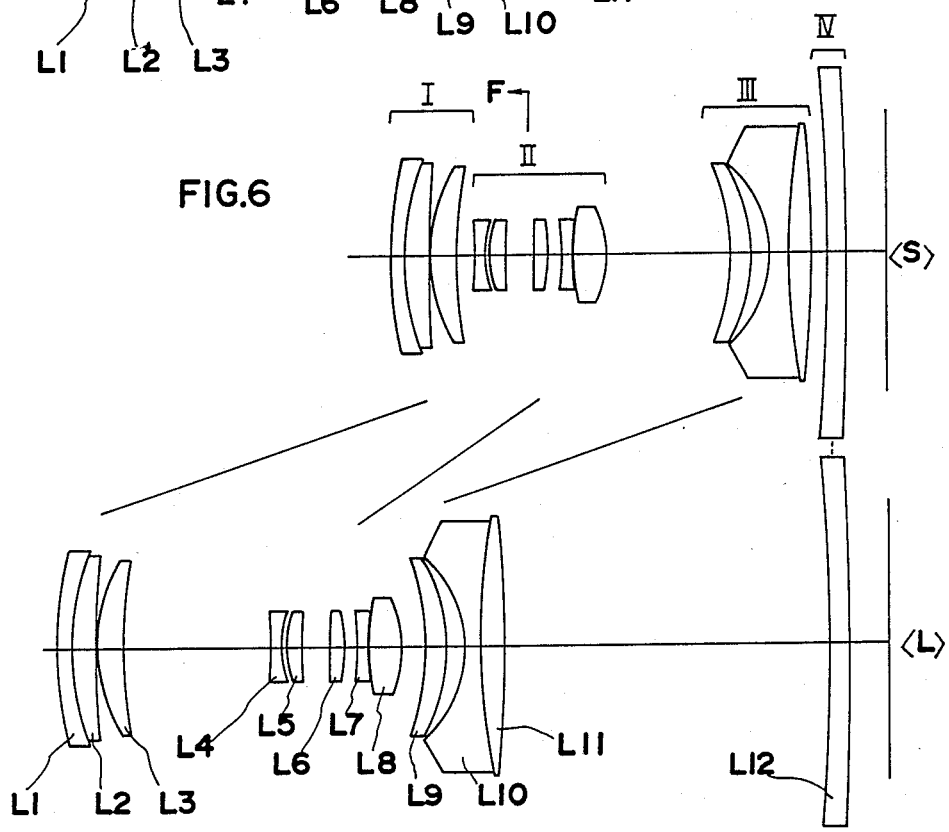

f=36 ⟨S⟩
F/4.6
—— d
---- SC
spherical aberration
sine condition

Y'=21.6
---- DM
—— DS
astigmatism

Y'=21.6
distortion f=60 ⟨M⟩
F/6.5
—— d
---- SC
spherical aberration
sine condition Y'=21.6
---- DM
—— DS
astigmatism Y'=21.6
distortion f=100 ⟨L⟩
F/8.2
—— d
---- SC
spherical aberration
sine condition Y'=21.6
---- DM
—— DS
astigmatism Y'=21.6
distortion

FIG.21a
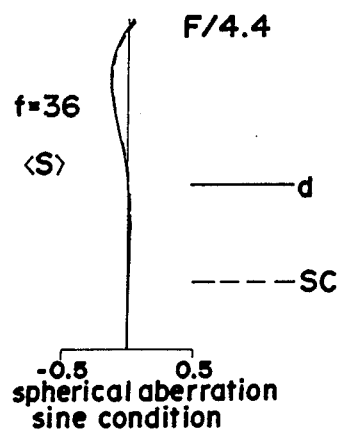
f=36
⟨S⟩
F/4.4
—— d
---- SC
spherical aberration
sine condition
FIG.21b
Y'=21.6
---- DM
—— DS
astigmatism
FIG.21c
Y'=21.6
distortion
FIG.22a
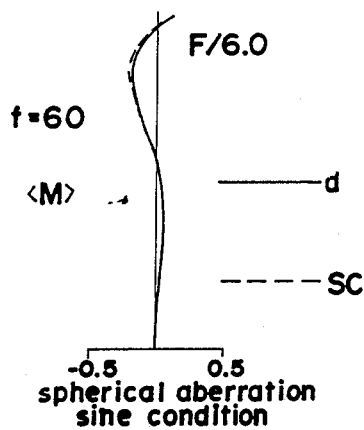
f=60
⟨M⟩
F/6.0
—— d
---- SC
spherical aberration
sine condition
FIG.22b
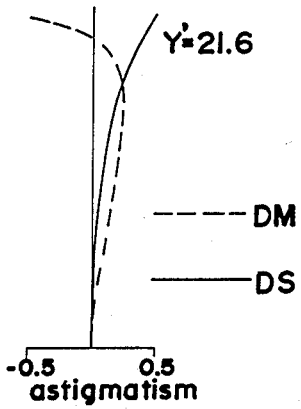
Y'=21.6
---- DM
—— DS
astigmatism
FIG.22c
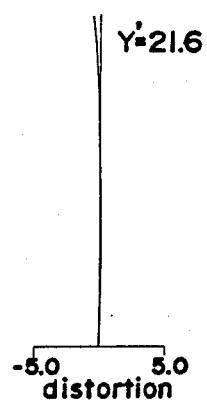
Y'=21.6
distortion
FIG.23a
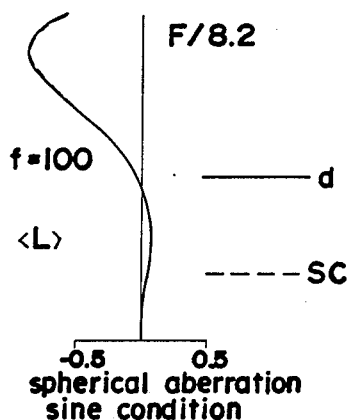
f=100
⟨L⟩
F/8.2
—— d
---- SC
spherical aberration
sine condition
FIG.23b
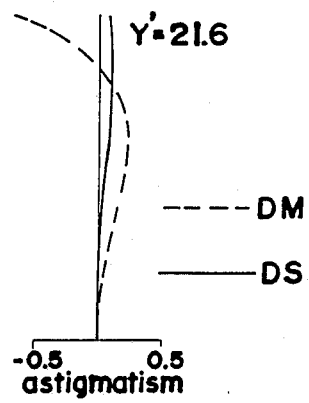
Y'=21.6
---- DM
—— DS
astigmatism
FIG.23c
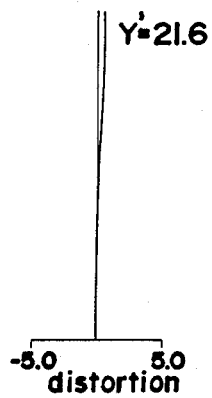
Y'=21.6
distortion F/4.9
f=37
⟨S⟩
—— d
---- SC
spherical aberration
sine condition Y'=21.6
---- DM
—— DS
astigmatism Y'=21.6
distortion F/2.5
f=63
⟨M⟩
—— d
---- SC
spherical aberration
sine condition Y'=21.6
---- DM
—— DS
astigmatism Y'=21.6
distortion F/8.2
f=100
⟨L⟩
—— d
---- SC
spherical aberration
sine condition Y'=21.6
---- DM
—— DS
astigmatism Y'=21.6
distortion F/4.5, f=37, ⟨S⟩
—— d
---- SC
spherical aberration sine condition Y'=21.6
---- DM
—— DS
astigmatism Y'=21.6
distortion F/6.1, f=60, ⟨M⟩
—— d
---- SC
spherical aberration sine condition Y'=21.6
---- DM
—— DS
astigmatism Y'=21.6
distortion F/8.2, f=98, ⟨L⟩
—— d
---- SC
spherical aberration sine condition Y'=21.6
---- DM
—— DS
astigmatism Y'=21.6
distortion f=36.2 ⟨S⟩
F/4.10
—— d
---- SC
spherical aberration sine condition Y'=21.63
---- DM
—— DS
astigmatism Y'=21.63
distortion f=60 ⟨M⟩
F/5.82
—— d
---- SC
spherical aberration sine condition Y'=21.63
---- DM
—— DS
astigmatism Y'=21.63
distortion f=102 ⟨L⟩
F/6.90
—— d
---- SC
spherical aberration sine condition Y'=21.63
---- DM
—— DS
astigmatism Y'=21.63
distortion

FIG.54a
FIG.54b
FIG.54c
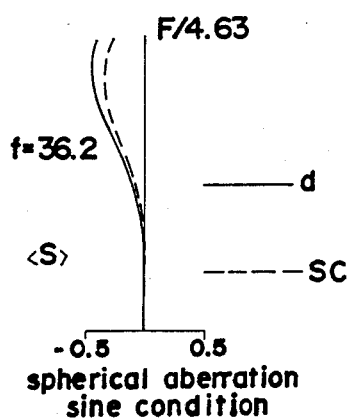
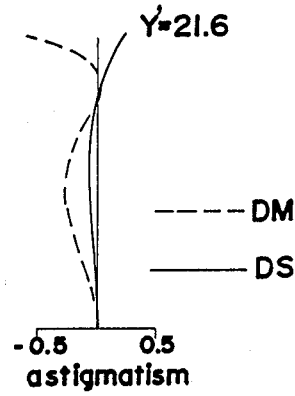
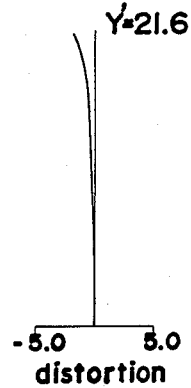
FIG.55a
FIG.55b
FIG.55c
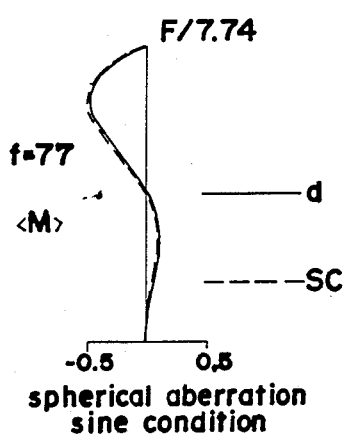
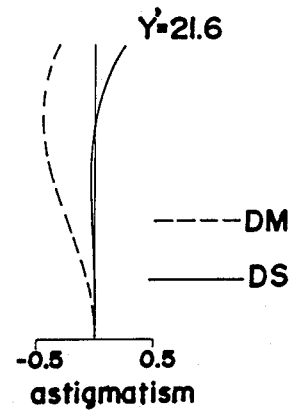
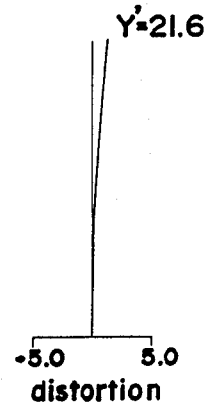
FIG.56a
FIG.56b
FIG.56c
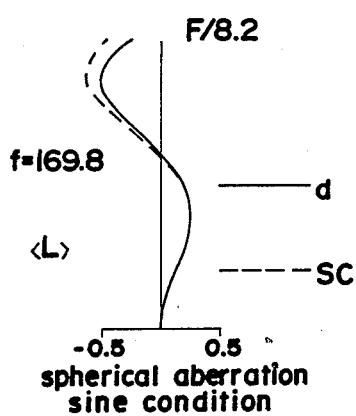
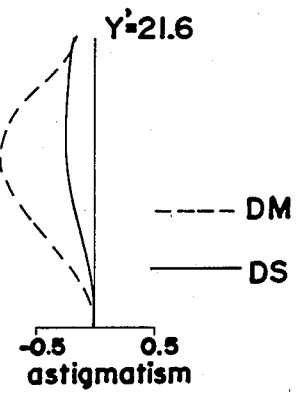
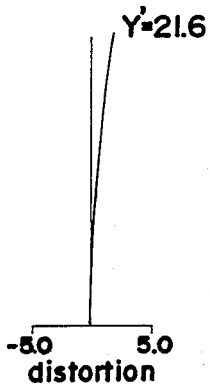

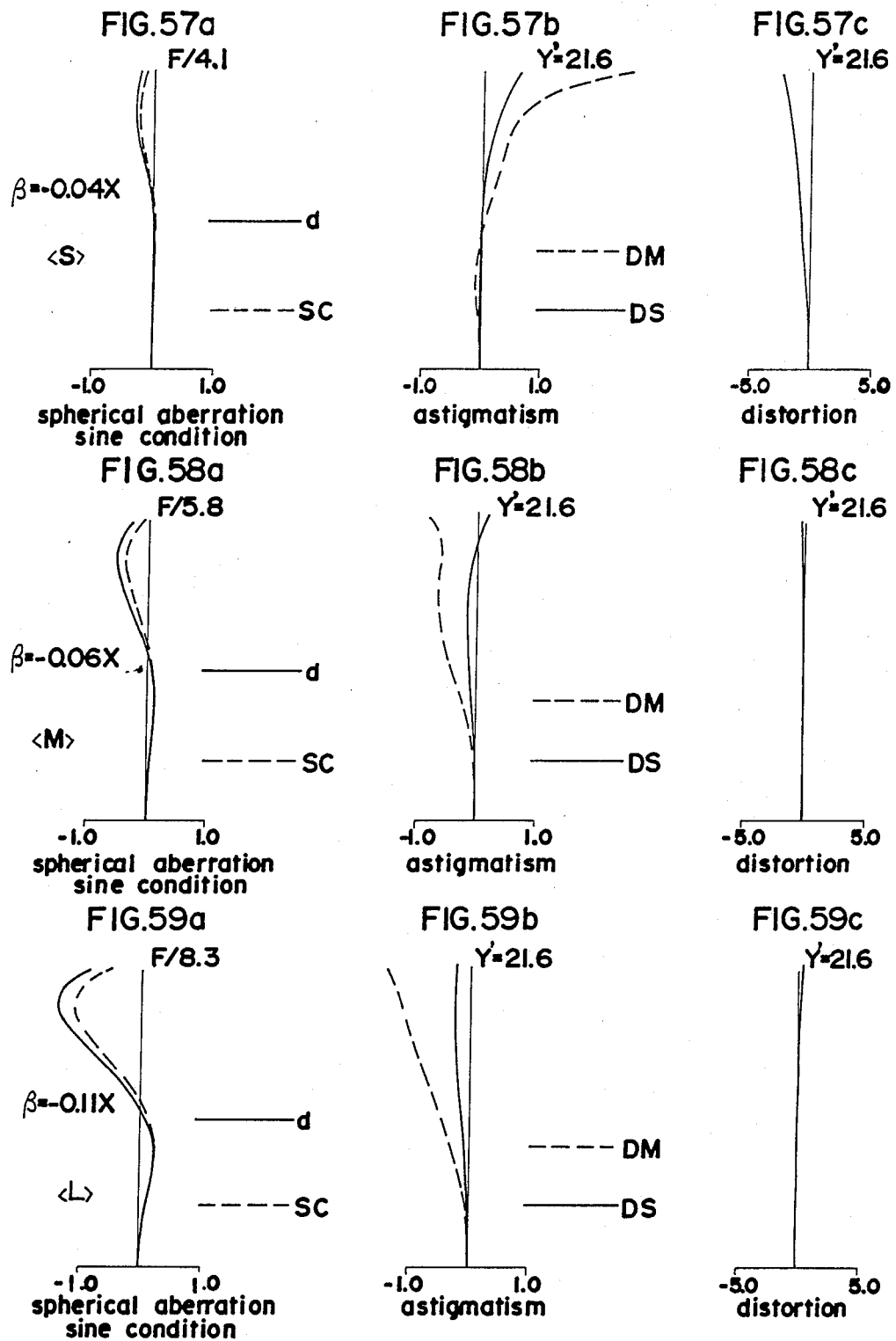

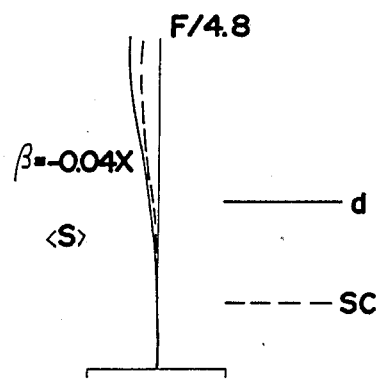
FIG.60a
F/4.8
β=-0.04X
⟨S⟩
—— d
----- SC
-1.0  1.0
spherical aberration
sine condition
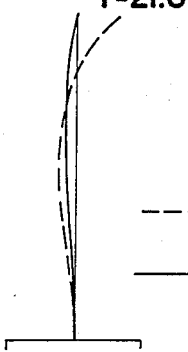
FIG.60b
Y'=21.6
----- DM
—— DS
-1.0  1.0
astigmatism
FIG.60c
Y'=21.6
-5.0  5.0
distortion
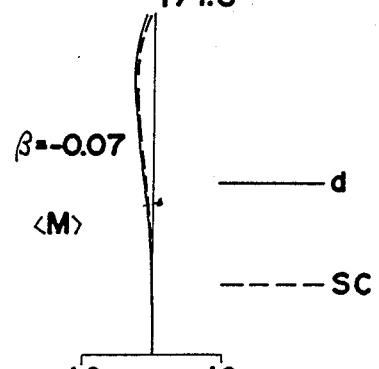
FIG.61a
F/7.6
β=-0.07
⟨M⟩
—— d
----- SC
-1.0  1.0
spherical aberration
sine condition
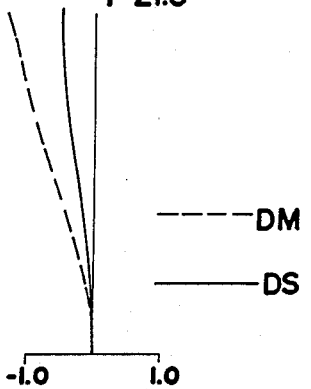
FIG.61b
Y'=21.6
----- DM
—— DS
-1.0  1.0
astigmatism
FIG.61c
Y'=21.6
-5.0  5.0
distortion
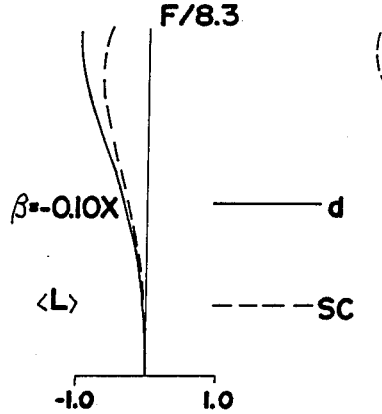
FIG.62a
F/8.3
β=-0.10X
⟨L⟩
—— d
----- SC
-1.0  1.0
spherical aberration
sine condition
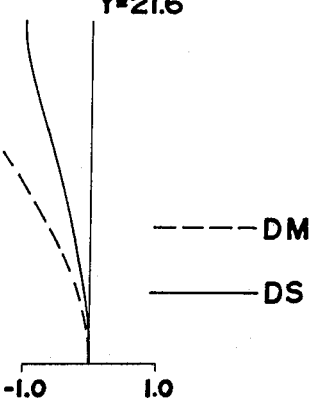
FIG.62b
Y'=21.6
----- DM
—— DS
-1.0  1.0
astigmatism
FIG.62c
Y'=21.6
-5.0  5.0
distortion

FIG.66a
FIG.66b
FIG.66c
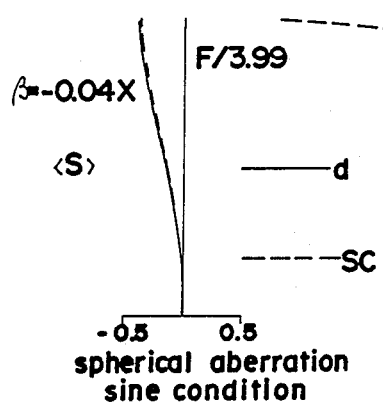
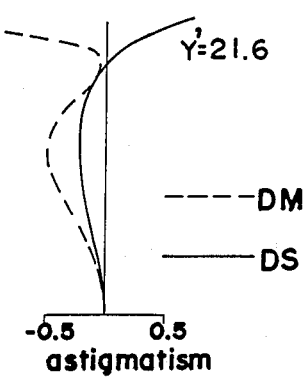
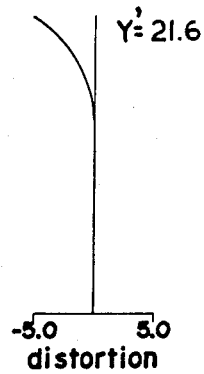
FIG.67a
FIG.67b
FIG.67c
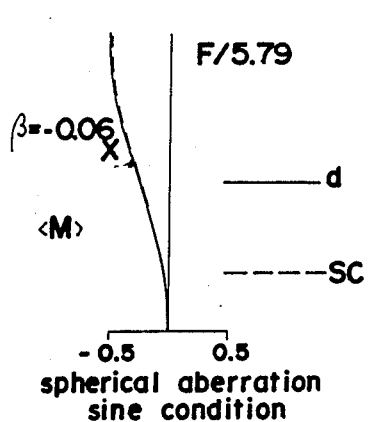
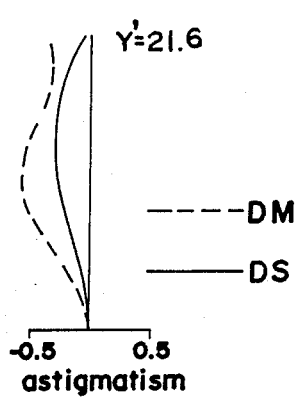
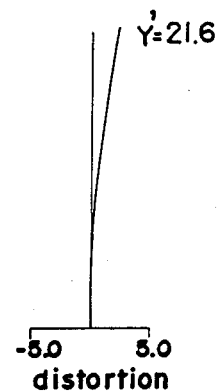
FIG.68a
FIG.68b
FIG.68c
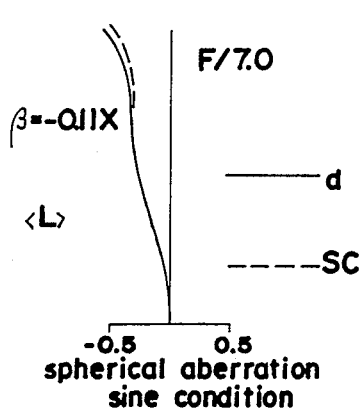
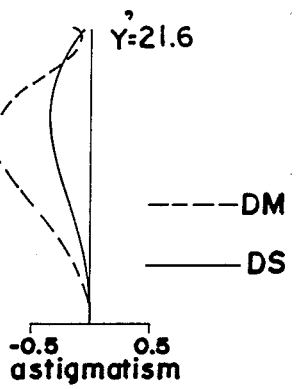
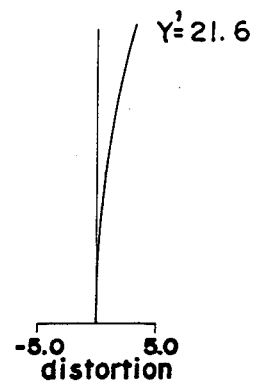

spherical aberration
sine condition astigmatism distortion spherical aberration
sine condition astigmatism distortion spherical aberration
sine condition astigmatism distortion F/4.01
β=-0.03X
⟨S⟩
——— d
----- SC
-0.5    0.5
spherical aberration
sine condition Y'=21.6
----- DM
——— DS
-0.5    0.5
astigmatism Y'=21.6
-5.0    5.0
distortion F/6.15
β=-0.06X
⟨M⟩
——— d
----- SC
-0.5    0.5
spherical aberration
sine condition Y'=21.6
----- DM
——— DS
-0.5    0.5
astigmatism Y'=21.6
-5.0    5.0
distortion F/8.06
β=-0.10X
⟨L⟩
——— d
----- SC
-0.5    0.5
spherical aberration
sine condition Y'=21.6
----- DM
——— DS
-0.5    0.5
astigmatism Y'=21.6
-5.0    5.0
distortion

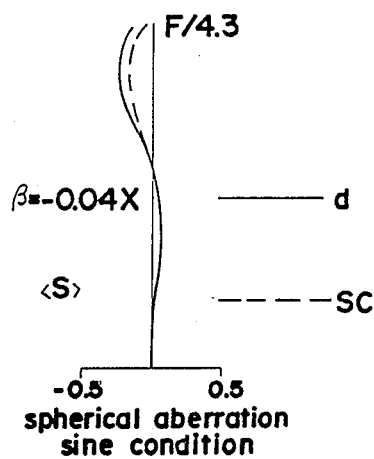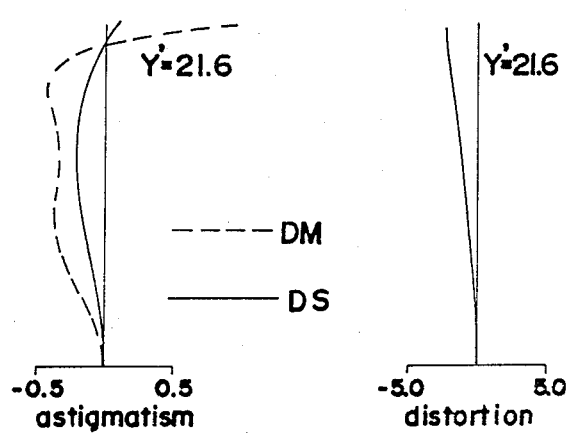
FIG.78a  FIG.78b  FIG.78c
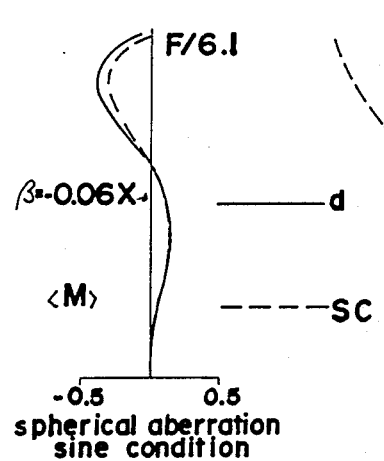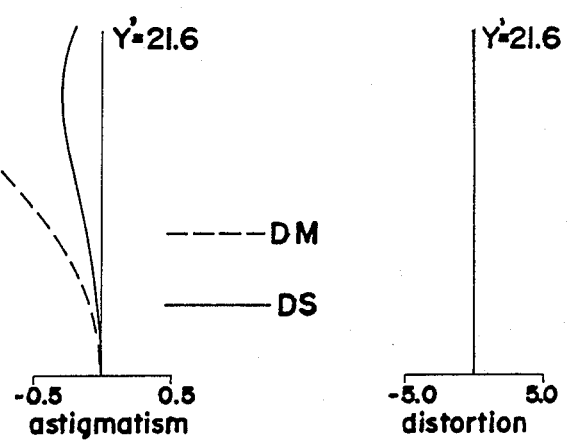
FIG.79a  FIG.79b  FIG.79c
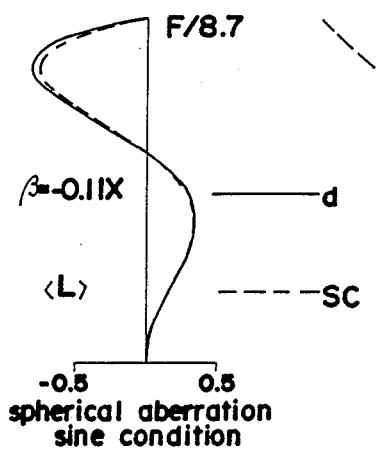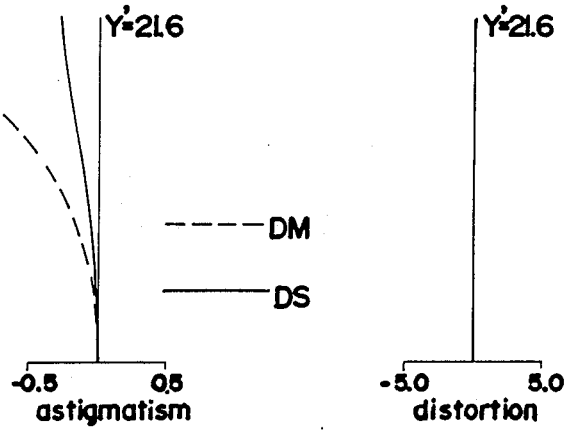
FIG.80a  FIG.80b  FIG.80c

FIG.90a
FIG.90b
FIG.90c
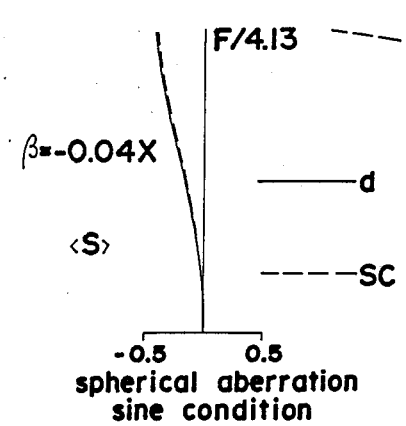
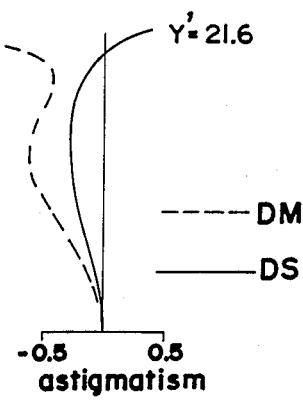
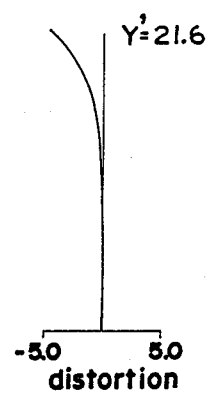
FIG.91a
FIG.91b
FIG.91c
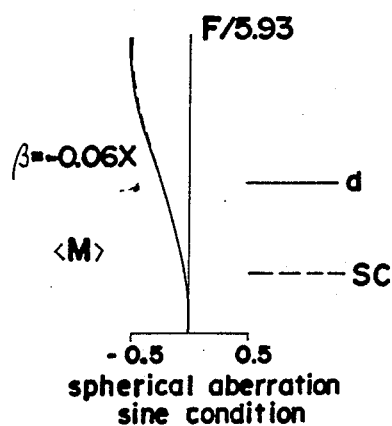
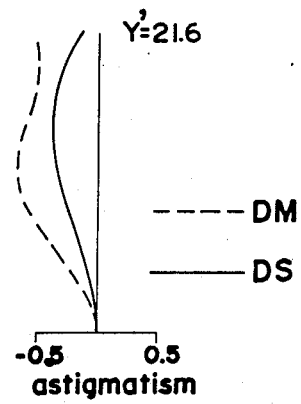
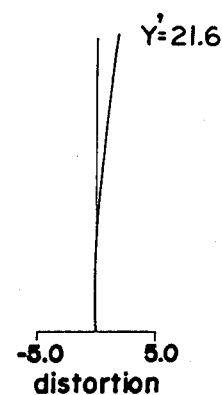
FIG.92a
FIG.92b
FIG.92c
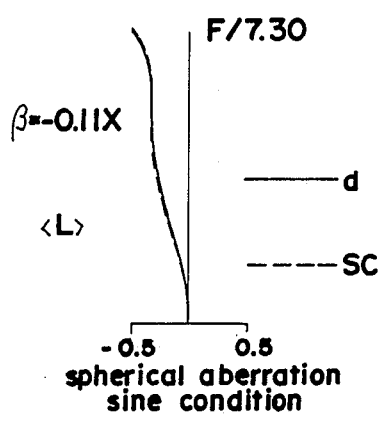
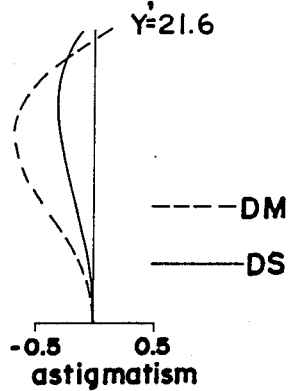
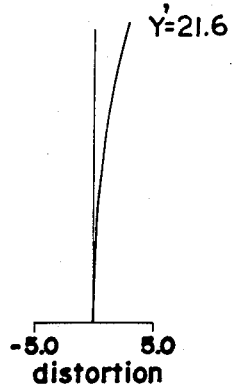

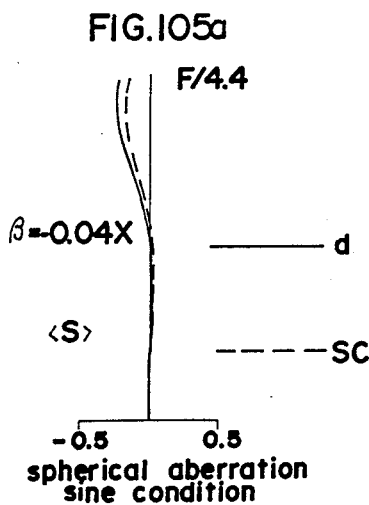 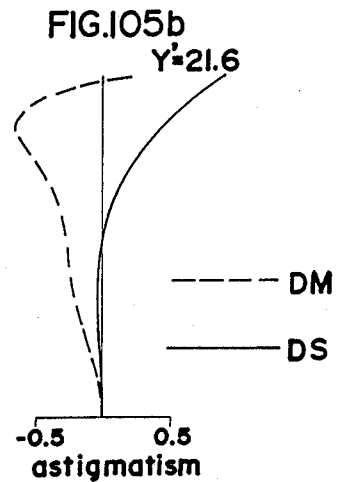 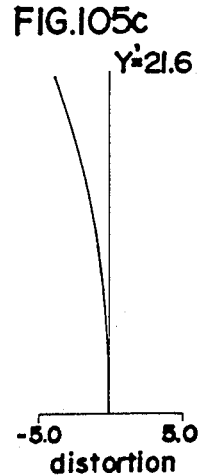 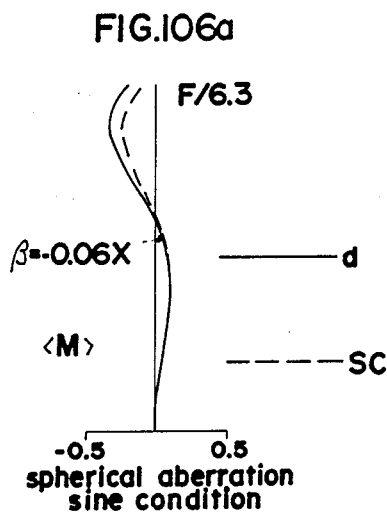 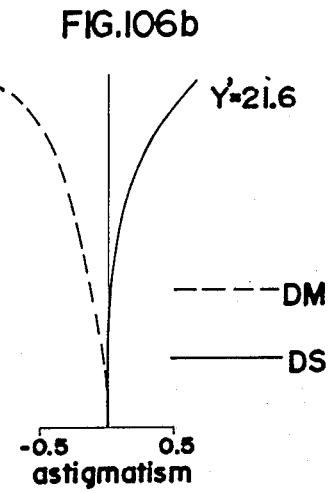 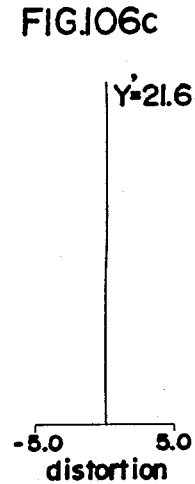 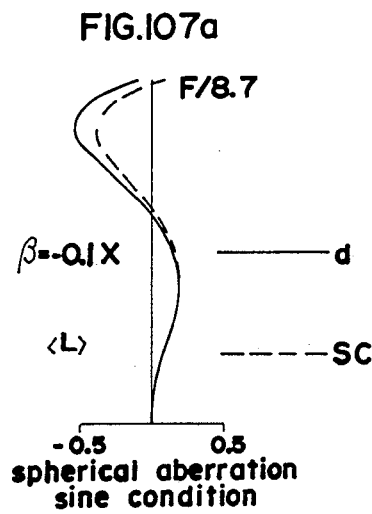 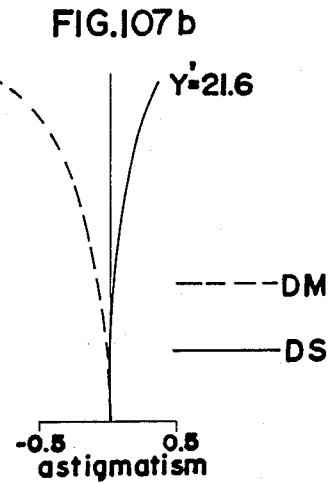 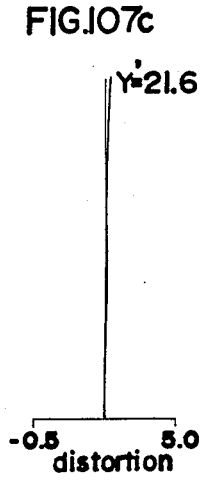

COMPACT ZOOM LENS SYSTEM WITH A HIGH ZOOM RATIO

BACKGROUND OF THE INVENTION

1. Field of the Invention

The present invention relates to a compact zoom lens system having a high zoom ratio and including a range of wide angle of view, in which there is no need of securing a sufficient back focal length, such as a compact zoom lens system used for 35 mm lens-shutter type camera, and to a focusing operation thereof.

2. Description of the Relating Art

Conventionally, as a compact zoom lens system in which there is no need of securing a sufficient back focal length, there have been known various types of the zoom lens system, for example two, three and four component type zoom lens systems. However, in almost all types of such a zoom lens system the zoom ratio is less than 3 so that it is desirable that the zoom lens system with a high zoom ratio more than 3 is provided for the lens-shutter type camera.

On the other hand, a lot of the zoom lens systems whose zoom ratio is more than 3 have been provided as for a single lens reflex camera. However, in this type of the zoom lens system having a range of a wide angle of view, the total length of the whole lens system is very long because of the limitation of the back focal length. Therefore, above-mentioned zoom lens system is not suitable for the lens-shutter type camera.

Further, in most of the zoom lens system the front lens unit located at the object side end of the lens system is utilized as a focusing lens unit for avoiding the complication of the structure, so that the shifting amount of the front lens unit is a constant in any focal length condition for focusing on the same object. However, if the front lens unit functions as a focusing lens unit in the zoom lens system including a range of a wide angle of view and having the front lens unit of positive refractive power, a diameter of the front lens unit must be large for securing the accurate illuminance at the marginal point of the film in the closer object focusing condition.

Furthermore, a limitation for a shifting amount of the focusing lens unit in any focal length is considerably reduced in the recent auto focus camera which drive the focusing lens unit by means of the driving system. But it is desirable that the weight of the focusing lens unit is light and a shifting amount thereof is small for compactness of the driving system.

SUMMARY OF THE INVENTION

The object of the present invention is to provide a compact zoom lens system which has a high zoom ratio and which is suitable for a camera in which there is no need of securing a sufficient back focal length.

The other object of the present invention is to provide a compact zoom lens system in which the lens unit except the front lens unit located at the object side end of the lens system functions as a focusing lens unit, so that a diameter of the front lens unit is small and the optical performance for focusing on the closer object is high.

The other object of the present invention is to provide a compact zoom lens system having a diaphragm whose location is suitable for a auto focus camera, particularly for a driving system of the camera.

The further object of the present invention is to provide a zoom lens system in which various aberrations are well corrected across the entire zoom range.

According to the present invention, a compact zoom lens system with a high zoom ratio comprising from the object side to the image side, a first lens unit of a positive refractive power, a second lens unit of a positive refractive power with a first variable air space formed between the first and second lens units, and a third lens unit of a negative refractive power, wherein the first lens unit and the third lens units are shiftable from the image side to the object side and the second lens unit is shiftable so that the first variable air space increases and the second variable air space decreases in the zooming operation from the shortest focal length to the longest focal length, wherein the second or third lens units includes at least an aspherical surface, and wherein the second or third lens units are shiftable in the focusing operation. Further, a diaphragm is located at the image side or the object side of the second lens element.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

BRIEF DESCRIPTION OF THE DRAWINGS

FIG. 1 represents a cross sectional view of the lens system according to a first embodiment of the present invention;

FIG. 2 represents a cross sectional view of the lens system according to a second embodiment of the present invention;

FIG. 5 represents a cross sectional view of the lens system according to a fifth embodiment of the present invention;

FIG. 6 represents a cross sectional view of the lens system according to a sixth embodiment of the present invention;

FIGS. 21a, 21b and 21c represent the aberration curves of the third embodiment for the shortest focal length in the infinity focusing condition;

FIGS. 22a, 22b and 22c represent the aberration curves of the third embodiment for the middle focal length in the infinity focusing condition;

FIGS. 23a, 23b and 23c represent the aberration curves of the third embodiment for the longest focal length in the infinity focusing condition;

FIGS. 54a, 54b and 54c represent the aberration curves of the fourteenth embodiment for the shortest focal length in the infinity focusing condition;

FIGS. 55a, 55b and 55c represent the aberration curves of the fourteenth embodiment for the middle focal length in the infinity focusing condition;

FIGS. 56a, 56b and 56c represent the aberration curves of the fourteenth embodiment for the longest focal length in the infinity focusing condition;

FIGS. 57a, 57b and 57c represent the aberration curves of the second embodiment for the shortest focal length in the closest object focusing condition when the third lens unit fanctions as the focusing lens unit;

FIGS. 58a, 58b and 58c represent the aberration curves of the second embodiment for the middle focal length in the closest object focusing condition when the third lens unit fanctions as the focusing lens unit;

FIGS. 59a, 59b and 59c represent the aberration curves of the second embodiment for the longest focal length in the closest object focusing condition when the third lens unit fanctions as the focusing lens unit;

FIGS. 60a, 60b and 60c represent the aberration curves of the fifth embodiment for the shortest focal length in the closest object focusing condition when the third lens unit fanctions as the focusing lens unit;

FIGS. 61a, 61b and 61c represent the aberration curves of the fifth embodiment for the middle focal length in the closest object focusing condition when the third lens unit fanctions as the focusing lens unit;

FIGS. 62a, 62b and 62c represent the aberration curves of the fifth embodiment for the longest focal length in the closest object focusing condition when the third lens unit fanctions as the focusing lens unit;

FIGS. 66a, 66b and 66c represent the aberration curves of the eleventh embodiment for the shortest focal length in the closest object focusing condition when the third lens unit fanctions as the focusing lens unit;

FIGS. 67a, 67b and 67c represent the aberration curves of the eleventh embodiment for the middle focal length in the closest object focusing condition when the third lens unit fanctions as the focusing lens unit;

FIGS. 68a, 68b and 68c represent the aberration curves of the eleventh embodiment for the longest focal length in the closest object focusing condition when the third lens unit fanctions as the focusing lens unit;

FIGS. 78a, 78b and 78c represent the aberration curves of the second embodiment for the shortest focal length in the closest object focusing condition when the second lens unit fanctions as the focusing lens unit;

FIGS. 79a, 79b and 79c represent the aberration curves of the second embodiment for the middle focal length in the closest object focusing condition when the second lens unit fanctions as the focusing lens unit;

FIGS. 80a, 80b and 80c represent the aberration curves of the second embodiment for the longest focal length in the closest object focusing condition when the second lens unit fanctions as the focusing lens unit;

FIGS. 90a, 90b and 90c represent the aberration curves of the eleventh embodiment for the shortest focal length in the closest object focusing condition when the second lens unit fanctions as the focusing lens unit;

FIGS. 91a, 91b and 91c represent the aberration curves of the eleventh embodiment for the middle focal length in the closest object focusing condition when the second lens unit fanctions as the focusing lens unit;

FIGS. 92a, 92b and 92c represent the aberration curves of the eleventh embodiment for the longest focal length in the closest object focusing condition when the second lens unit fanctions as the focusing lens unit;

FIGS. 105a, 105b and 105c represent the aberration curves of the eighth embodiment for the shortest focal length in the closest object focusing condition when the second lens unit with a diaphragm located at the object side thereof fanctions as the focusing lens unit;

FIGS. 106a, 106b and 106c represent the aberration curves of the eighth embodiment for the middle focal length in the closest object focusing condition when the second lens unit with a diaphragm located at the object side thereof fanctions as the focusing lens unit; and FIGS. 107a, 107b and 107c represent the aberration curves of the eighth embodiment for the longest focal length in the closest object focusing condition when the second lens unit with a diaphragm located at the object side thereof fanctions as the focusing lens unit.

DETAILED DESCRIPTION OF THE PREFERRED EMBODIMENTS

Figure 3:
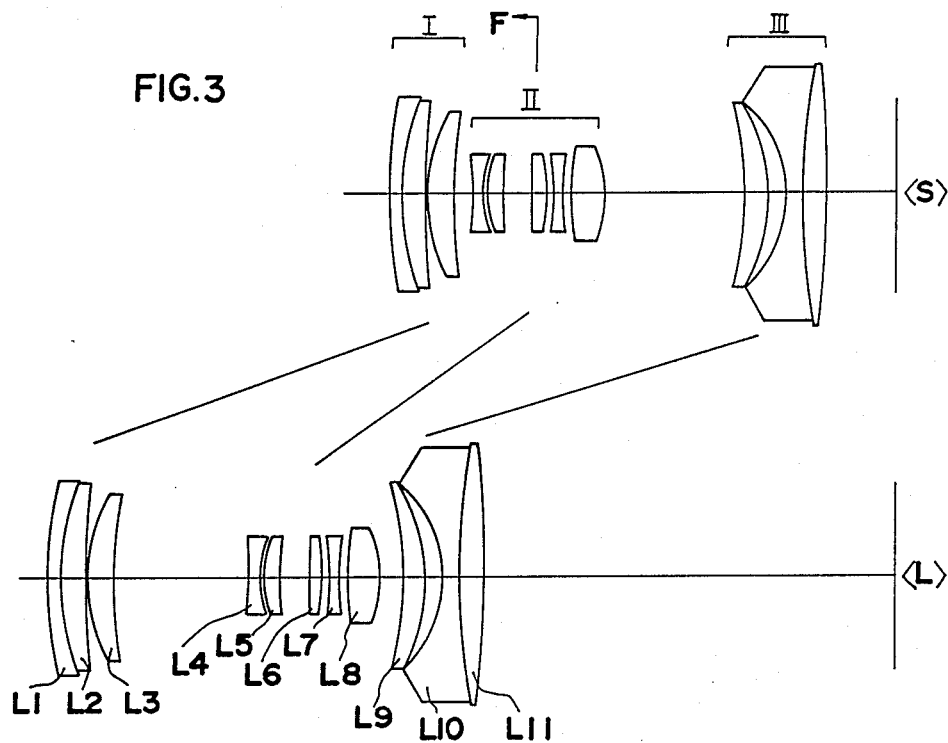
FIG. 3 represents a cross sectional view of the lens system according to a third embodiment of the present invention.

The following description is provided to enable any person skilled in the optical and camera field to make and use the invention and sets forth the best modes contemplated by the inventors for carrying out their invention. Various modifications, however, will remain readily apparent to those skilled in the art, since the generic principles of the present invention have been defined herein specifically to provide a relatively economical and easily manufactured compact zoom lens system with a high ratio. The derivation of the formulas and the relation of the powers set forth herein can be accomplished with the assistance of a computer. The present invention represents the parameters of a compromise balance of acceptable aberrations which can be relatively easily manufactured to provide a low cost lens system for utilization with a 35 mm lens-shutter camera.

In the drawings, schematic cross sectional views disclose the position of the lens system and lens elements for the shortest focal length and the longest focal length with lines therebetween representing the direction of their movements for zooming. Due to the number of lens elements involved, it was not deemed appropriate to include individual designation of the radii of curvature and axial distances for each lens element and air spaces. These values, however, are provided in the accompanying tables set forth herein, and the schematic cross sectional views of the respective embodiments follow the normal conventions of an object at the left-hand side of the drawing and the image plane at the right-hand side.

Figure 4:
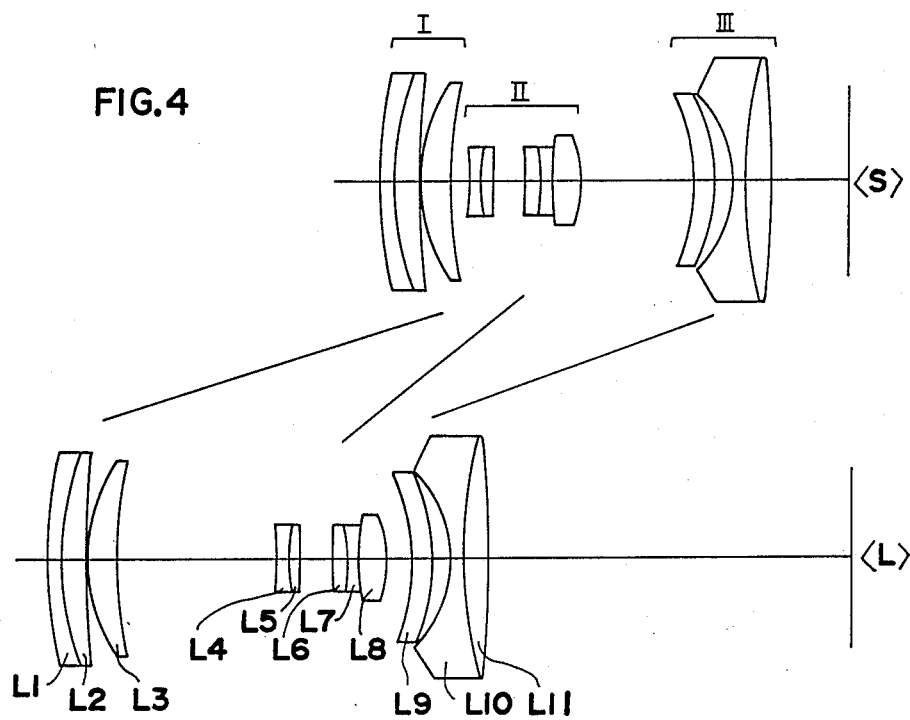
FIG. 4 represents a cross sectional view of the lens system according to a fourth embodiment of the present invention.
Figure 7:
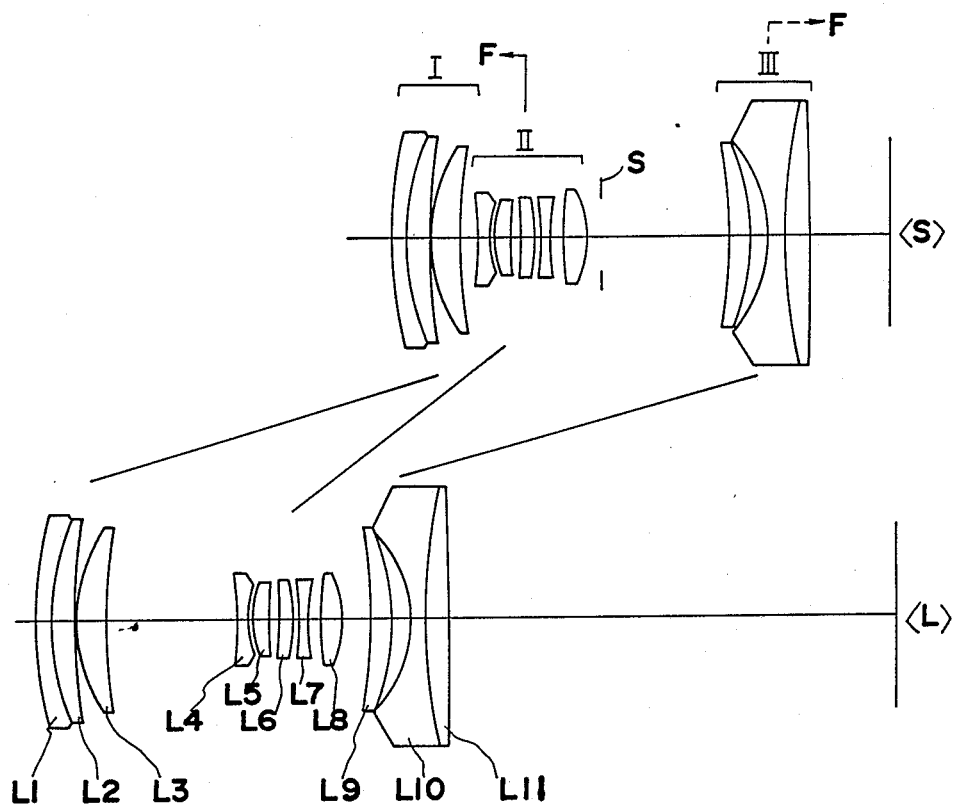
FIG. 7 represents a cross sectional view of the lens system according to a seventh embodiment of the present invention.
Figure 8:
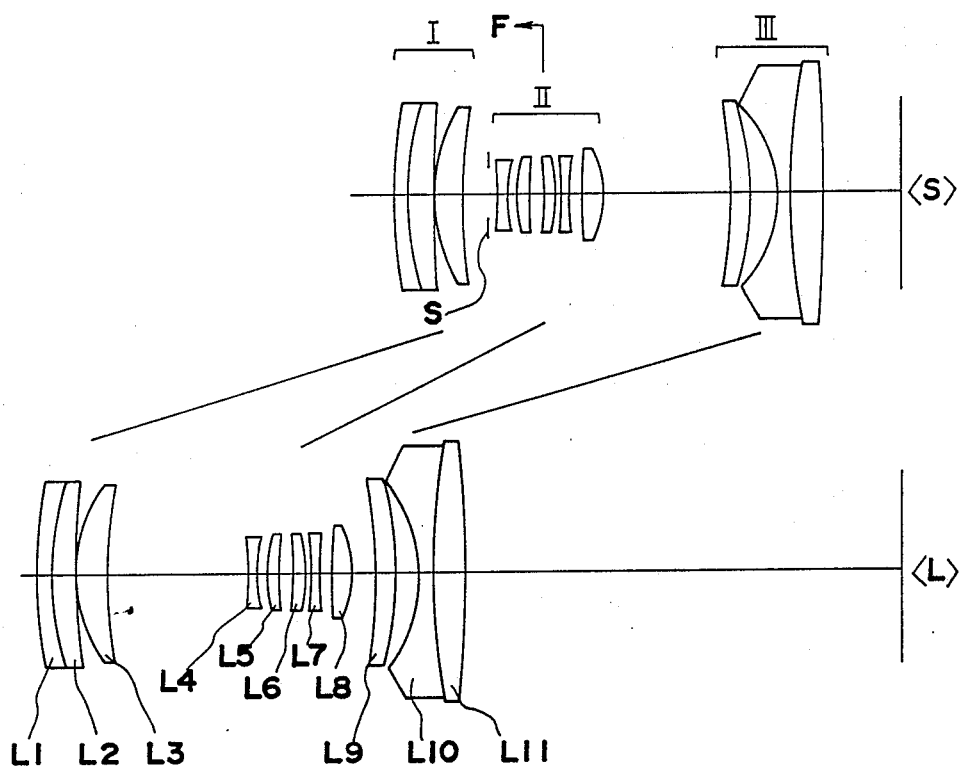
FIG. 8 represents a cross sectional view of the lens system according to a eighth embodiment of the present invention.
Figure 9:
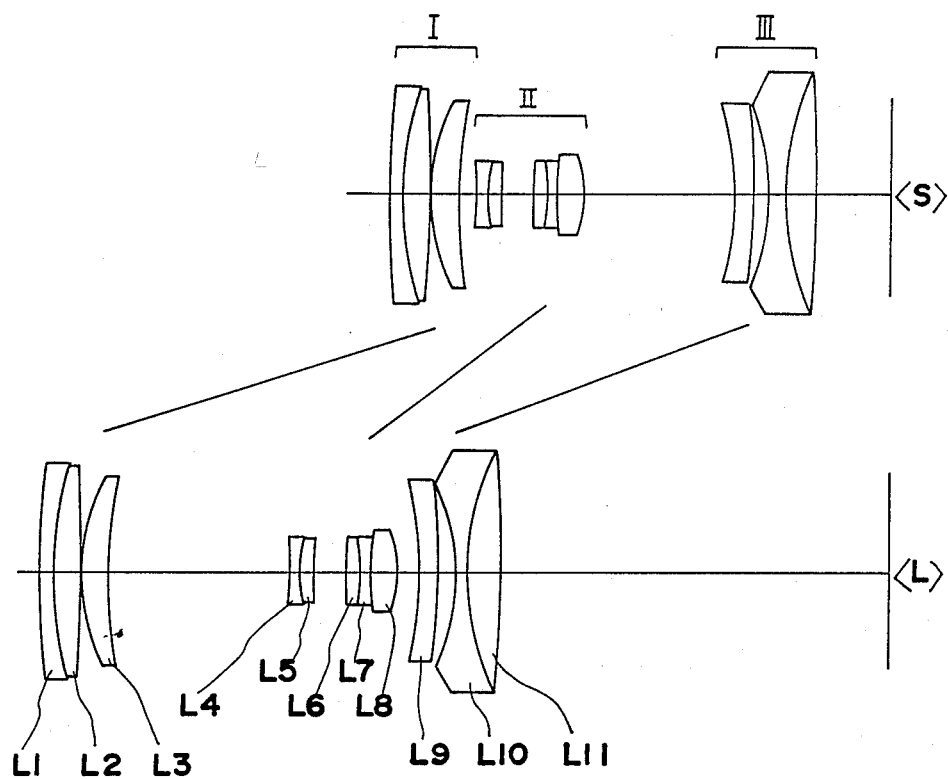
FIG. 9 represents a cross sectional view of the lens system according to a ninth embodiment of the present invention.
Figure 10:
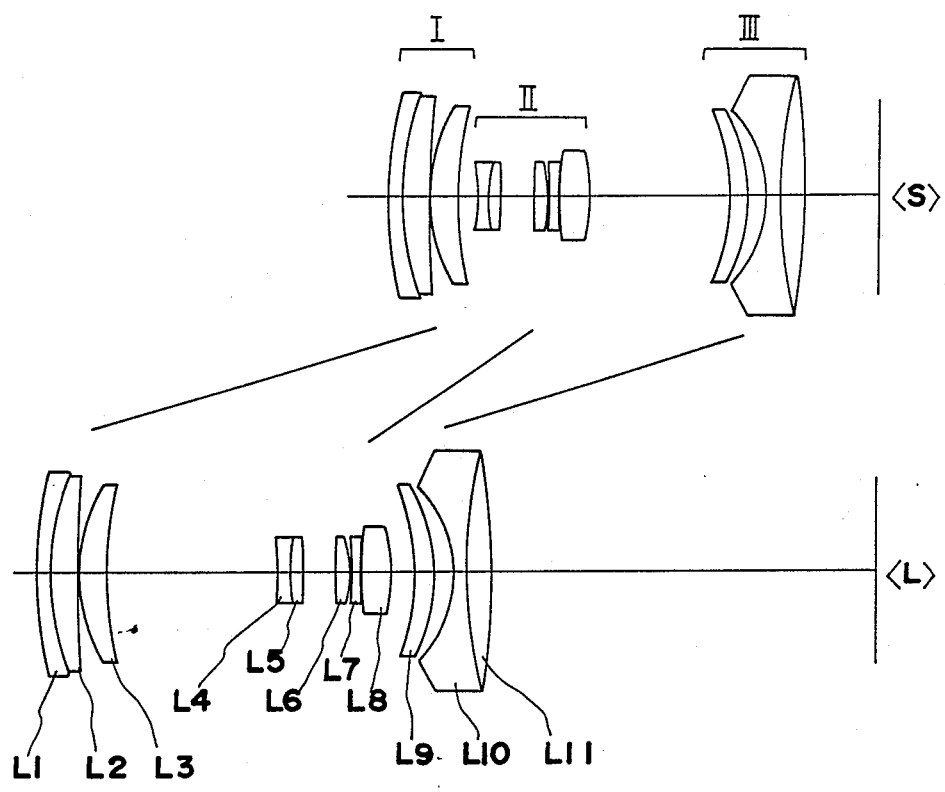
FIG. 10 represents a cross sectional view of the lens system according to a tenth embodiment of the present invention.
Figure 11:
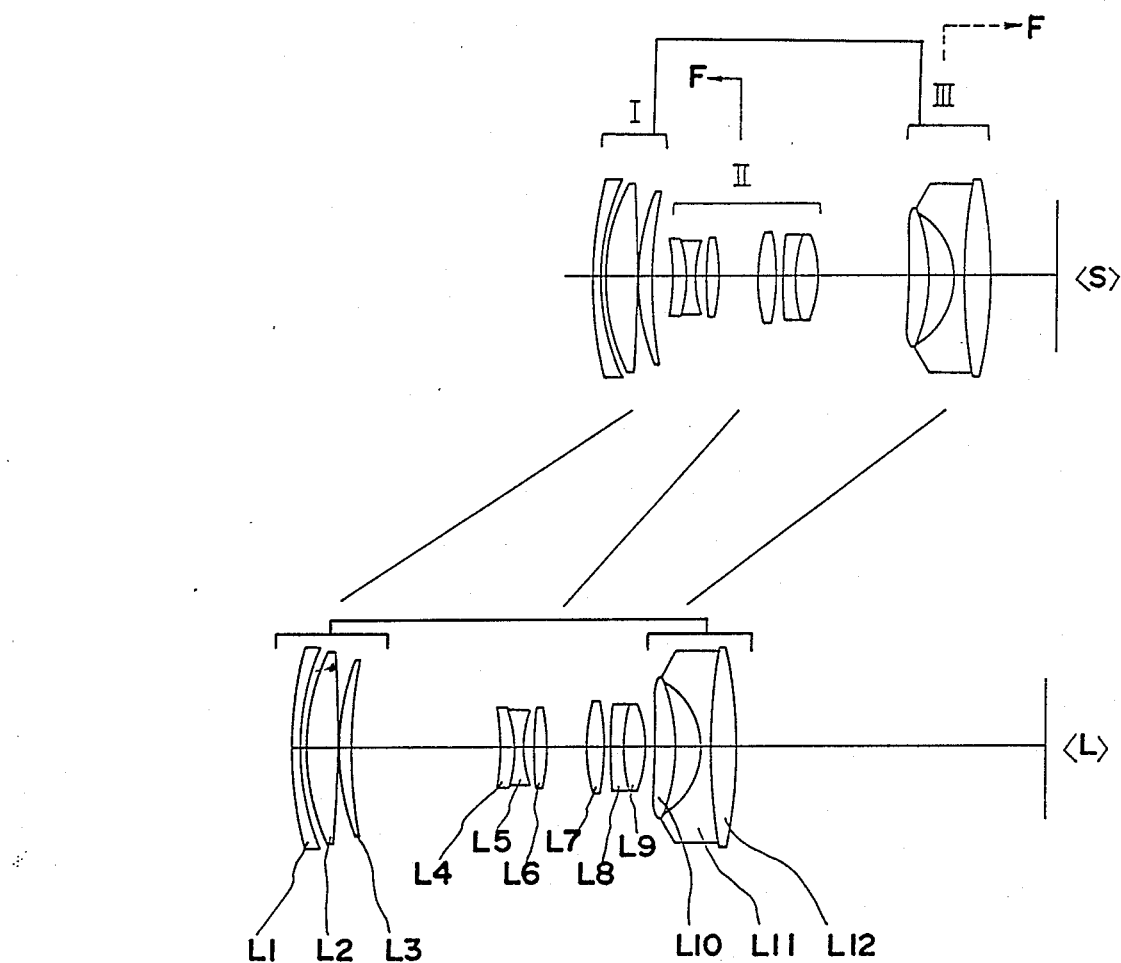
FIG. 11 represents a cross sectional view of the lens system according to a eleventh embodiment of the present invention.
Figure 12:
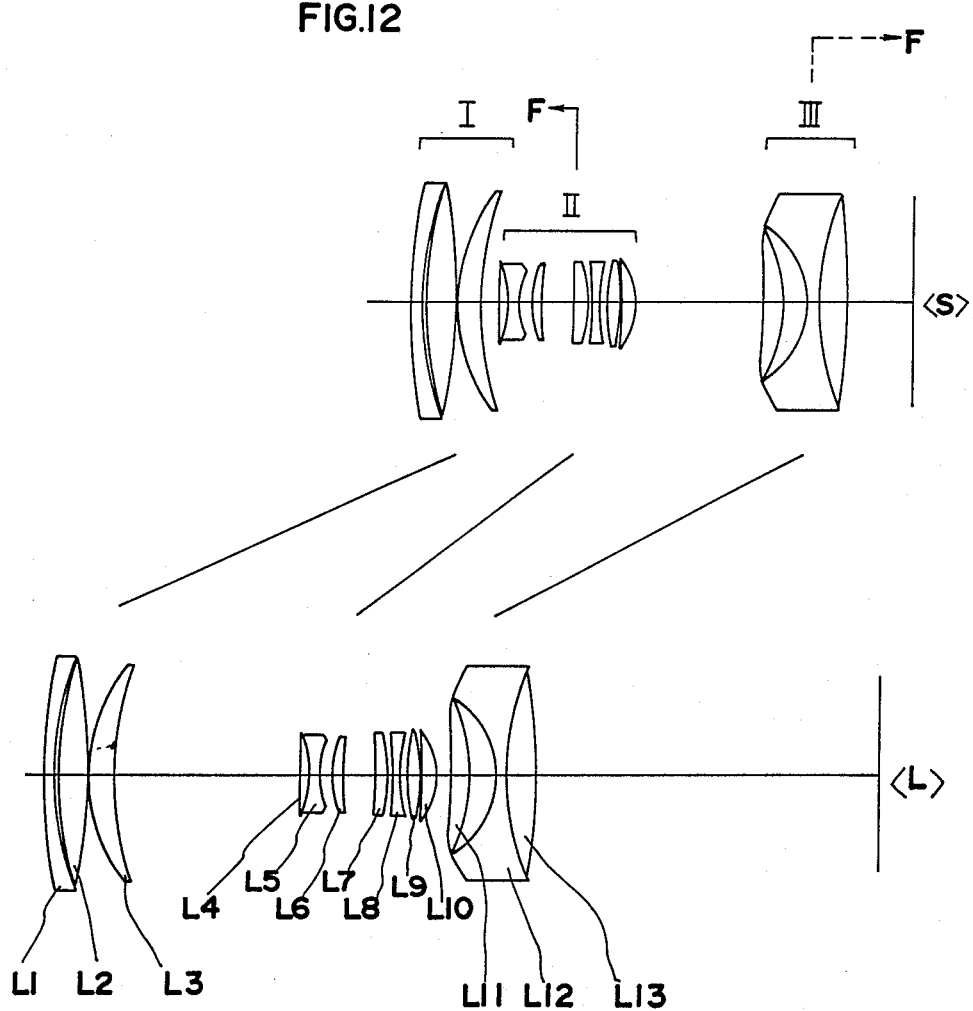
FIG. 12 represents a cross sectional view of the lens system according to a twelfth embodiment of the present invention.
Figure 13:
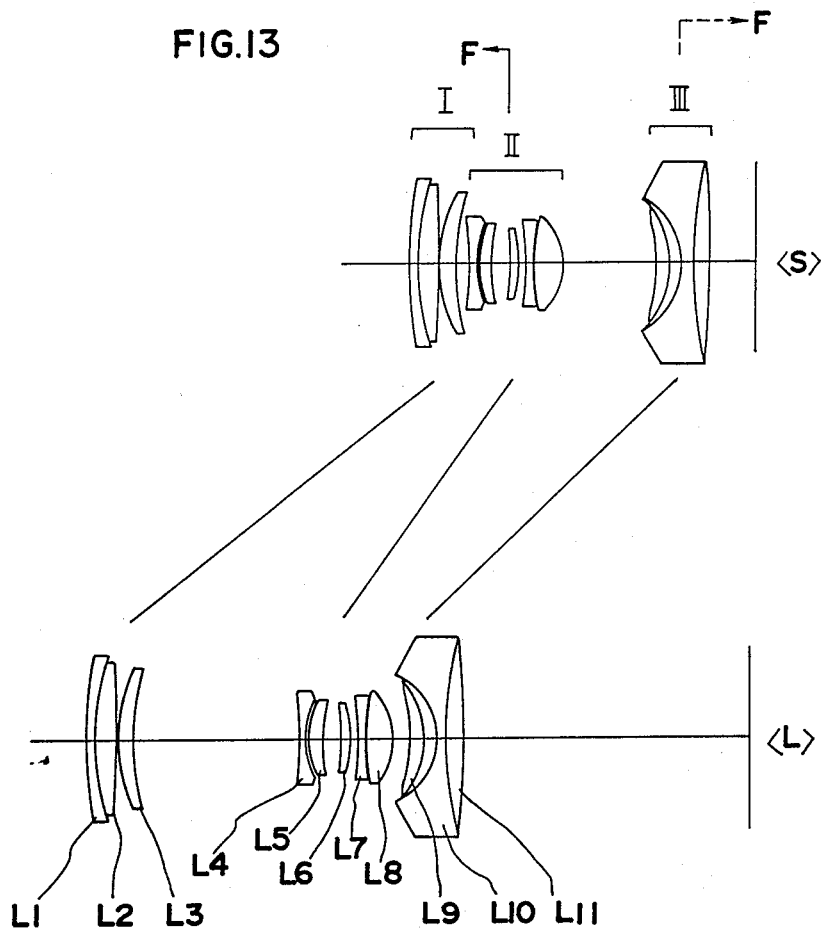
FIG. 13 represents a cross sectional view of the lens system according to a thirteenth embodiment of the present invention.
Figure 14:
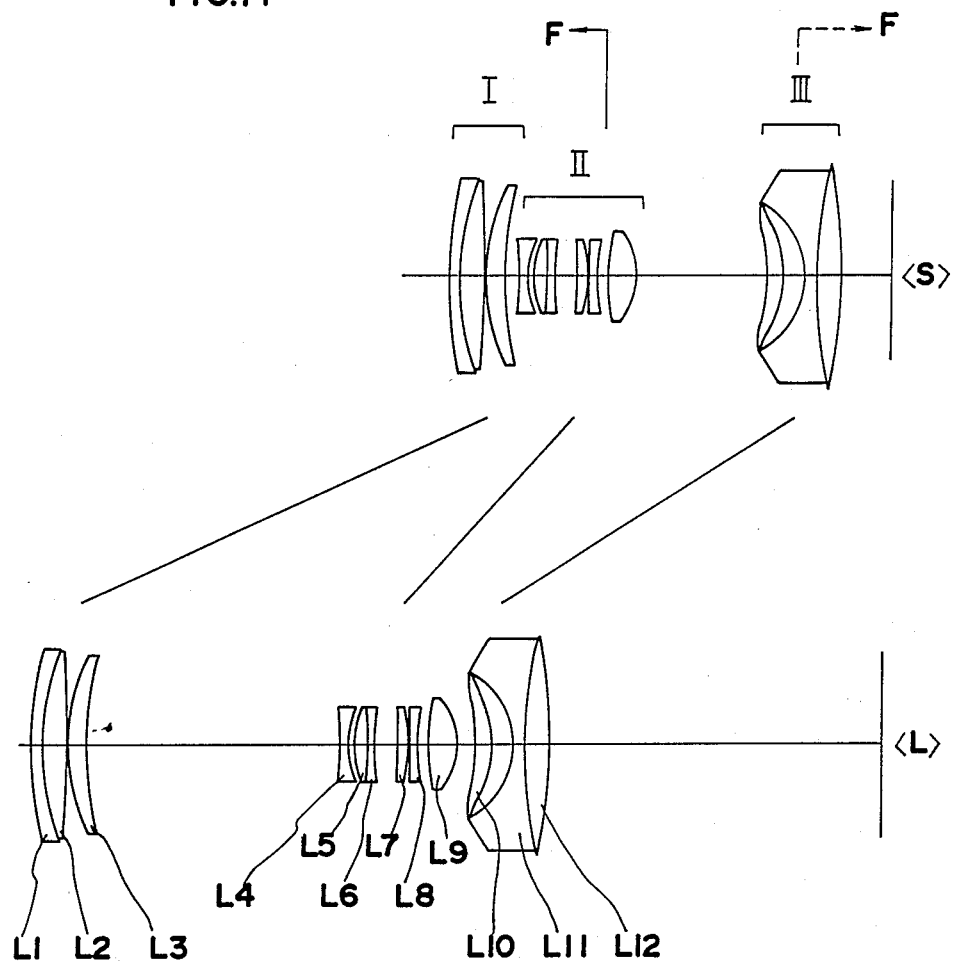
FIG. 14 represents a cross sectional view of the lens system according to a fourteenth embodiment of the present invention.
Figure 15A:
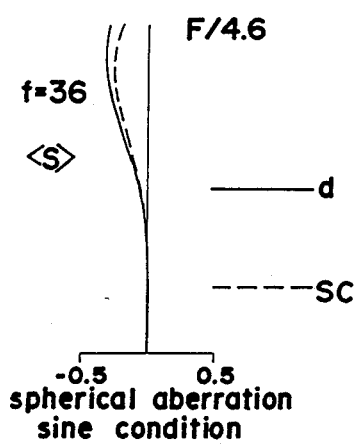
FIGS. 15a, 15b and 15c represent the aberration curves of the first embodiment for the shortest focal length in the infinity focusing condition.
Figure 15B:
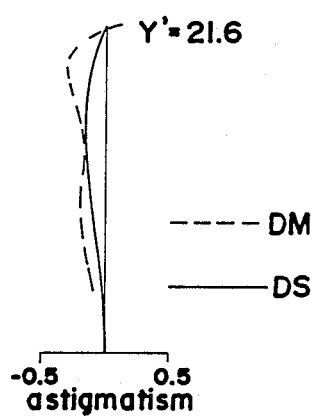
Figure 15C:
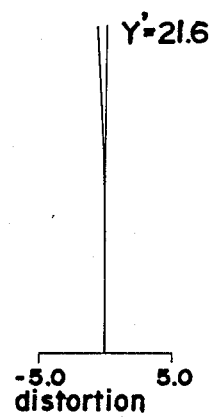
Figure 16A:
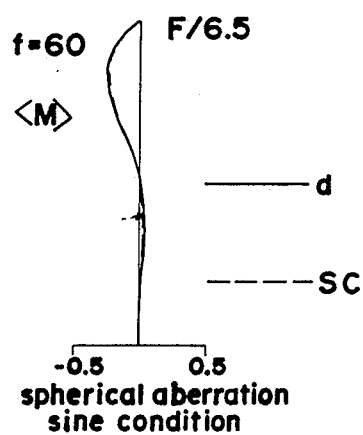
FIGS. 16a, 16b and 16c represent the aberration curves of the first embodiment for the middle focal length in the infinity focusing condition.
Figure 16B:
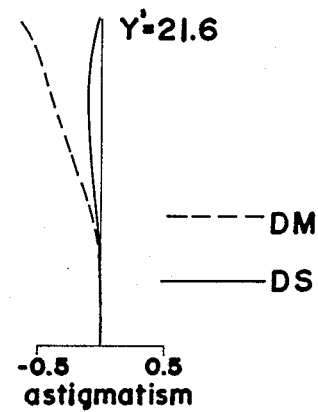
Figure 16C:
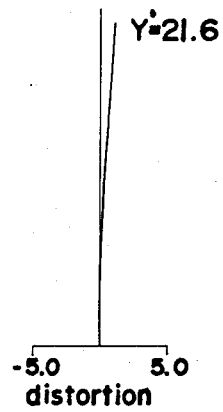
Figure 17A:
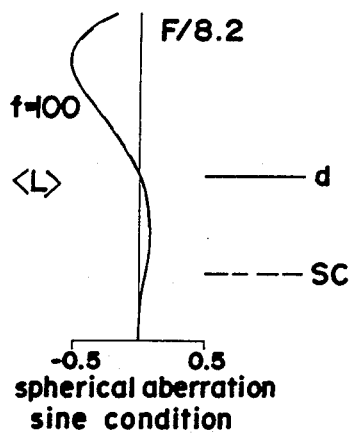
FIGS. 17a, 17b and 17c represent the aberration curves of the first embodiment for the longest focal length in the infinity focusing condition.
Figure 17B:
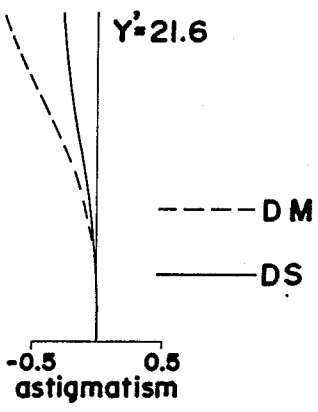
Figure 17C:
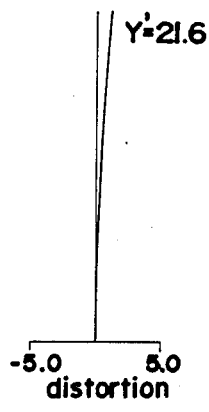
Figure 18A:
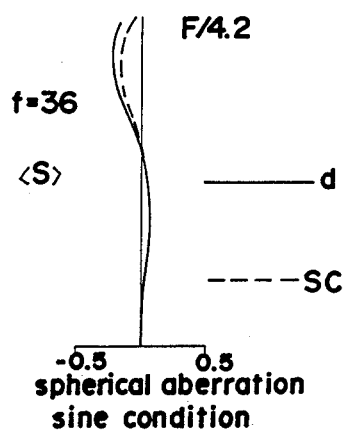
FIGS. 18a, 18b and 18c represent the aberration curves of the second embodiment for the shortest focal length in the infinity focusing condition.
Figure 18B:
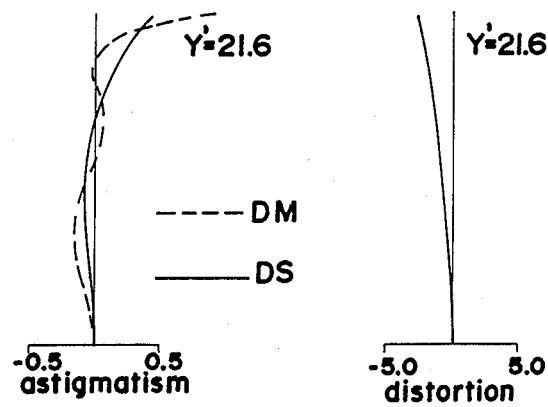
Figure 18C:
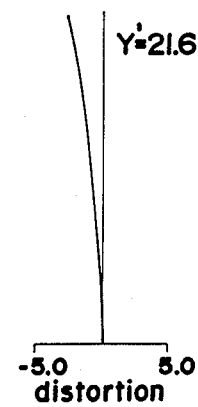
Figure 19A:
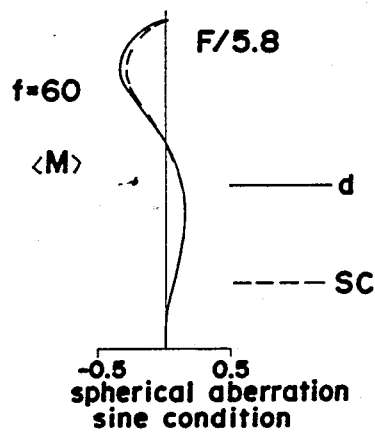
FIGS. 19a, 19b and 19c represent the aberration curves of the second embodiment for the middle focal length in the infinity focusing condition.
Figure 19B:
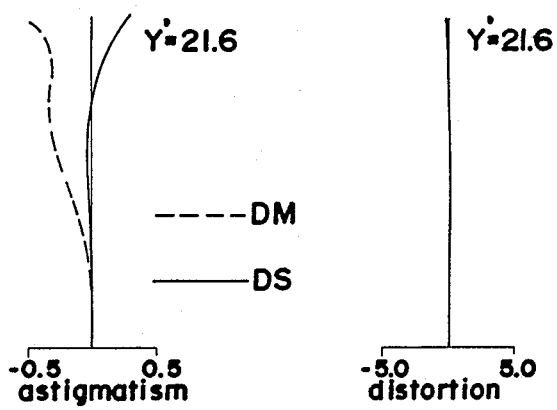
Figure 19C:
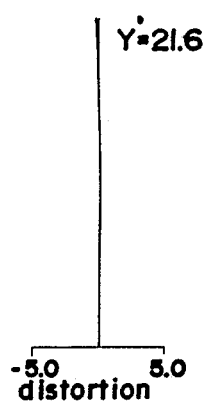
Figure 20A:
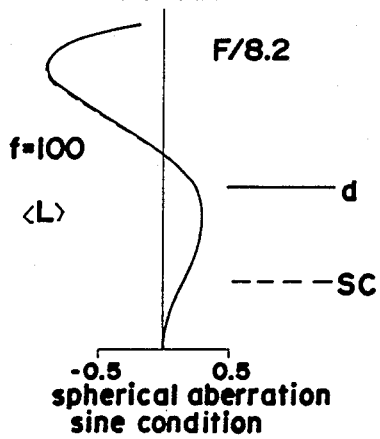
FIGS. 20a, 20b and 20c represent the aberration curves of the second embodiment for the longest focal length in the infinity focusing condition.
Figure 20B:
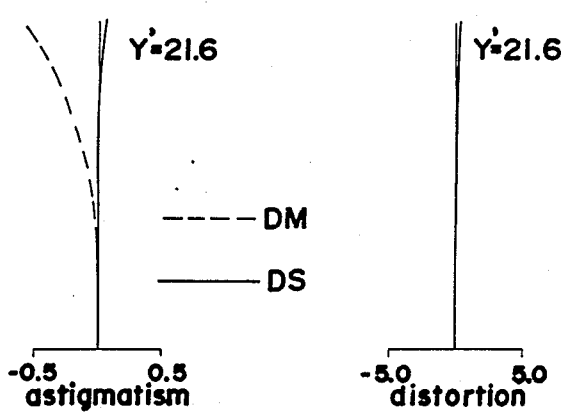
Figure 20C:
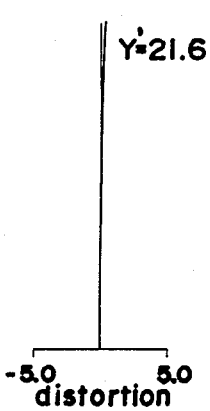
Figure 24A:
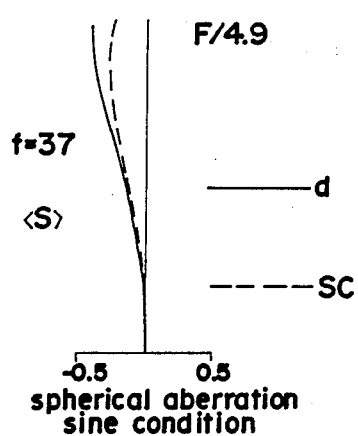
FIGS. 24a, 24b and 24c represent the aberration curves of the fourth embodiment for the shortest focal length in the infinity focusing condition.
Figure 24B:
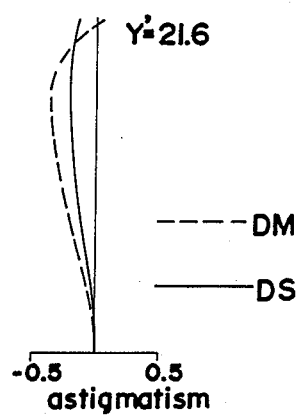
Figure 24C:
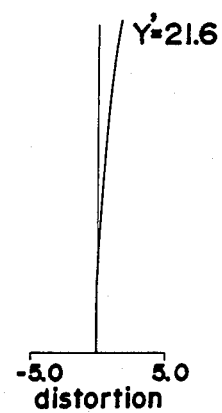
Figure 25A:
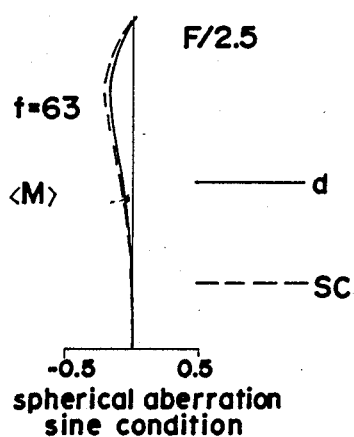
FIGS. 25a, 25b and 25c represent the aberration curves of the fourth embodiment for the middle focal length in the infinity focusing condition.
Figure 25B:
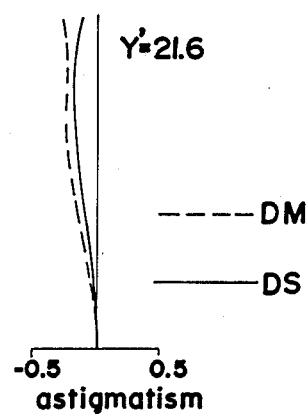
Figure 25C:
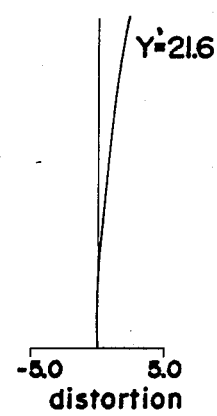
Figure 26A:
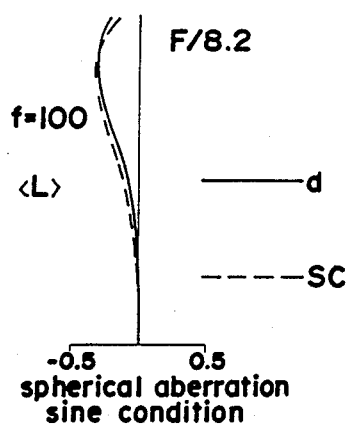
FIGS. 26a, 26b and 26c represent the aberration curves of the fourth embodiment for the longest focal length in the infinity focusing condition.
Figure 26B:
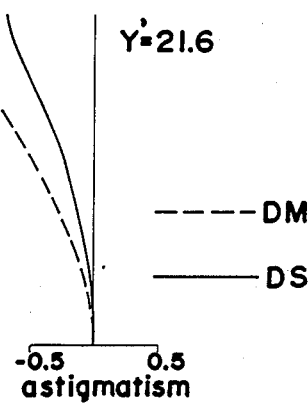
Figure 26C:
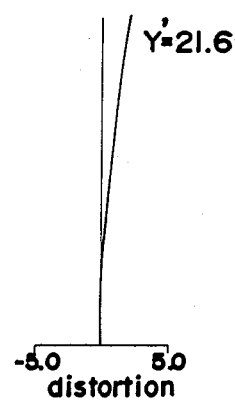
Figure 27A:
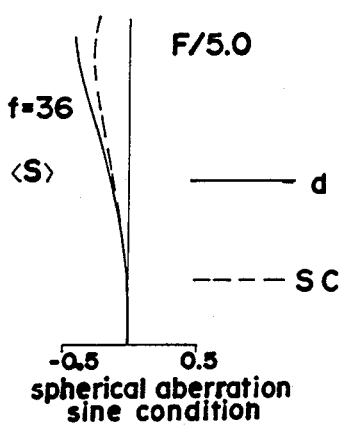
FIGS. 27a, 27b and 27c represent the aberration curves of the fifth embodiment for the shortest focal length in the infinity focusing condition.
Figure 27B:
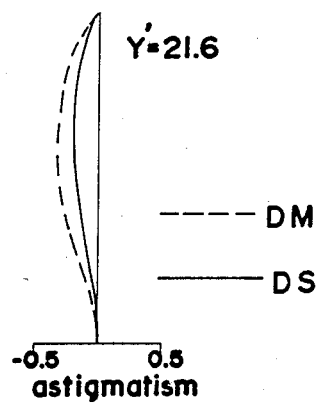
Figure 27C:
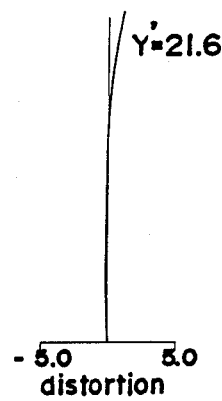
Figure 28A:
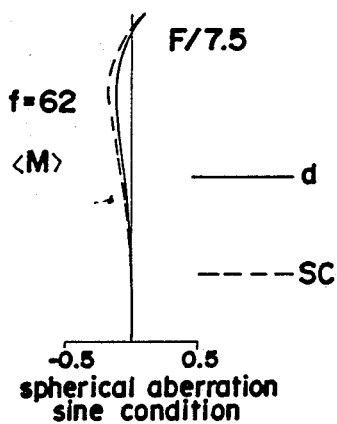
FIGS. 28a, 28b and 28c represent the aberration curves of the fifth embodiment for the middle focal length in the infinity focusing condition.
Figure 28B:
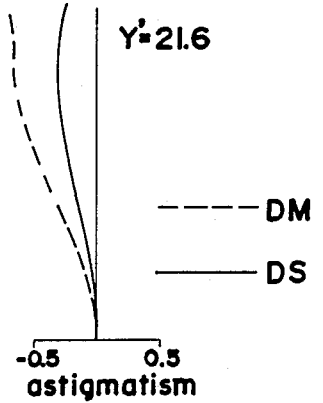
Figure 28C:
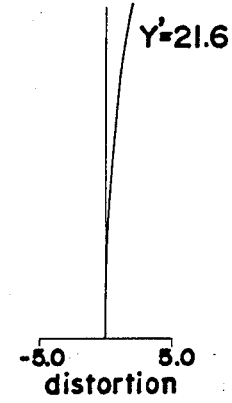
Figure 29A:
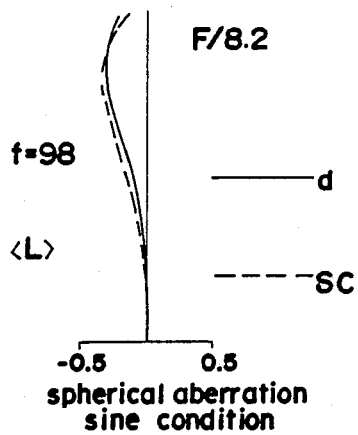
FIGS. 29a, 29b and 29c represent the aberration curves of the fifth embodiment for the longest focal length in the infinity focusing condition.
Figure 29B:
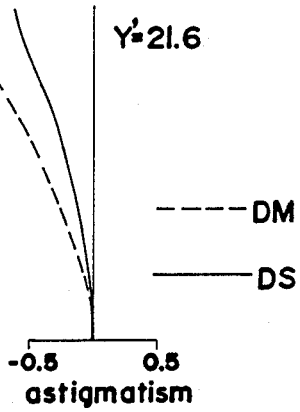
Figure 29C:
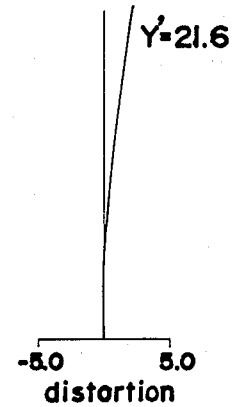
Figure 30A:
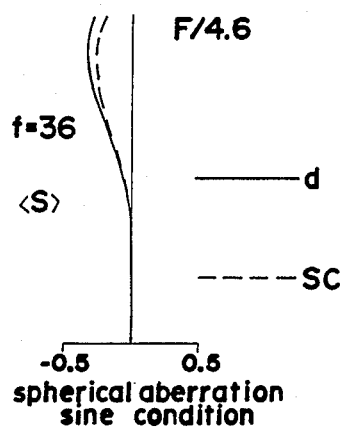
FIGS. 30a, 30b and 30c represent the aberration curves of the sixth embodiment for the shortest focal length in the infinity focusing condition.
Figure 30B:
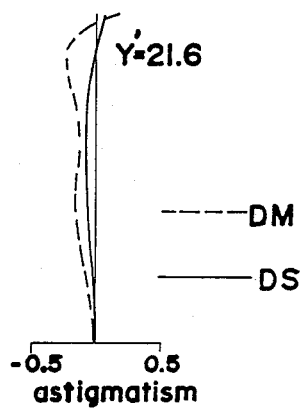
Figure 30C:
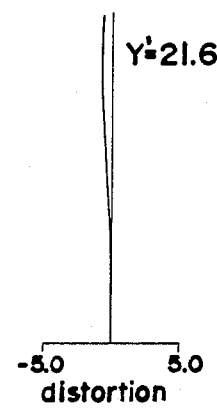
Figure 31A:
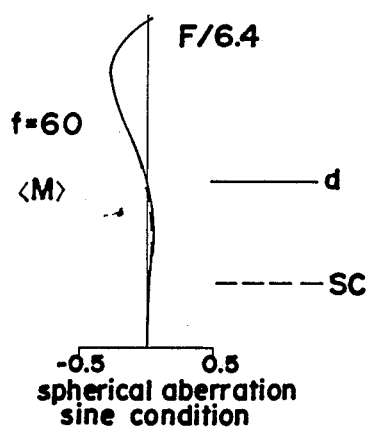
FIGS. 31a, 31b and 31c represent the aberration curves of the sixth embodiment for the middle focal length in the infinity focusing condition.
Figure 31B:
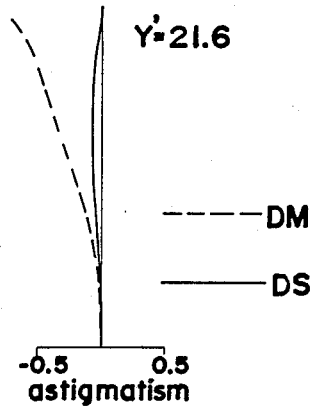
Figure 31C:
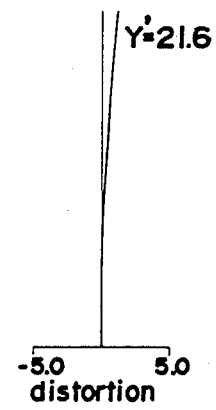
Figure 32A:
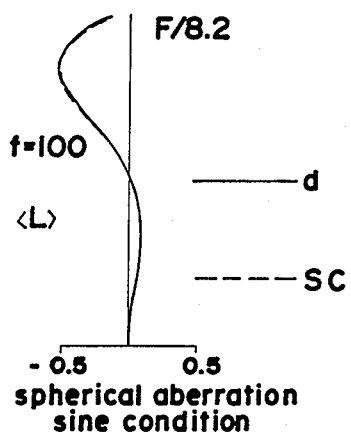
FIGS. 32a, 32b and 32c represent the aberration curves of the sixth embodiment for the longest focal length in the infinity focusing condition.
Figure 32B:
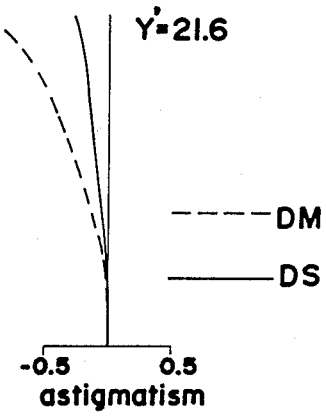
Figure 32C:
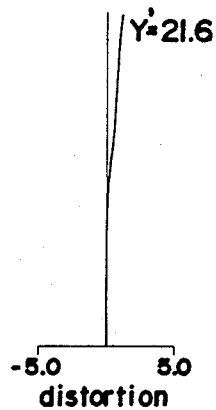
Figure 33A:
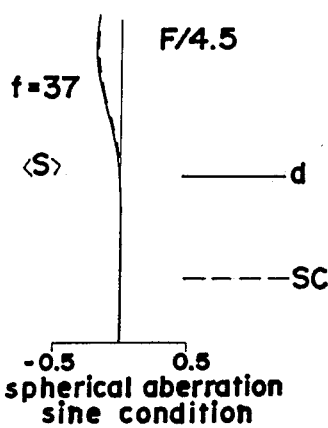
FIGS. 33a, 33b and 33c represent the aberration curves of the seventh embodiment for the shortest focal length in the infinity focusing condition.
Figure 33B:
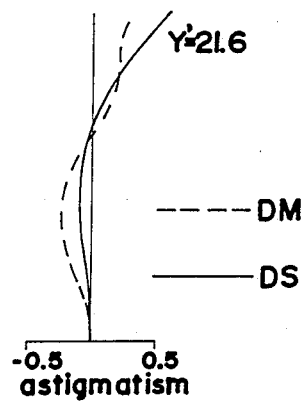
Figure 33C:
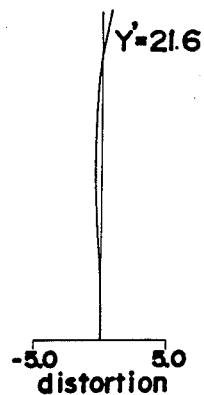
Figure 34A:
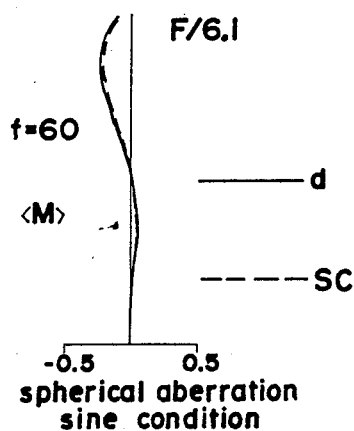
FIGS. 34a, 34b and 34c represent the aberration curves of the seventh embodiment for the middle focal length in the infinity focusing condition.
Figure 34B:
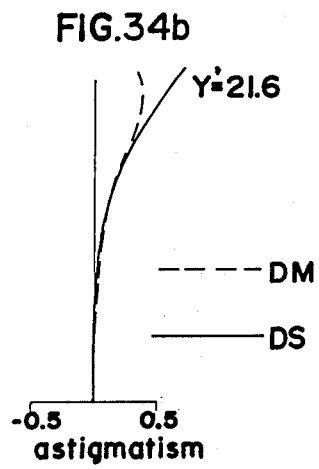
Figure 34C:
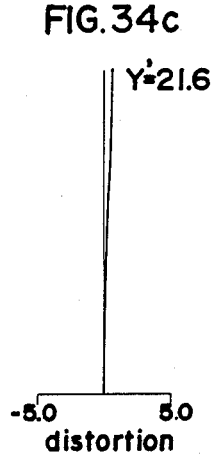
Figure 35A:
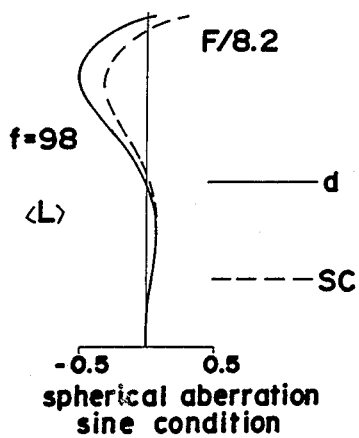
FIGS. 35a, 35b and 35c represent the aberration curves of the seventh embodiment for the longest focal length in the infinity focusing condition.
Figure 35B:
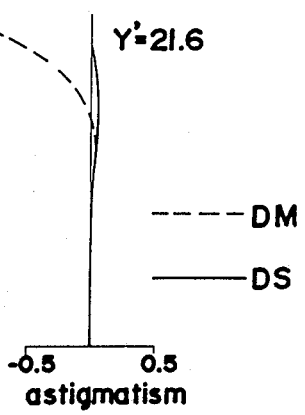
Figure 35C:
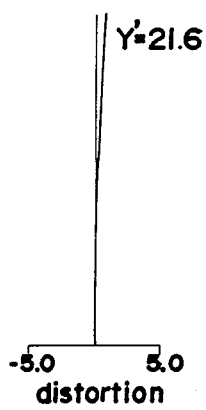
Figure 36A:
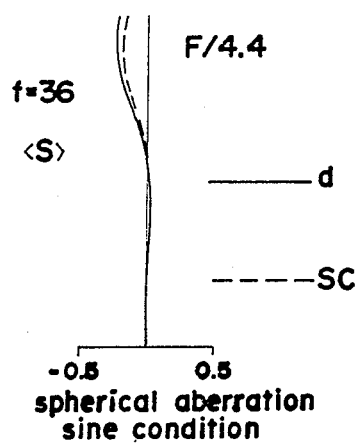
FIGS. 36a, 36b and 36c represent the aberration curves of the eighth embodiment for the shortest focal length in the infinity focusing condition.
Figures 36B, 36C:
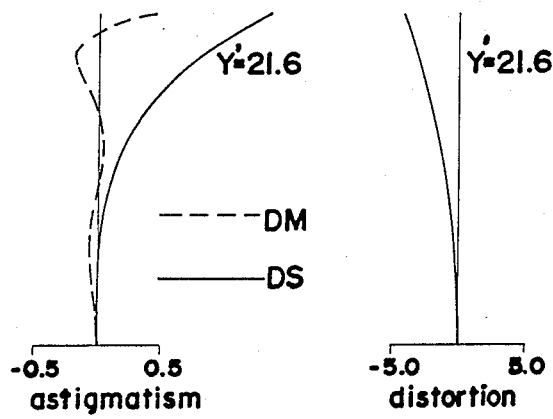
Figure 37A:
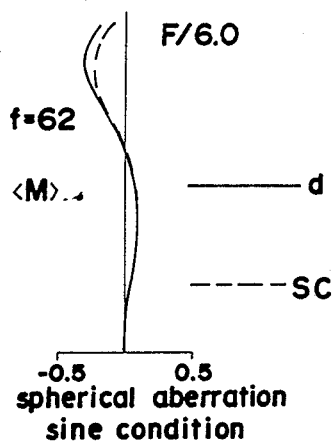
FIGS. 37a, 37b and 37c represent the aberration curves of the eighth embodiment for the middle focal length in the infinity focusing condition.
Figures 37B, 37C:
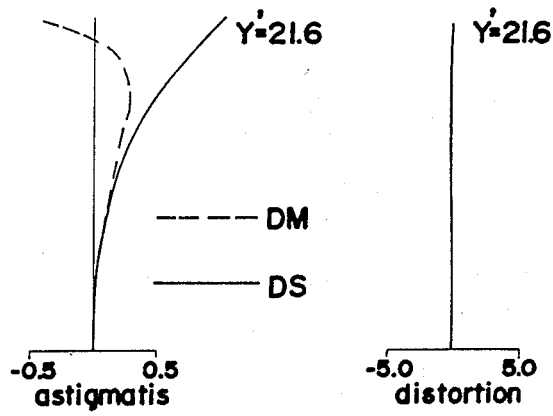
Figure 38A:
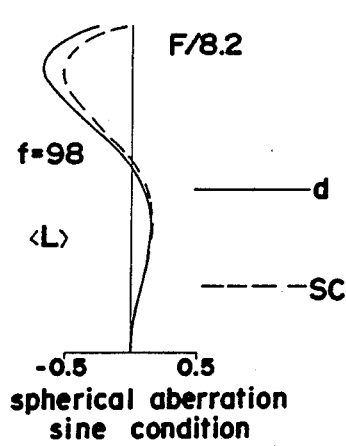
FIGS. 38a, 38b and 38c represent the aberration curves of the eighth embodiment for the longest focal length in the infinity focusing condition.
Figures 38B, 38C:
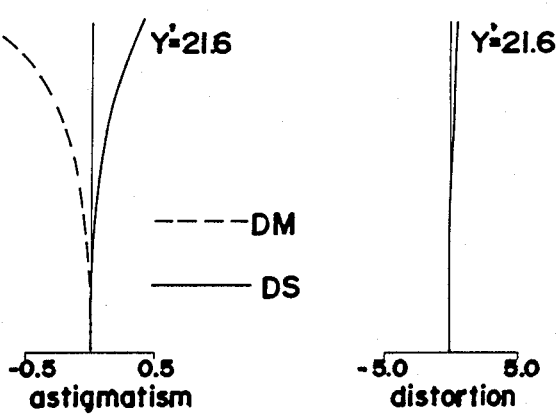
Figure 39A:
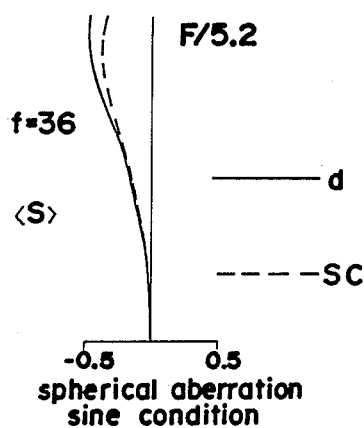
FIGS. 39a, 39b and 39c represent the aberration curves of the ninth embodiment for the shortest focal length in the infinity focusing condition.
Figure 39B:
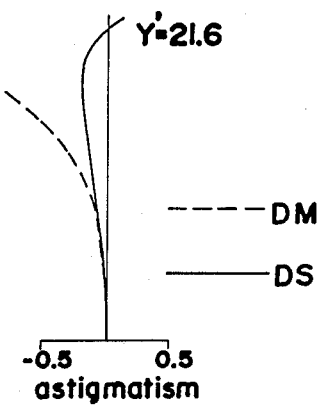
Figure 39C:
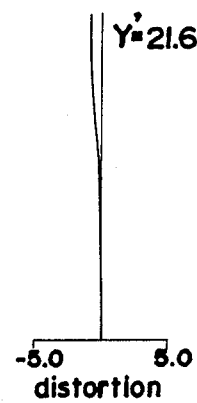
Figure 40A:
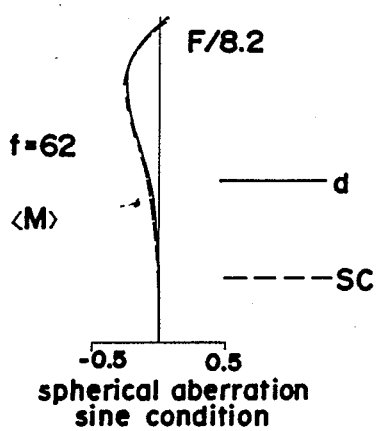
FIGS. 40a, 40b and 40c represent the aberration curves of the ninth embodiment for the middle focal length in the infinity focusing condition.
Figure 40B:
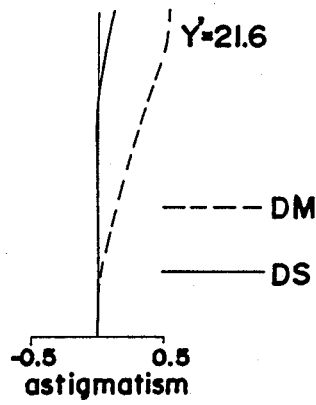
Figure 40C:
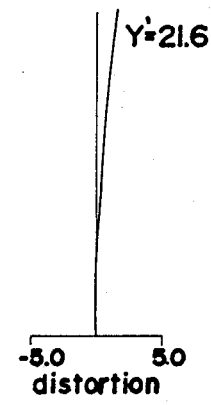
Figure 41A:
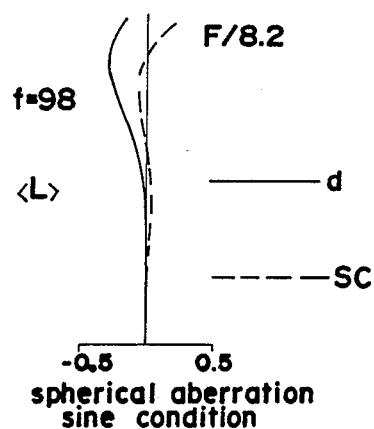
FIGS. 41a, 41b and 41c represent the aberration curves of the ninth embodiment for the longest focal length in the infinity focusing condition.
Figure 41B:
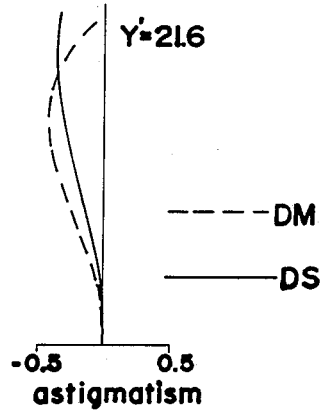
Figure 41C:
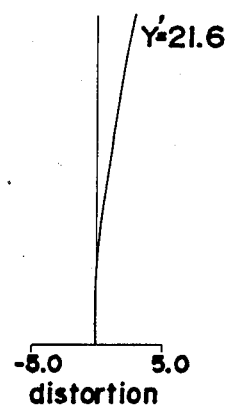
Figure 42A:
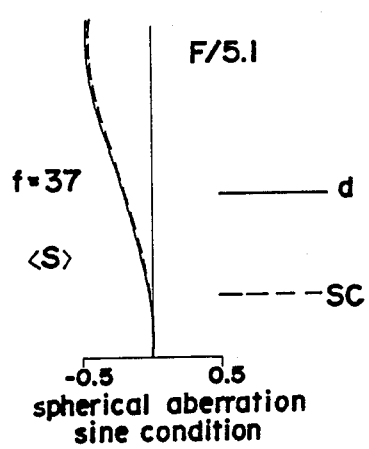
FIGS. 42a, 42b and 42c represent the aberration curves of the tenth embodiment for the shortest focal length in the infinity focusing condition.
Figure 42B:
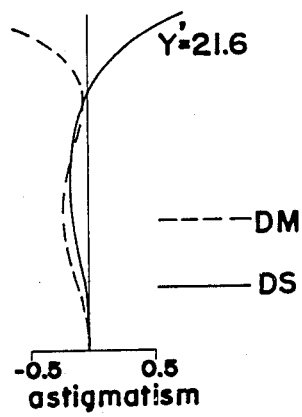
Figure 42C:
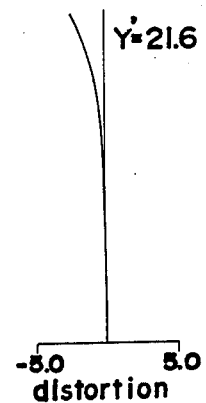
Figure 43A:
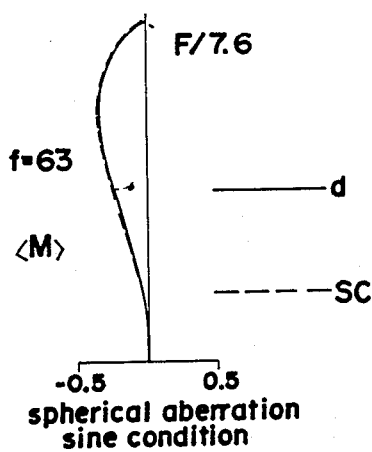
FIGS. 43a, 43b and 43c represent the aberration curves of the tenth embodiment for the middle focal length in the infinity focusing condition.
Figure 43B:
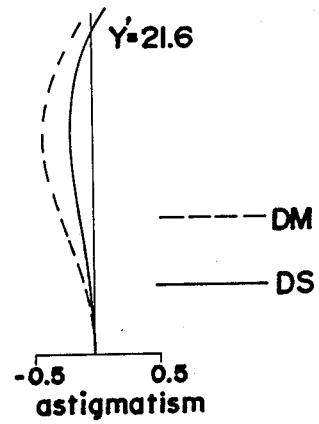
Figure 43C:
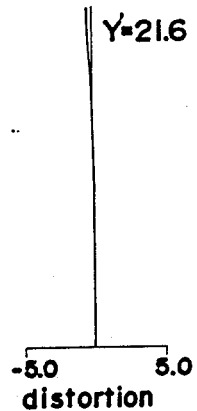
Figure 44A:
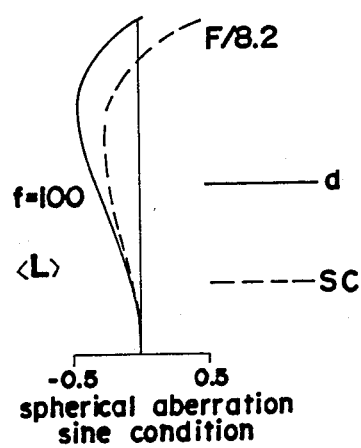
FIGS. 44a, 44b and 44c represent the aberration curves of the tenth embodiment for the longest focal length in the infinity focusing condition.
Figure 44B:
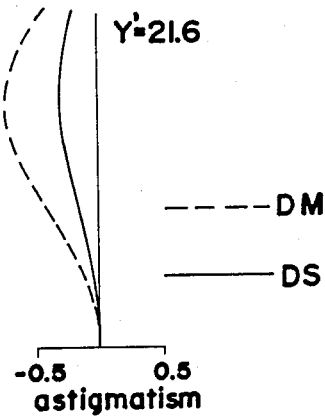
Figure 44C:
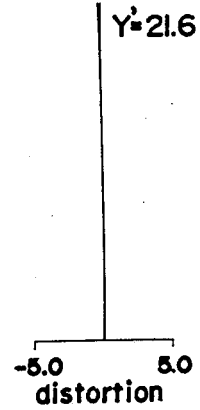
Figure 45A:
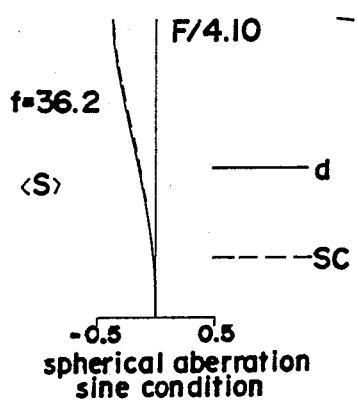
FIGS. 45a, 45b and 45c represent the aberration curves of the eleventh embodiment for the shortest focal length in the infinity focusing condition.
Figure 45B:
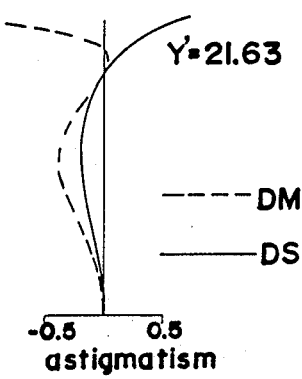
Figure 45C:
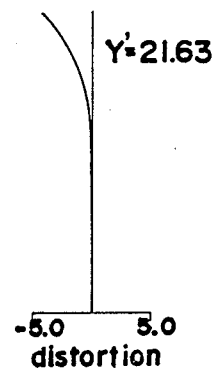
Figure 46A:
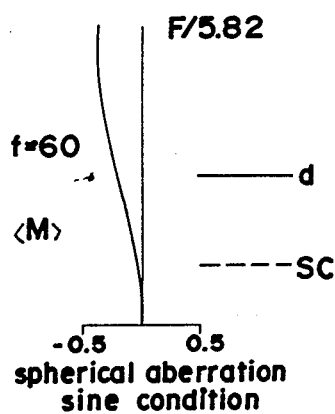
FIGS. 46a, 46b and 46c represent the aberration curves of the eleventh embodiment for the middle focal length in the infinity focusing condition.
Figure 46B:
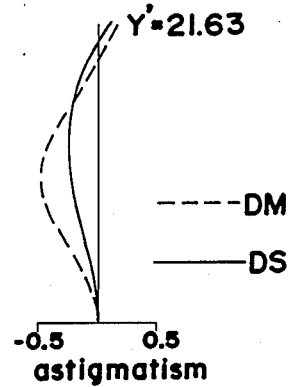
Figure 46C:
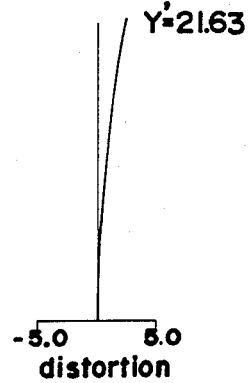
Figure 47A:
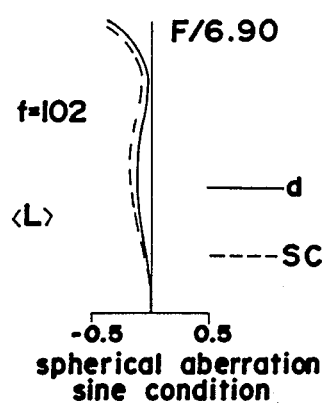
FIGS. 47a, 47b and 47c represent the aberration curves of the eleventh embodiment for the longest focal length in the infinity focusing condition.
Figure 47B:
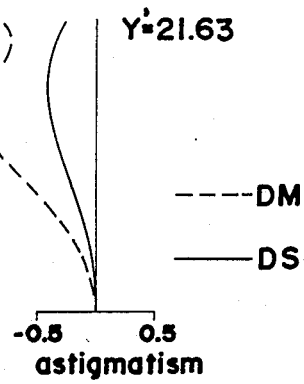
Figure 47C:
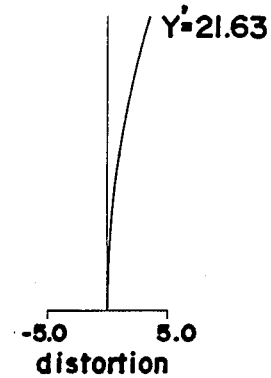
Figure 48A:
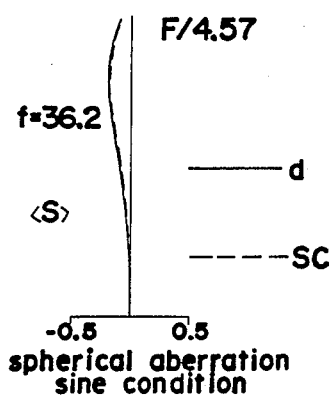
FIGS. 48a, 48b and 48c represent the aberration curves of the twelfth embodiment for the shortest focal length in the infinity focusing condition.
Figure 48B:
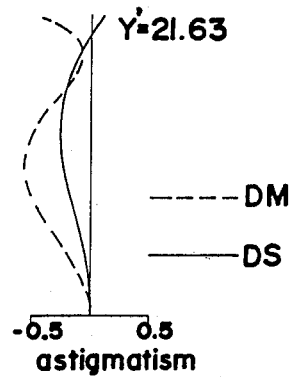
Figure 48C:
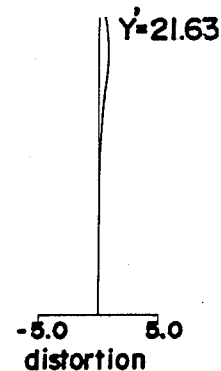
Figure 49A:
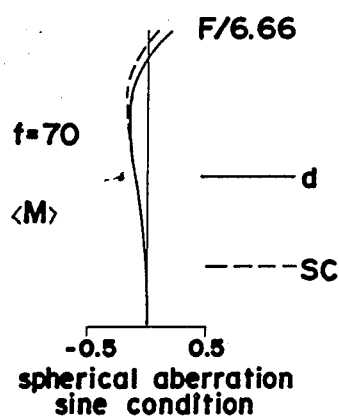
FIGS. 49a, 49b and 49c represent the aberration curves of the twelfth embodiment for the middle focal length in the infinity focusing condition.
Figure 49B:
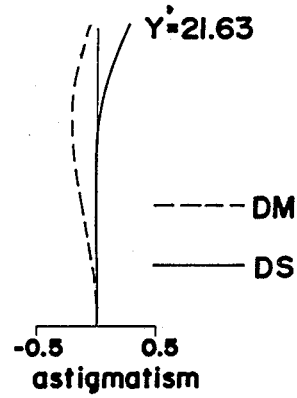
Figure 49C:
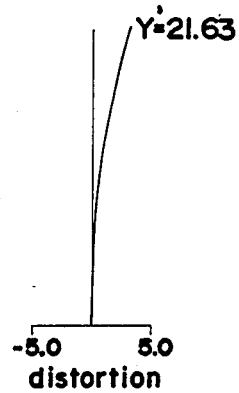
Figure 50A:
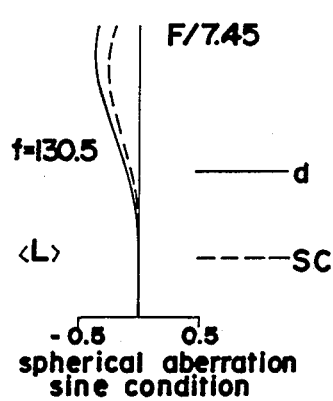
FIGS. 50a, 50b and 50c represent the aberration curves of the twelfth embodiment for the longest focal length in the infinity focusing condition.
Figure 50B:
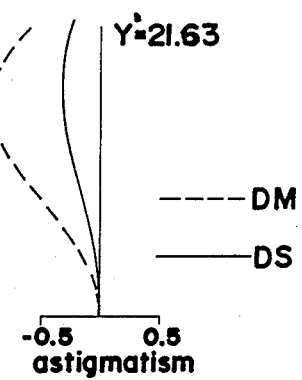
Figure 50C:
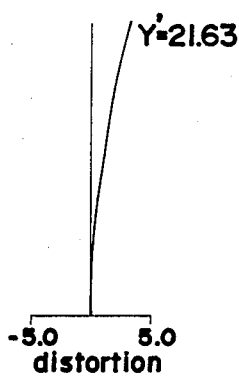
Figure 51A:
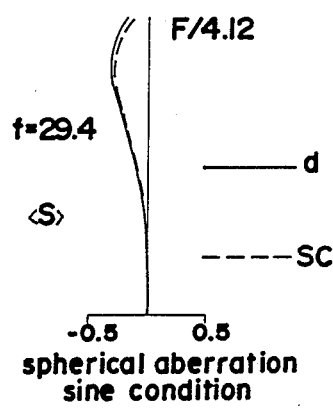
FIGS. 51a, 51b and 51c represent the aberration curves of the thirteenth embodiment for the shortest focal length in the infinity focusing condition.
Figure 51B:
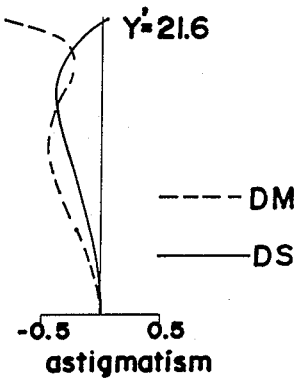
Figure 51C:
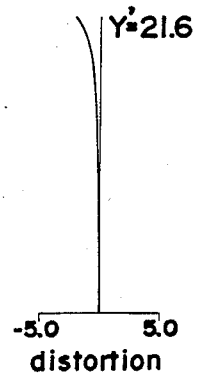
Figure 52A:
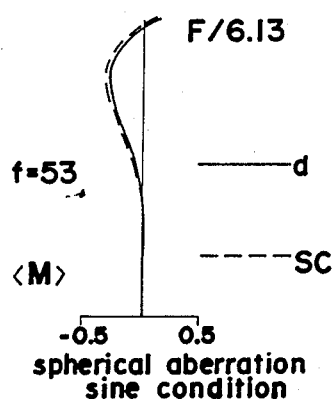
FIGS. 52a, 52b and 52c represent the aberration curves of the tirteenth embodiment for the middle focal length in the infinity focusing condition.
Figure 52B:
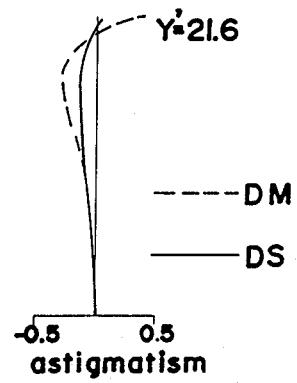
Figure 52C:
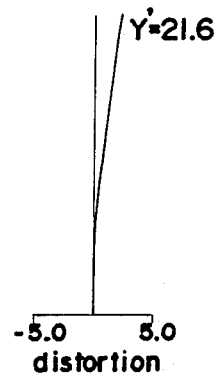
Figure 53A:
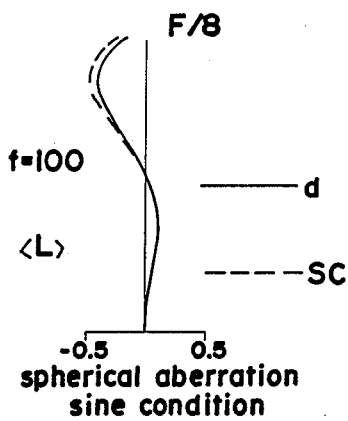
FIGS. 53a, 53b and 53c represent the aberration curves of the tirteenth embodiment for the longest focal length in the infinity focusing condition.
Figure 53B:
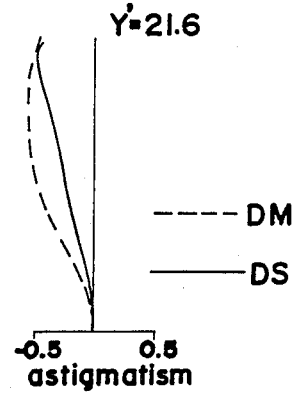
Figure 53C:
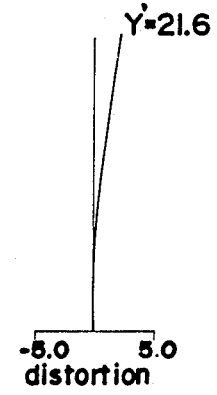

As shown in FIG. 1 to FIG. 14, the present invention provides a compact zoom lens system with a high zoom ratio comprising from the object side to the image side, a first lens unit I of a positive refractive power, a second lens unit II of a positive refractive power, and a third lens unit III of a negative refractive power.

In the zooming operation from the shortest focal length to the longest focal length, the first lens unit I and the third lens unit III are shiftable from the image side to the object side while the second lens unit II is separately shiftable. Therefore, a first variable air space formed between the first lens unit I and the second lens unit II is increased, while a second variable air space formed between the second lens unit II and the third lens unit III is decreased.

The above-mentioned zoom lens system comprising three lens units is referred to as a basic zoom lens system of the present invention.

As a first feature of the present invention, the third lens unit III of the basic zoom lens system includes at least an aspherical surface. The aspherical surface fulfills the following condition:

$$\frac{|X| - |X_0|}{C_0(N' - N)} > \Box \quad (1)$$

wherein, $C_0$ represents the curvature of the standard spherical surface of the aspherical surface, X represents the distance along the optical axis from an intersection of the standard spherical surface and the optical axis of the lens system to the aspherical surface at the height from the optical axis Y and is expressed as the following equation:

$$X = X_0 + \sum_i A_{2i} Y^{2i},$$

$X_0$ represents the distance along the optical axis from the intersection to the standard spherical surface at the height Y and is expressed as the following equation: $X_0 = C_0 Y^2 / \{1 + (1 - C_0^2 Y^2)\}$, $A_{2i}$ represent the aspherical coefficients, N represents the refractive index of the media at the object side of the aspherical surface, and N' represents the refractive index of the media at the image side of the aspherical surface.

Condition (1) relates to a refractive power of the aspherical surface. In case where said aspherical surface has a positive refractive power and the condition (1) is fulfilled, said positive refractive power becomes stronger with the height Y. Further, in case where said aspherical surface has a negative refractive power and the condition (1) is fulfilled, said negative refractive power becomes weaker with the height Y. As for a center of the aspherical surface, where there is little influence on the spherical aberration, there is no problem even if the condition (1) is a little violated.

Even if the third lens unit III as a whole has a relatively strong negative refractive power, the refractive power becomes relatively weak with the height Y. Because an aspherical surface with a negative refractive power included in the third lens unit III fulfills the condition (1). The application of the aspherical surface defined by the condition (1) to a surface having a negative refractive power in the third lens unit III results that the positive distortion appearing in the longer focal length condition and the change of comatic aberration during the zooming are sufficiently corrected. It is because an paraxial luminous flux passes, except in the longer focal length condition, through the third lens unit III at a relatively low height Y, while an off-axial luminous flux passes through it at a relatively high height Y.

Another feature of the present invention is that the second lens unit II of the basic zoom lens system includes at least an aspherical surface. The aspherical surface fulfills the following condition:

$$\frac{|X| - |X_0|}{C_0(N' - N)} < \Box \quad (2)$$

Condition (2), as well as condition (1), relates to the refractive power of the aspherical surface. In case where said aspherical surface has a positive refractive power and the condition (2) is fulfilled, said positive refractive power becomes weaker with the height Y. On the other hand, in case where said aspherical surface has a negative refractive power and the condition (2) is fulfilled, said negative refractive power becomes stronger with the height Y. As for a portion of the aspherical surface around the optical axis, where there is little influence on the spherical aberration, there is no problem practically if the condition (2) is a little violated.

Even though the second lens unit II as a whole has a relatively strong positive refractive power, the refractive power at a high height Y is relatively weak. Because an aspherical surface with a positive refractive power included in the second lens unit II fulfills the condition (2). The spherical aberration and the change of comatic aberration during the zooming are well corrected, applying the aspherical surface defined by the condition (2) to the second lens unit II. It is because an paraxial luminous flux passes through the second lens unit II at a relatively high height Y, while an off-axial luminous flux passes at a relatively low height Y.

According to the present invention, it is desirable to fulfill the following conditions:

$$0.20 < (L_2/FM) \cdot (fS/fL) < 0.50 \quad (3)$$

$$0.15 < (L_2 - L_2')/FM < 0.60 \quad (4)$$

wherein, $L_2$ represents the length from the surface of the object side end of the second lens unit II to a film and $L_2'$ represents the length from the surface of the image side end of the second lens unit II to a film in the shortest focal length condition, FM represents the diagonal length of the frame of the film, fS represents the focal length of the whole lens system in the shortest focal length condition, and fL represents the focal length of the whole lens system in the longest focal length condition.

Condition (3) is for keeping the compactness of the whole lens system while magnifying the zoom ratio.

If the upper limit of condition (3) is violated, the desirable compactness of the whole lens system, which is one of the objects of the present invention, can not be achieved because the total length of the whole lens system becomes too much long.

If the lower limit of condition (3) is violated, in case where the zoom ratio is large, the back focal distance becomes short. Further, the diameter of the third lens unit III becomes large or the respective lengths of the second and third lens units II and III become extremely short. In the present invention, the zoom lens system with a high ratio includes a range of a wide angle of view. If the respective lengths of the second and third lens units II and III becomes short, it becomes difficult to correct the spherical aberration and the curvature of field in the middle focal length condition in spite of various aberrations in the shortest and longest focal length condition being corrected.

Condition (4), under the condition (3), is for keeping the compactness of the whole lens system as well as a high optical performance.

If the upper limit of the condition (4) is violated and the thickness of the second lens unit II increases, a compact zoom lens system cannot be achieved easily. On the other hand, if the lower limit of the condition (4) is violated, it becomes difficult to correct the changes of various aberrations during the zooming, especially the spherical aberration and the comatic aberration.

Alternative to the above condition (4), it is preferable to fulfill the following condition (4'):

$$0.15 < (L_2 - L_2')/FM < 0.60 \qquad (4')$$

According to the present invention, it is moire desirable to fulfill the following condition:

$$0.10 < f_2/fL < 0.60 \qquad (5)$$

wherein, $f_2$ represents the focal length of the second lens unit II.

Condition (5) defines the refractive power of the second lens unit II. If the upper limit of the condition (5) is violated and the refractive power of the second lens unit II becomes weak, a paraxial luminous flux passes through the third lens unit III at a relatively high height Y and the back focal distance becomes too long. Consequently, the compactness of the whole lens system cannot be achieved. Contrarily, the lower limit of the condition (5) is violated and the refractive power of the second lens unit II becomes too strong, much aberrations appear in the second lens unit II. Especially, the spherical aberration in the shorter focal length condition cannot be well corrected. And what is worse, the back focal distance becomes so short that the diameter of the third lens unit III becomes large in order to keep enough illumination in the shorter focal length condition.

Further, it is desirable to fulfill the following conditions:

$$1.60 < \beta L_3/\beta S_3 < 5.00 \qquad (6)$$

$$0.08 < |f_3/fL| < 0.45 \qquad (7)$$

$$0.25 < (D_{12}L - D_{12}S)/fS < 1.10 \qquad (8)$$

wherein, $\beta L_3$ represents the lateral magnification of the third lens unit III in the longest focal length condition, $\beta S_3$ represents the lateral magnification of the third lens unit III in the shortest focal length condition, $f_3$ represents the focal length of the third lens unit III, $D_{12}L$ represents the airspace between the first and the second lens units I and II in the longest focal length condition, and $D_{12}S$ represents the airspace between the first and the second lens units I and II in the shortest focal length condition.

Condition (6) defines the zooming effect of the third lens unit III. If the upper limit of the condition (6), the refractive power of the third lens unit III becomes strong or the shifting amount of the third lens unit III becomes large. In the former case, it is impossible to achieve the third lens unit III with relatively simple construction. In the latter case, the compactness of the whole lens system including a lens-barrel cannot be obtained easily because the total length of the whole lens system becomes long in the longest focal length condition as well as the changes of aberrations during the zooming becomes great. If the lower limit of the condition (6) is violated, the burden for the zooming effect of the second lens unit II is too much increased.

The refractive power of the third lens unit III is defined by the condition (7). If the upper limit of the condition (7) is violated and the refractive power of the third lens unit III is deceased, the shifting amount of the third lens unit III is increased for the purpose of obtaining a desired zoom ratio. Therefore, the compactness of the whole lens system including a lens-barrel cannot be achieved easily. If the lower limit of the condition (7) is violated and the refractive power of the third lens unit III is increased, too much aberrations appear in the third lens unit III. Consequently, it becomes difficult to sufficiently correct the distortion and the change of comatic aberration during the zooming, even though an aspherical surface is utilized in the third lens unit III.

Condition (8) relates to the change of the airspace between the first and the second lens units I and II in the zooming operation. It is difficult to sufficiently correct the changes of aberrations, especially the spherical aberration and the comatic aberration, during the zooming if the upper limit of the condition (8) is violated. Further, the airspace between the first and the second lens units I and II in the shortest focal length condition is too much increased. So the diameter of the first or the third lens unit I or III becomes too large to prevent image fall-off, resulting difficulty of the compactness of the whole lens system. Or, if the lower limit of the condition (8) is violated, the change of the airspace distance between the first and the second lens units I and II during the zooming is decreased. Therefore, it is difficult to increase the zoom ratio.

As for a lens element including an aspherical surface, it is preferable to fulfill the following condition:

$$Nd < 1.6, \nu d < 60 \qquad (9)$$

wherein, Nd represents the refractive index of a lens element which includes an aspherical surface, and d represents the Abbe number of the lens element which includes the aspherical surface. It is favorable to employ a plastic lens element which fulfills the condition (9) as a lens element including an aspherical surface in the third lens unit III, resulting in a big labor saving on a manufacturing process.

A method for focusing of the above-mentioned basic zoom lens system will be described. According to the present invention, the focusing operation can be carried out by shifting the second lens unit II or the third lens unit III.

In case where the third lens unit III dose the focusing operation, the third lens unit III shifts from the object side to the image side in the focusing operation to the closer object and fulfills the following conditions:

$$0.2 < \frac{(\beta L_3^2 - 1) \times fS^2}{(\beta S_3^2 - 1) \times fL^2} < 1.2 \qquad (10)$$

$$0.2 < \frac{(\beta L_3^2 - 1) \times fM^2}{(\beta M_3^2 - 1) \times fL^2} < 1.2 \qquad (11)$$

wherein, fM represents the focal length of the whole lens system in the middle focal length condition defined by a formula $$\sqrt{fL \times fS} \, ,$$

and $\beta M_3$ represents the lateral magnification of the third lens unit III in the middle focal length condition.

In case where the second lens unit II does the focusing operation, the second lens unit II shifts from the image side to the object side in the focusing operation to the closer object and fulfills the following conditions:

$$0.5 < \frac{(\beta L_2{}^2 - 1) \times \beta S_2{}^2}{(\beta S_2{}^2 - 1) \times \beta L_2{}^2} \cdot \frac{fL}{fS} < 1.5 \quad (12)$$

$$0.4 < \frac{(\beta L_2{}^2 - 1) \times \beta M_2{}^2}{(\beta M_2{}^2 - 1) \times \beta L_2{}^2} \cdot \frac{fL}{fM} < 1.2 \quad (13)$$

wherein, $\beta L_2$ represents the lateral magnification of the second lens unit II in the longest focal length condition, $\beta S_2$ represents the lateral magnification of the second lens unit II in the shortest focal length condition, and $\beta M_2$ represents the lateral magnification of the second lens unit II in the middle focal length condition.

The above conditions (10) to (13) are for defining the shifting amount of the focusing lens unit in the focusing operation for each focal length, when the third lens unit III or the second lens unit II is utilized for the focusing operation.

In U.S. Pat. No. 4,636,040 by the applicant for the present invention, it is described that a value of P (which is mentioned later) should be almost constant during the zooming so that the shifting amount of the focusing lens unit for focusing to the same object from the in-focus condition for infinity object may be almost constant during the zooming:

$$P = \frac{fA^2 \cdot \beta F^2}{\beta F^2 - 1}$$

wherein, fA represents the compound focal length of the lens group located at the object side of the focusing lens unit, and $\beta F$ represent the focal length of the focusing lens unit.

If the value of P is always constant during the zooming, the shifting amount of the third lens unit III for focusing to the same object is almost invariable regardless the change of the focal length. Therefore, the shifting amount of the third lens unit III in the focusing operation for each focal length can be compared by comparing each value of P for each focal length.

If the third lens unit III functions as a focusing lens unit, a value of P for any focal length f is:

$$\frac{f^2}{2-1}$$

Condition (10) relates to the ratio of the shifting amount of the third lens unit III in the focusing operation to the same object from the shortest focal length to the longest focal length. Condition (11) relates to the ratio of the shifting amount of the third lens unit III in the focusing operation to the same object from the middle focal length to the longest focal length.

Contrarily, if the second lens unit II functions as a focusing lens unit, a value of P for any focal length f is:

$$P = \frac{f_1{}^2 \cdot \beta_2{}^2}{\beta_2 - 1}$$

Therefore, the ratio of P for the shortest focal length to that for the longest focal length is:

$$(\beta L_2{}^2 - 1) \cdot \beta S_2{}^2$$

-continued $$(\beta S_2{}^2 - 1) \cdot \beta L_2$$

Multiplying the above ratio by fL/fS, i.e., the ratio of focal length for the longest focal length to that for the shortest focal length, and the product is the condition (12). That is to say, the condition (12) as well as the condition (10) relates to the ratio of the shifting amount in the focusing operation to the same object for the shortest focal length to that for the longest focal length. The condition (13) as well as the condition (11) relates to the ratio of the shifting amount in the focusing operation to the same object for the middle focal length to that for the longest focal length.

If the upper limit of the conditions (10) to (13) is violated, the shifting amount in the focusing operation to the same object for the shortest and the middle focal length is excessive comparing with that for the longest focal length. If the lower limit thereof is violated, the shifting amount in the focusing operation to the same object for the shortest and the middle focal length is too small comparing with that for the longest focal length. In any case, some method for correcting the shifting amount in the focusing operation to the same object in accordance with each focal length is required. As for a conventional automatic focusing camera, the restriction against a correcting method is drastically eased. But, if the ratio of the shifting amount is quite excessive, the correcting method becomes complicated and the compactness of a camera body cannot be achieved easily.

In relation to the condition (10) and (11), more desirable conditions are as follows:

$$0.8 < \frac{(\beta L_3{}^2 - 1) \times fS^2}{(\beta S_3{}^2 - 1) \times fL^2} < 1.2 \quad (10')$$

$$0.8 < \frac{(\beta L_3{}^2 - 1) \times fM^2}{(\beta M_3{}^2 - 1) \times fL^2} < 0.95 \quad (11')$$

Fulfilling the above conditions (10') and (11'), the shifting amount in the focusing operation to the same object for the longest focal length is applicable for all focal length. In other words, if a radius of permissible circle of confusion is about from 0.033 mm to 0.066 mm, the changing position of image plane during the zooming is within a depth of focus, keeping a practical F-number and a practical shortest object distance. As a result, it is unnecessary to correct the position of the third lens unit III, in the zooming operation resulting the compactness and simplification of the whole camera system.

Further, if the third lens unit III functions as a focusing lens unit, it is favorable that the following conditions are fulfilled:

$$0.2 < \Delta dS/\Delta dL < 1.5 \quad (14)$$

$$0.2 < \Delta dM/\Delta dL < 1.5 \quad (15)$$

On the other hand, if the second lens unit II functions as a focusing lens unit, it is desirable that the following conditions are satisfied:

$$0.6 < (\Delta dS/\Delta dL) \cdot (fL/fS) < 4.0 \quad (16)$$

$$0.4 < (\Delta dM/\Delta dL) \cdot (fL/fM) < 3.5 \quad (17)$$

wherein, $\Delta dL$, $\Delta dM$ and $\Delta dS$ respectively represent the shifting amount of the focusing lens unit for the longest, middle and shortest focal length from the condition to focus on the infinity to the condition to focus on a closer object located at such an object distance that the magnification ratio for the longest focal length is 1/10.

The conditions (14) to (17) as well as the conditions (10) to (13) define the ratio of the shifting amount, in the focusing operation to the same object, of the focusing lens unit, so as to realize the compactness and the simplification of the camera system.

The problems, which appears in case the upper or the lower limit being violated, are the same as mentioned relating to the conditions (10) to (13).

By the way, it is necessary for a practical focusing operation that the largest magnification exceeds $|\beta|=1/10$ for focusing to the closest object.

In addition to the above-mentioned conditions (14) to (17), it is more favorable to satisfy the following conditions:

$$0.2 < \Delta dS/\Delta dL < 1.3 \quad (14')$$

$$0.2 < \Delta dM/\Delta dL < 0.95 \quad (15')$$

$$0.6 < (\Delta dS/\Delta dL)\cdot(fL/fS) < 1.5 \quad (16')$$

$$0.4 < (\Delta dM/\Delta dL)\cdot(fL/fM) < 1.25 \quad (17')$$

In case where the second lens unit II functions as a focusing lens unit, it is desirable a diaphragm is arranged at the object side end or the image side end of the second lens unit II. Consequently, the second lens unit II and the diaphragm are able to be driven by the drive source, i.e., motor. What is more, only relatively small drive is required for the focusing operation because there is no need to move the diaphragm in the focusing operation. On the other hand, provided that the diaphragm is arranged inside of the focusing lens unit, the diaphragm together with the focusing lens unit should be moved for the focusing operation. Therefore, relatively strong drive is required for the focusing. And what is worse, it is difficult to arrange lens elements of the second lens unit II precisely at both object and image sides of the diaphragm, resulting in appearance of decentering. Accordingly, the compactness and the simplification of the lens system and the camera body can be achieved by arranging the diaphragm at the object side end or the image side end of the second lens unit II.

A zoom lens system including a diaphragm in the second lens unit II thereof is required to fulfill the following condition:

$$0.03 < (L_2 - L_2')/fL < 0.30 \quad (18)$$

The condition (18) describes the thickness of the second lens unit II comparing with the focal length of the whole lens system for the longest focal length condition (fL). If the upper limit of the condition (18) is violated, the image fall-off is caused when the diaphragm is stopped down. If the lower limit of the condition (18) is violated and the thickness of the second lens unit II is too thin, the changes of aberrations during the zooming, especially the spherical aberration and the comatic aberration are not corrected sufficiently even though an aspherical surface is utilized within the second lens unit II.

In relation to the condition (18), more desirable condition is follows:

$$0.03 < (L_2 - L_2')/fL < 0.18 \quad (18')$$

It is favorable to apply an aspherical surface in the second lens unit II or the third lens unit III to the basic zoom lens system of the present invention having the above-mentioned focusing method. If the third lens unit III functions as a focusing lens unit, an aspherical surface is to be in the third lens unit III. If the second lens unit II functions as a focusing lens unit, an aspherical surface is to be in the second lens unit II. The focusing lens unit includes an aspherical surface, resulting that the changes of aberrations in the focusing operation are held down. Further, an aspherical surface included in the third lens unit III fulfills the condition (1) while an aspherical surface included in the second lens unit II fulfills the condition (2). And it is more desirable to satisfy the conditions (3) to (9) for the basic zoom lens system having the above-mentioned focusing method.

According to the present invention, a preferable construction of each lens unit is as follows.

The first lens unit I includes at least a positive lens element and a negative lens element and has a relatively strong refractive power. The shifting amount of the first lens unit I for the zooming operation is to be restricted as little as possible. The third lens unit III includes at least a positive lens element and a negative lens element, so the chromatic aberration during the zooming, especially the lateral chromatic aberration is well corrected. In the zooming operation, the first lens unit I and the third lens unit III shift in a linked body while the second lens unit II shifts separately. This shifting method is advantageous to the construction of the lens barrel, comparing with a conventional shifting method where each lens unit shifts separately. the appended claims.

The following Tables 1 to 14 disclose, respectively, the first to third embodiments of the present invention. In the Tables, f equals the focal length, r is the radius of curvature with respective sub numbers indicating the surfaces from the object to image side along the optical axis, d represents the axial distance and includes both the air spaces and the actual thickness of the lenses along the optical axis, N equals the refractive index and again, the sub numbers refer to the lens element from the object to image side, and finally, equals the Abbe number and the sub numbers refer to the lens elements from the object to image side.

The first to eighth and twelfth to fourteenth embodiments, respectively, have an aspherical surface in each of the second and third lens unit II and III. And ninth embodiment have only one aspherical surface in the second lens unit II, while tenth and eleventh embodiments have only one aspherical surface in the third lens unit III.

Figure 63A:
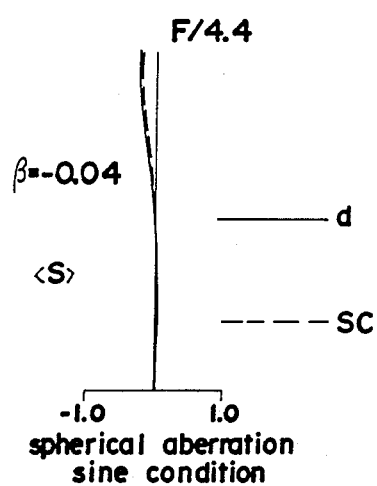
FIGS. 63a, 63b and 63c represent the aberration curves of the seventh embodiment for the shortest focal length in the closest object focusing condition when the third lens unit fanctions as the focusing lens unit.
Figure 63B:
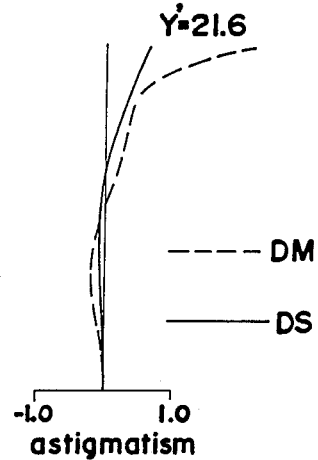
Figure 63C:
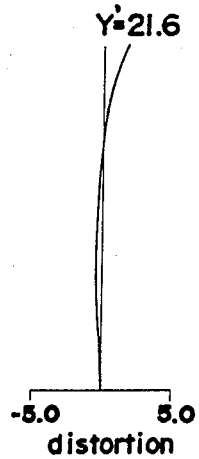
Figure 64A:
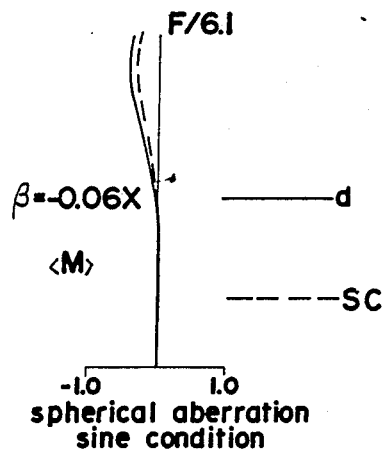
FIGS. 64a, 64b and 64c represent the aberration curves of the seventh embodiment for the middle focal length in the closest object focusing condition when the third lens unit fanctions as the focusing lens unit.
Figure 64B:
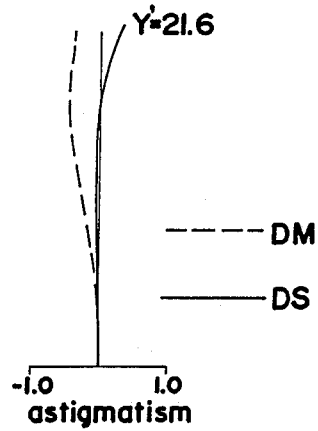
Figure 64C:
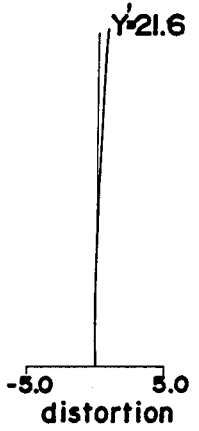
Figure 65A:
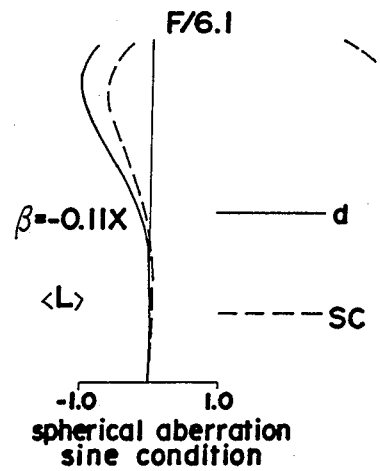
FIGS. 65a, 65b and 65c represent the aberration curves of the seventh embodiment for the longest focal length in the closest object focusing condition when the third lens unit fanctions as the focusing lens unit.
Figure 65B:
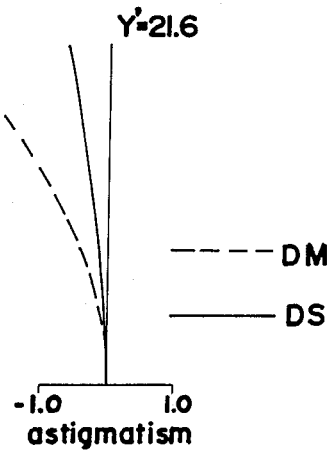
Figure 65C:
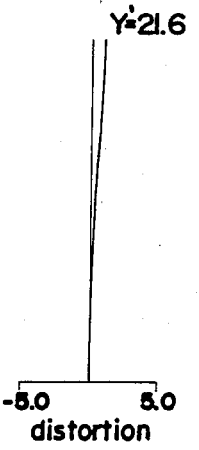
Figure 69A:
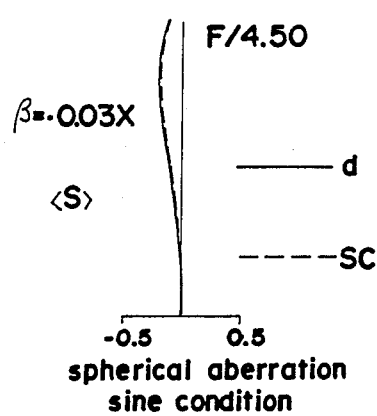
FIGS. 69a, 69b and 69c represent the aberration curves of the twelfth embodiment for the shortest focal length in the closest object focusing condition when the third lens unit fanctions as the focusing lens unit.
Figure 69B:
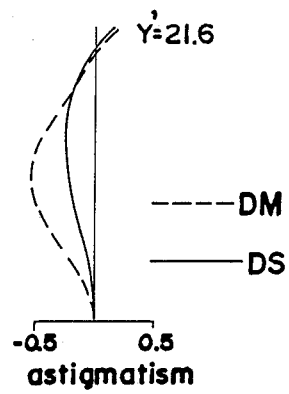
Figure 69C:
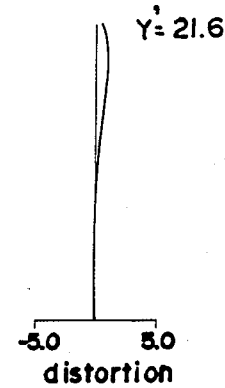
Figure 70A:
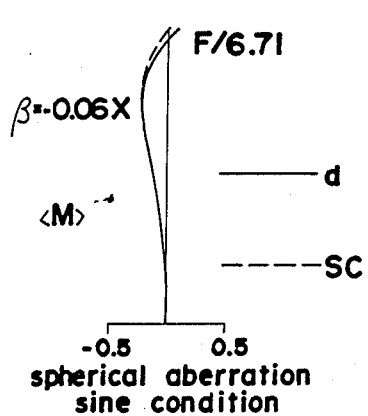
FIGS. 70a, 70b and 70c represent the aberration curves of the twelfth embodiment for the middle focal length in the closest object focusing condition when the third lens unit fanctions as the focusing lens unit.
Figure 70B:
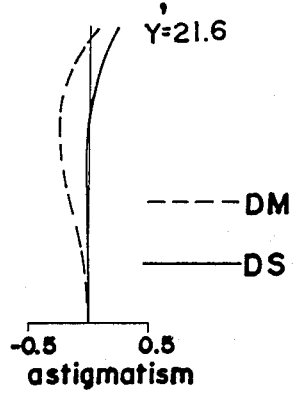
Figure 70C:
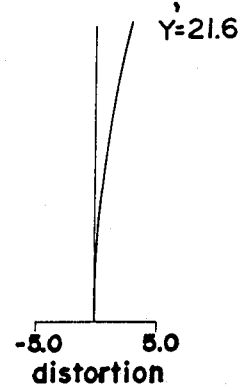
Figure 71A:
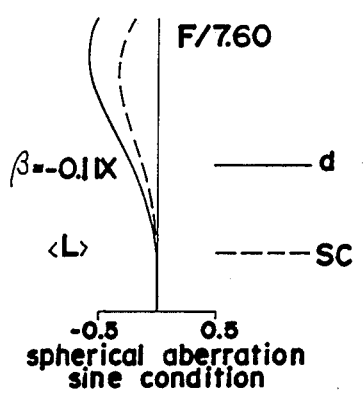
FIGS. 71a, 71b and 71c represent the aberration curves of the twelfth embodiment for the longest focal length in the closest object focusing condition when the third lens unit fanctions as the focusing lens unit.
Figure 71B:
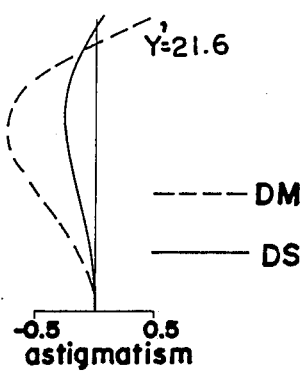
Figure 71C:
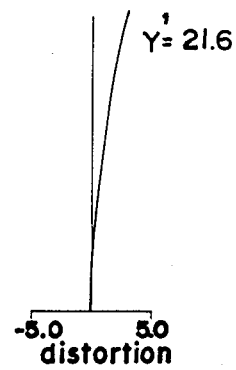
Figure 72A:
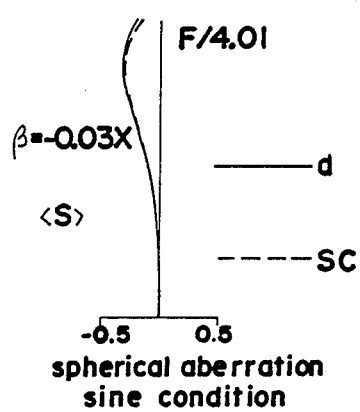
FIGS. 72a, 72b and 72c represent the aberration curves of the thirteenth embodiment for the shortest focal length in the closest object focusing condition when the third lens unit fanctions as the focusing lens unit.
Figure 72B:
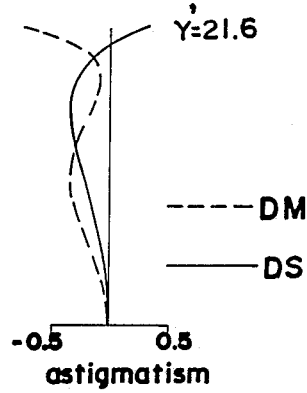
Figure 72C:
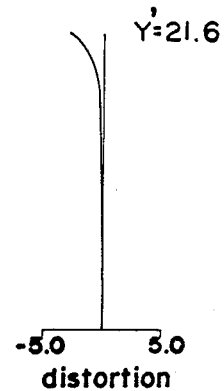
Figure 73A:
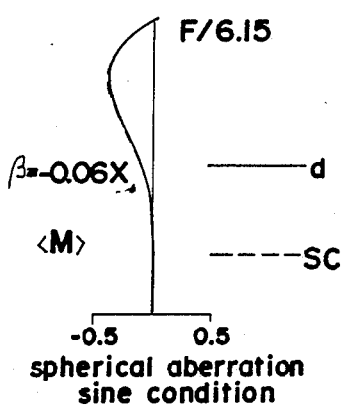
FIGS. 73a, 73b and 73c represent the aberration curves of the thirteenth embodiment for the middle focal length in the closest object focusing condition when the third lens unit fanctions as the focusing lens unit.
Figure 73B:
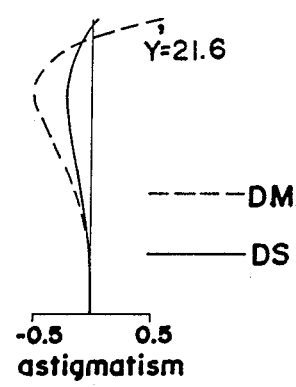
Figure 73C:
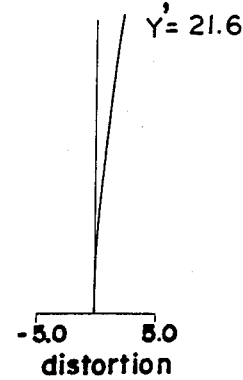
Figure 74A:
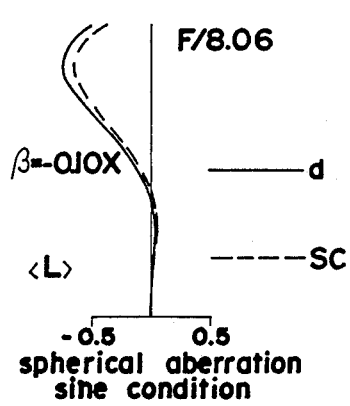
FIGS. 74a, 74b and 74c represent the aberration curves of the thirteenth embodiment for the longest focal length in the closest object focusing condition when the third lens unit fanctions as the focusing lens unit.
Figure 74B:
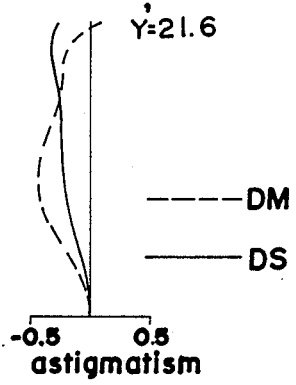
Figure 74C:
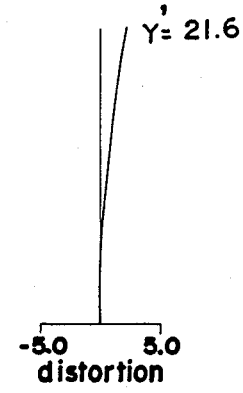
Figure 75A:
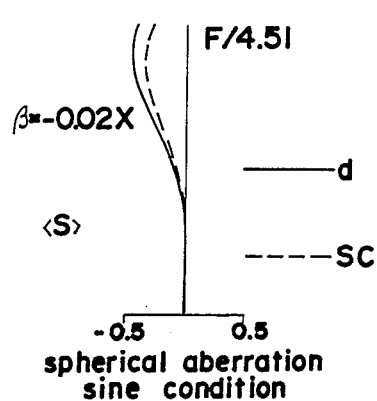
FIGS. 75a, 75b and 75c represent the aberration curves of the fourteenth embodiment for the shortest focal length in the closest object focusing condition when the third lens unit fanctions as the focusing lens unit.
Figure 75B:
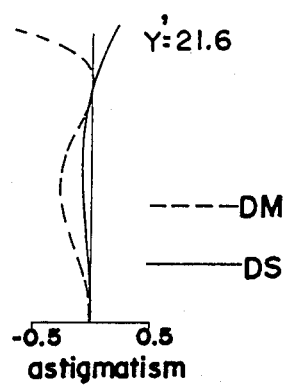
Figure 75C:
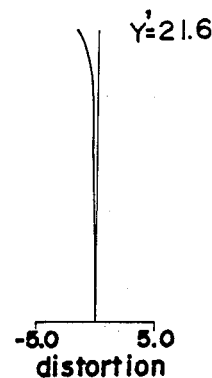
Figure 76A:
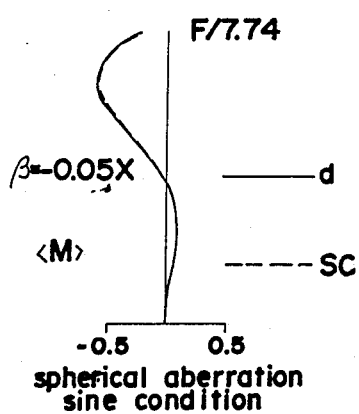
FIGS. 76a, 76b and 76c represent the aberration curves of the fourteenth embodiment for the middle focal length in the closest object focusing condition when the third lens unit fanctions as the focusing lens unit.
Figure 76B:
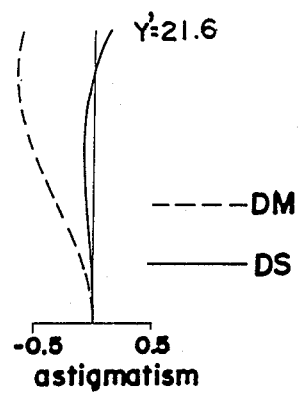
Figure 76C:
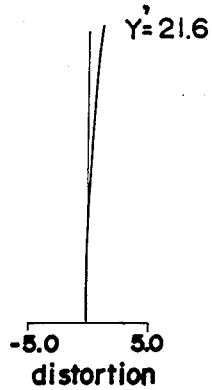
Figure 77A:
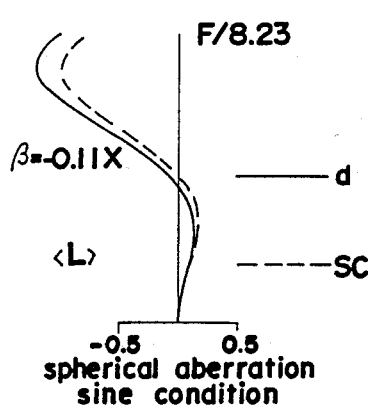
FIGS. 77a, 77b and 77c represent the aberration curves of the fourteenth embodiment for the longest focal length in the closest object focusing condition when the third lens unit fanctions as the focusing lens unit.
Figure 77B:
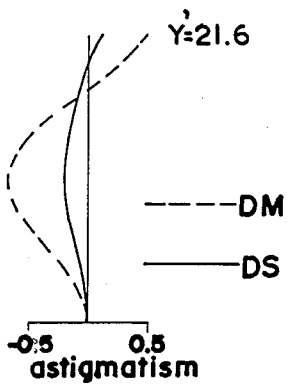
Figure 77C:
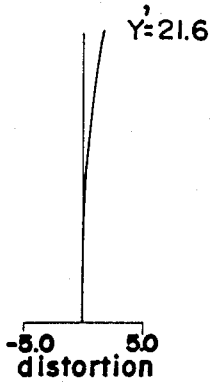
Figure 81A:
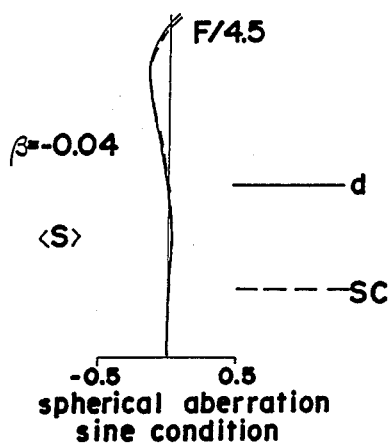
FIGS. 81a, 81b and 81c represent the aberration curves of the third embodiment for the shortest focal length in the closest object focusing condition when the second lens unit fanctions as the focusing lens unit.
Figure 81B:
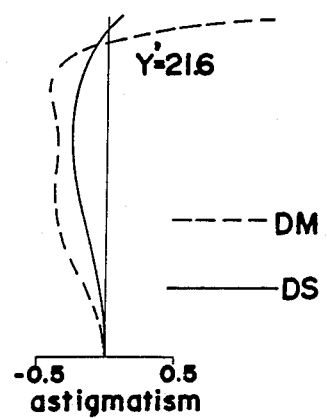
Figure 81C:
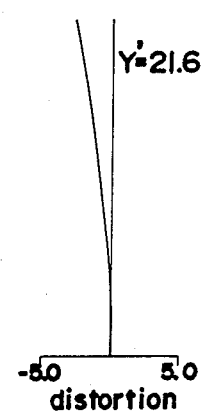
Figure 82A:
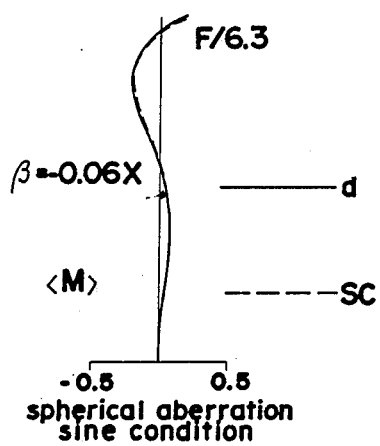
FIGS. 82a, 82b and 82c represent the aberration curves of the third embodiment for the middle focal length in the closest object focusing condition when the second lens unit fanctions as the focusing lens unit.
Figure 82B:
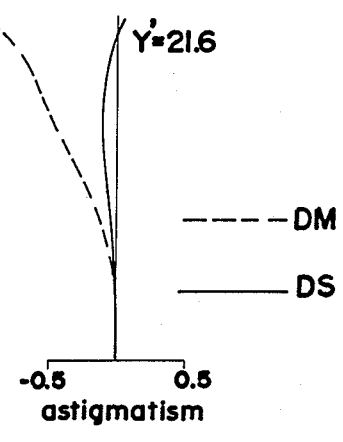
Figure 82C:
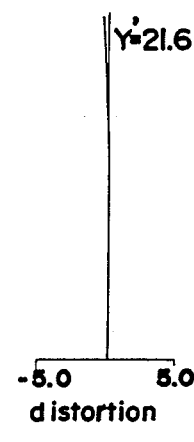
Figure 83A:
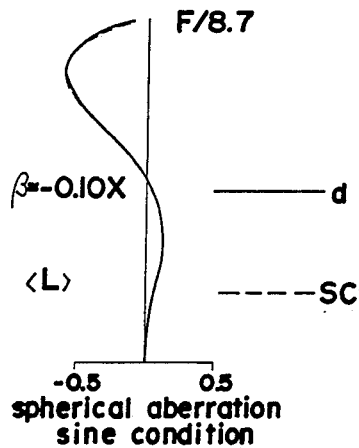
FIGS. 83a, 83b and 83c represent the aberration curves of the third embodiment for the longest focal length in the closest object focusing condition when the second lens unit fanctions as the focusing lens unit.
Figure 83B:
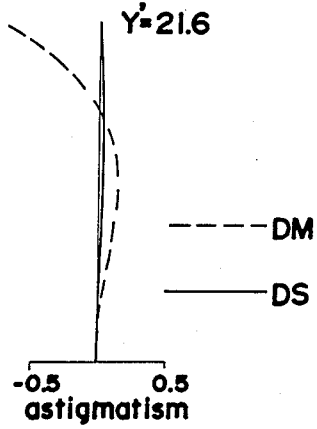
Figure 83C:
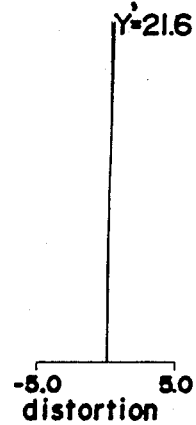
Figure 84A:
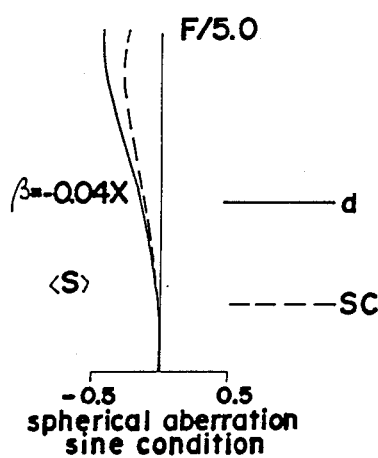
FIGS. 84a, 84b and 84c represent the aberration curves of the fifth embodiment for the shortest focal length in the closest object focusing condition when the second lens unit fanctions as the focusing lens unit.
Figure 84B:
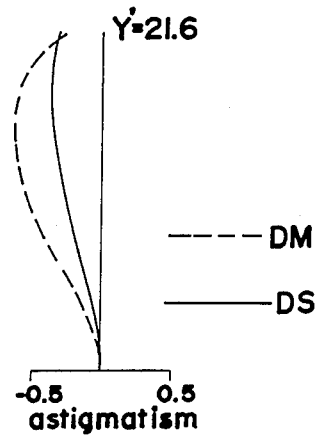
Figure 84C:
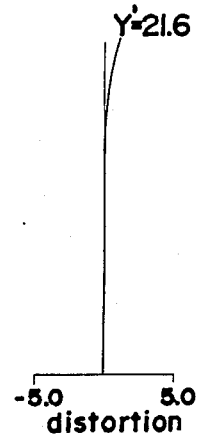
Figure 85A:
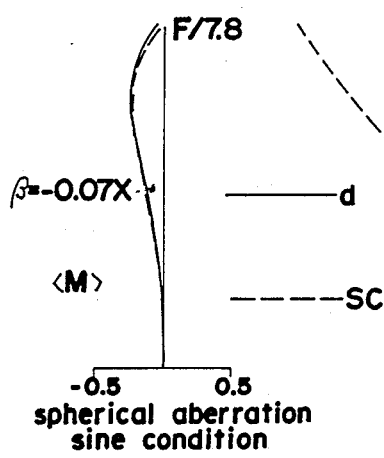
FIGS. 85a, 85b and 85c represent the aberration curves of the fifth embodiment for the middle focal length in the closest object focusing condition when the second lens unit fanctions as the focusing lens unit.
Figure 85B:
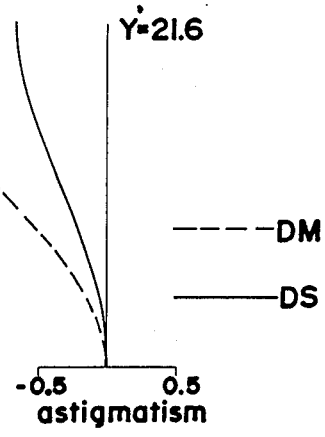
Figure 85C:
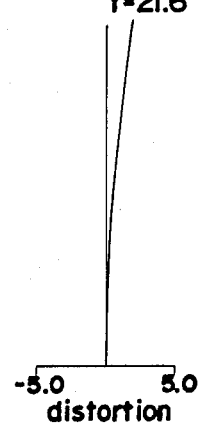
Figure 86A:
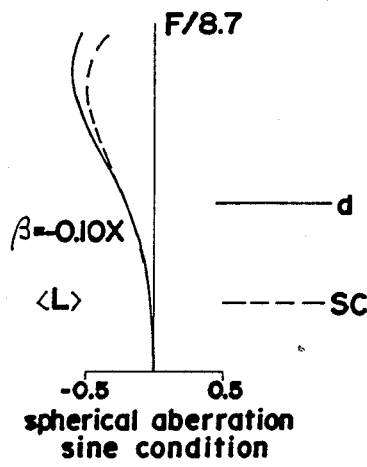
FIGS. 86a, 86b and 86c represent the aberration curves of the fifth embodiment for the longest focal length in the closest object focusing condition when the second lens unit fanctions as the focusing lens unit.
Figure 86B:
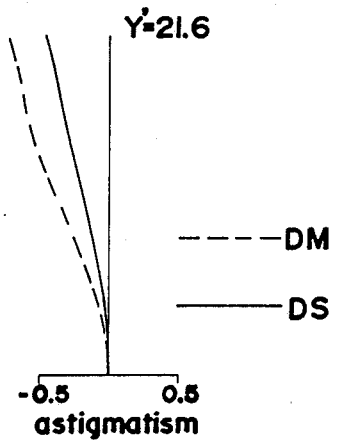
Figure 86C:
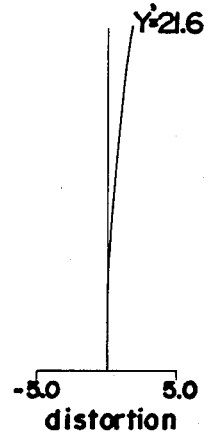
Figure 87A:
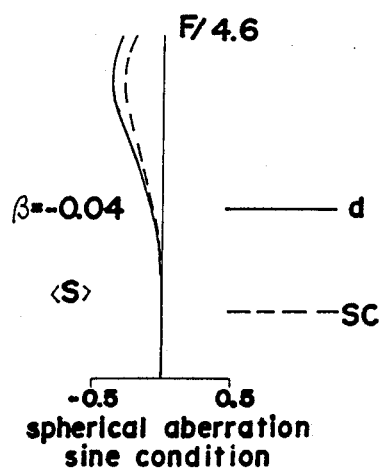
FIGS. 87a, 87b and 87c represent the aberration curves of the sixth embodiment for the shortest focal length in the closest object focusing condition when the second lens unit fanctions as the focusing lens unit.
Figure 87B:
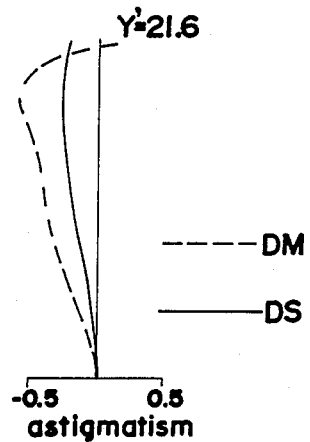
Figure 87C:
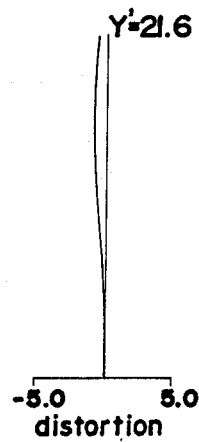
Figure 88A:
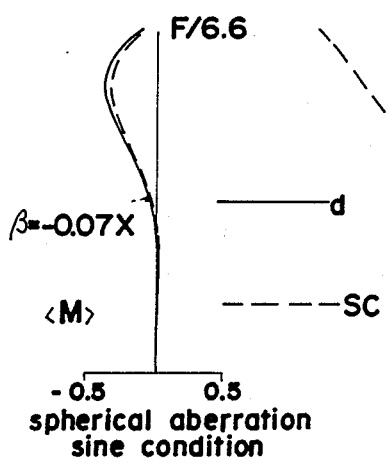
FIGS. 88a, 88b and 88c represent the aberration curves of the sixth embodiment for the middle focal length in the closest object focusing condition when the second lens unit fanctions as the focusing lens unit.
Figure 88B:
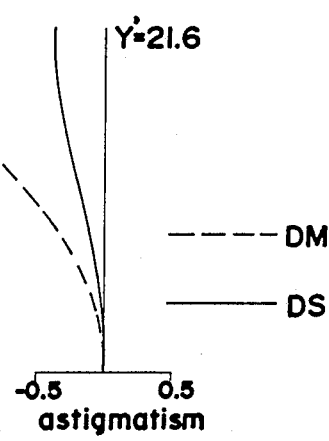
Figure 88C:
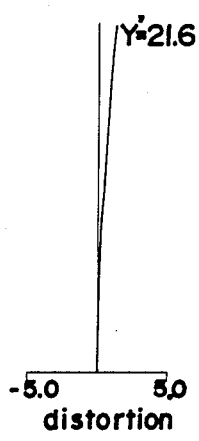
Figure 89A:
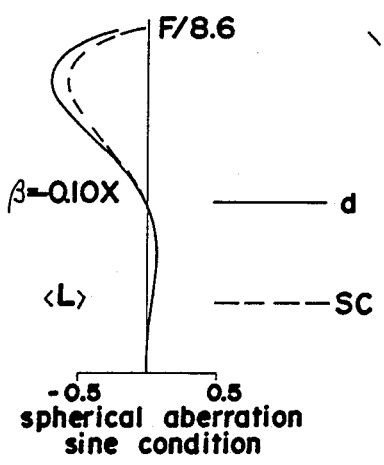
FIGS. 89a, 89b and 89c represent the aberration curves of the sixth embodiment for the longest focal length in the closest object focusing condition when the second lens unit fanctions as the focusing lens unit.
Figure 89B:
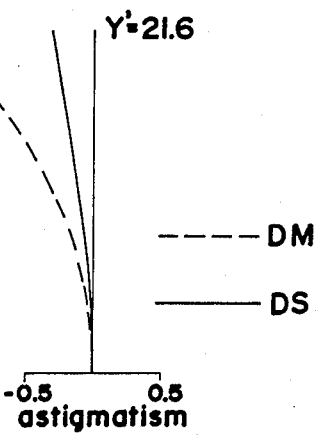
Figure 89C:
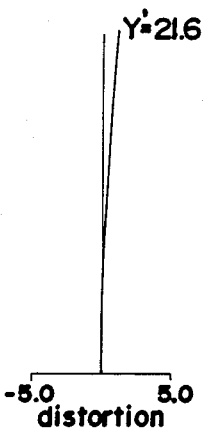
Figure 93A:
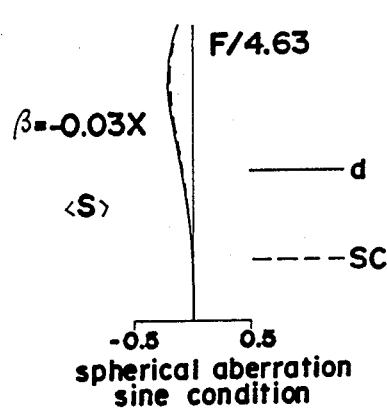
FIGS. 93a, 93b and 93c represent the aberration curves of the twelfth embodiment for the shortest focal length in the closest object focusing condition when the second lens unit fanctions as the focusing lens unit.
Figure 93B:
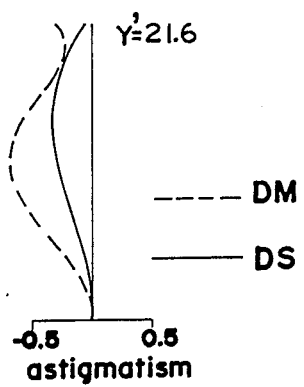
Figure 93C:
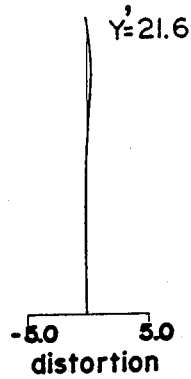
Figure 94A:
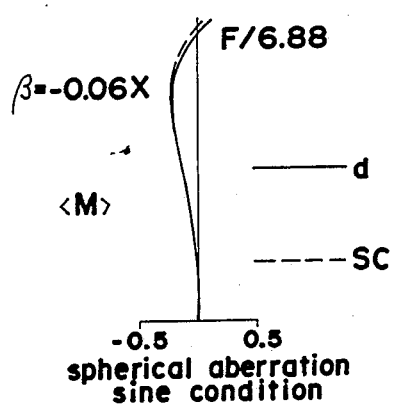
FIGS. 94a, 94b and 94c represent the aberration curves of the twelfth embodiment for the middle focal length in the closest object focusing condition when the second lens unit fanctions as the focusing lens unit.
Figure 94B:
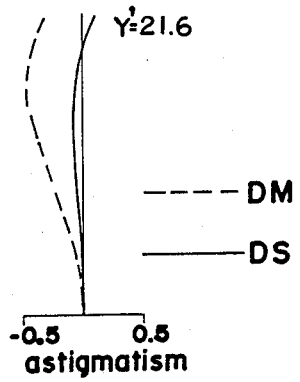
Figure 94C:
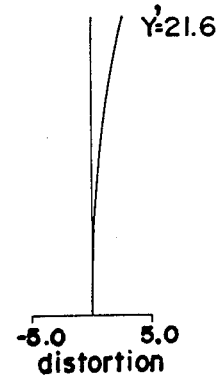
Figure 95A:
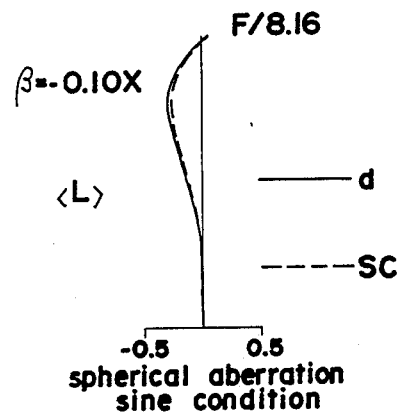
FIGS. 95a, 95b and 95c represent the aberration curves of the twelfth embodiment for the longest focal length in the closest object focusing condition when the second lens unit fanctions as the focusing lens unit.
Figure 95B:
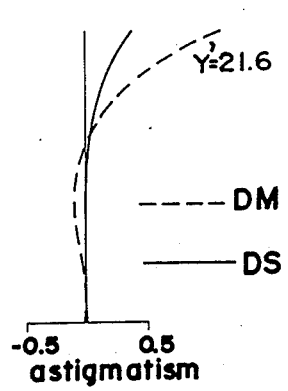
Figure 95C:
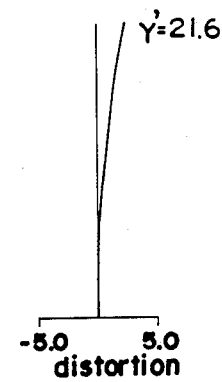
Figure 96A:
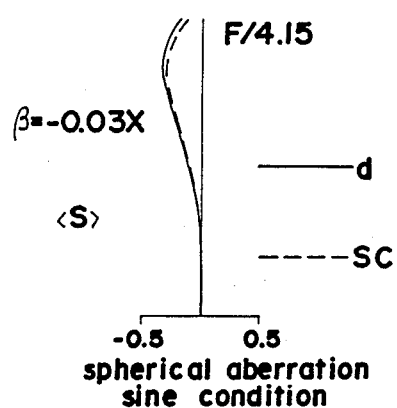
FIGS. 96a, 96b and 96c represent the aberration curves of the thirteenth embodiment for the shortest focal length in the closest object focusing condition when the second lens unit fanctions as the focusing lens unit.
Figure 96B:
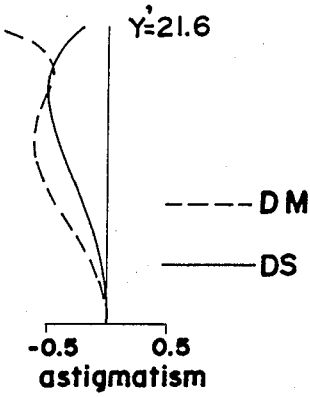
Figure 96C:
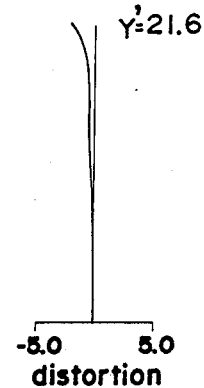
Figure 97A:
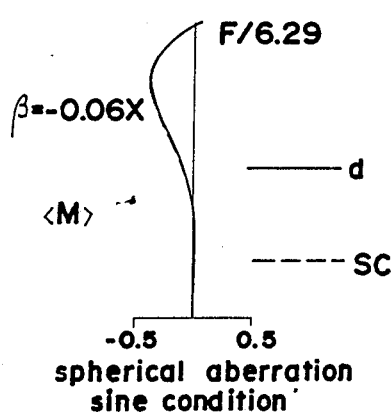
FIGS. 97a, 97b and 97c represent the aberration curves of the thirteenth embodiment for the middle focal length in the closest object focusing condition when the second lens unit fanctions as the focusing lens unit.
Figure 97B:
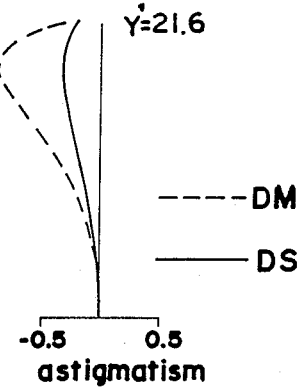
Figure 97C:
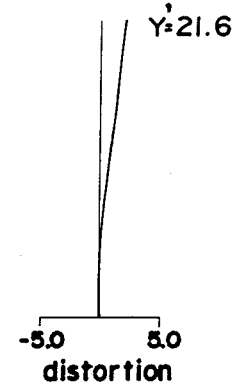
Figure 98A:
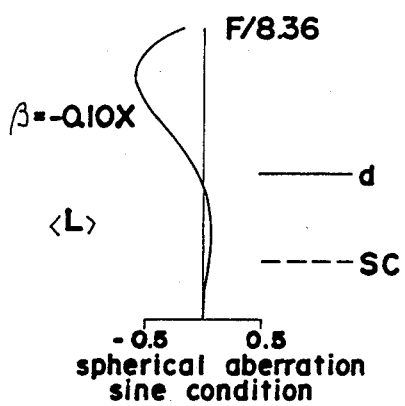
FIGS. 98a, 98b and 98c represent the aberration curves of the thirteenth embodiment for the longest focal length in the closest object focusing condition when the second lens unit fanctions as the focusing lens unit.
Figure 98B:
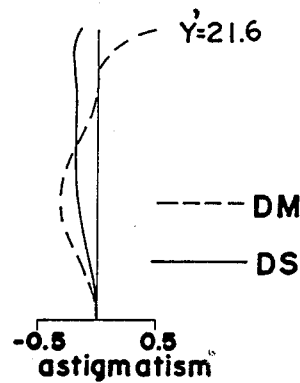
Figure 98C:
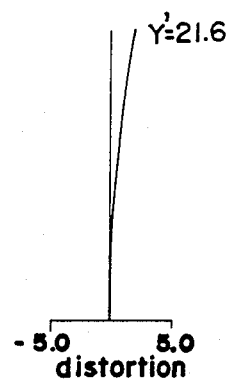
Figure 99A:
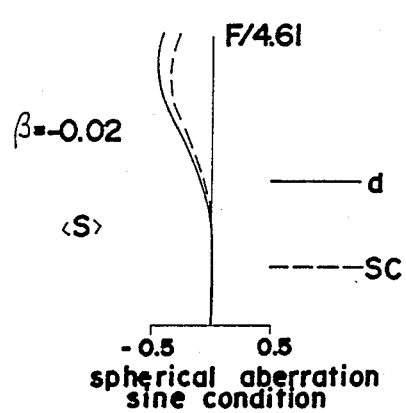
FIGS. 99a, 99b and 99c represent the aberration curves of the fourteenth embodiment for the shortest focal length in the closest object focusing condition when the second lens unit fanctions as the focusing lens unit.
Figure 99B:
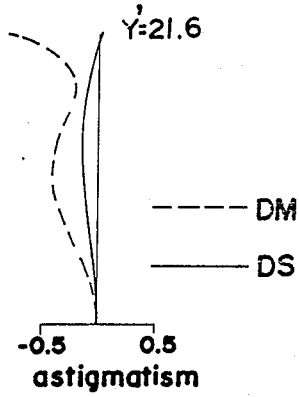
Figure 99C:
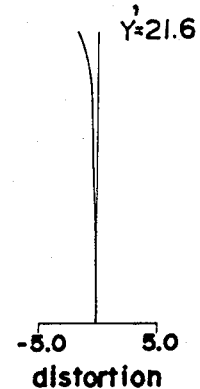
Figure 100A:
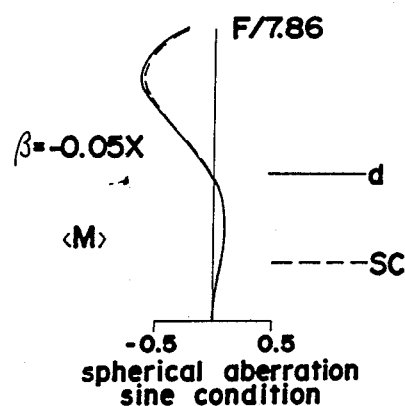
FIGS. 100a, 100b and 100c represent the aberration curves of the fourteenth embodiment for the middle focal length in the closest object focusing condition when the second lens unit fanctions as the focusing lens unit.
Figure 100B:
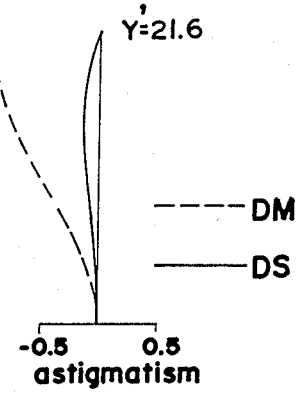
Figure 100C:
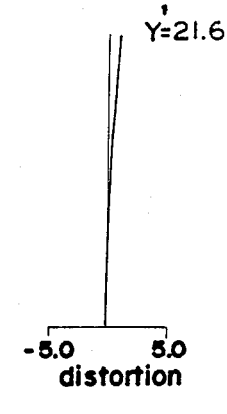
Figure 101A:
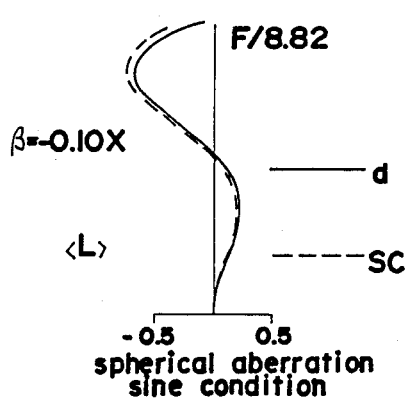
FIGS. 101a, 101b and 101c represent the aberration curves of the fourteenth embodiment for the longest focal length in the closest object focusing condition when the second lens unit fanctions as the focusing lens unit.
Figure 101B:
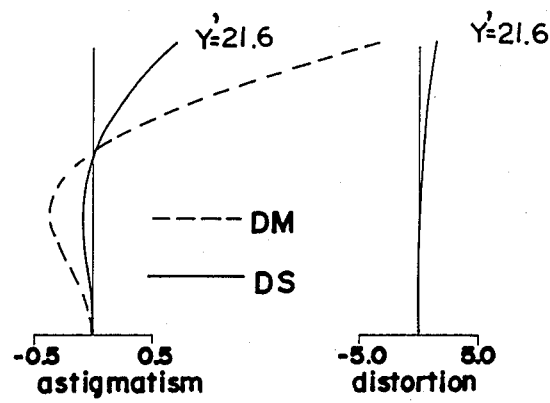
Figure 101C:
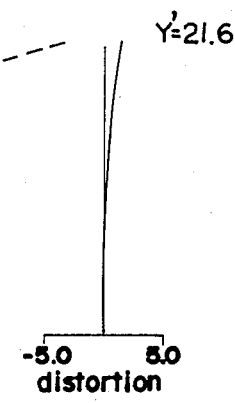
Figure 102A:
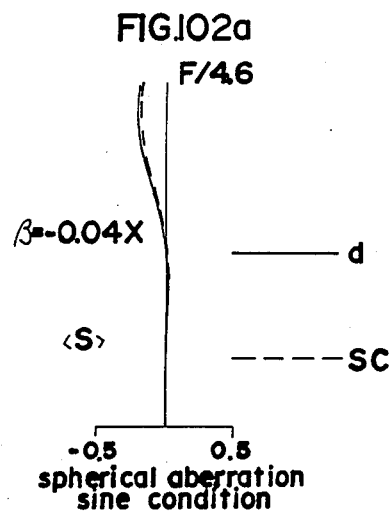
FIGS. 102a, 102b and 102c represent the aberration curves of the seventh embodiment for the shortest focal length in the closest object focusing condition when the second lens unit with a diaphragm located at the image side thereof fanctions as the focusing lens unit.
Figure 102B:
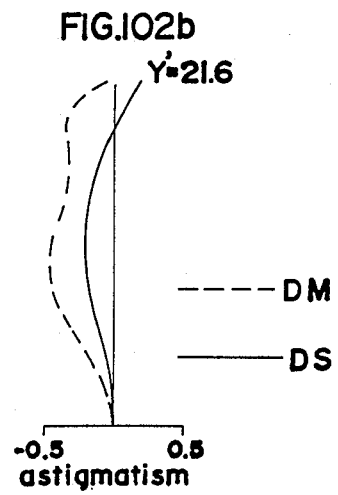
Figure 102C:
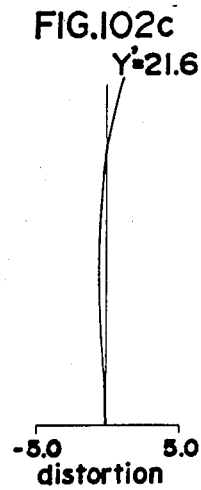
Figure 103A:
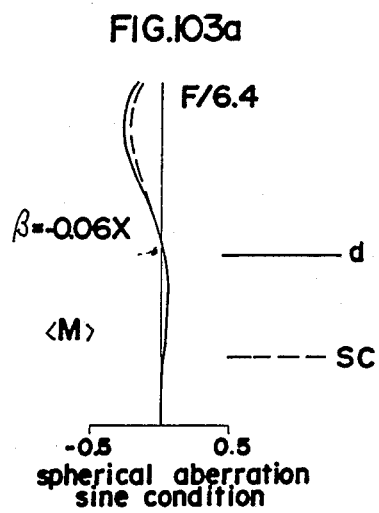
FIGS. 103a, 103b and 103c represent the aberration curves of the seventh embodiment for the middle focal length in the closest object focusing condition when the second lens unit with a diaphragm located at the image side thereof fanctions as the focusing lens unit.
Figure 103B:
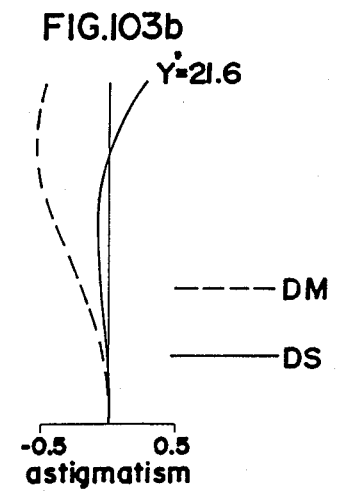
Figure 103C:
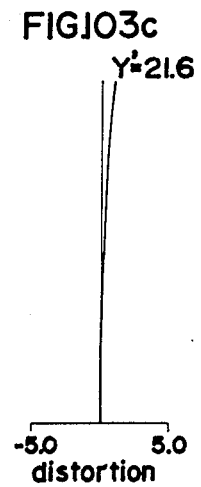
Figure 104A:
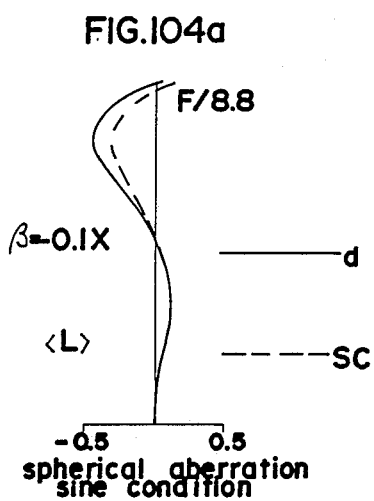
FIGS. 104a, 104b and 104c represent the aberration curves of the seventh embodiment for the longest focal length in the closest object focusing condition when the second lens unit with a diaphragm located at the image side thereof fanctions as the focusing lens unit.
Figure 104B:
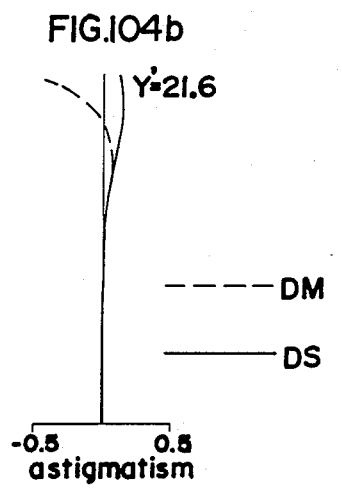
Figure 104C:
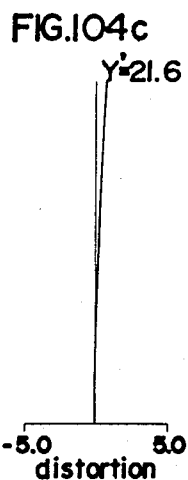

In all of the embodiments of the present invention, both of the second and third lens units II and III are able to function as the focusing lens unit. As examples of the lens system in which the third lens unit III fanctions the focusing operation, the aberration curves of the second, fifth, seventh and eleventh to fourteenth embodiments in the closest object focusing condition are shown in FIGS. 57 to 77. While as examples of the lens system in which the second lens unit II fanctions as the focusing operation, the aberration curves of the second, third, fifth, sixth and eleventh to fourteenth embodiments in the closest object focusing condition are shown in FIGS. 78 to 101. Further, as examples of the lens system in which the second lens unit II which fanctions the focusing operation have a diaphragm located the image side or the object side thereof, the aberration curves of the seventh and eighth embodiments in the closest object focusing condition are shown in FIGS. 102 to 107.

According to the preset invention, the zoom lens system is a three components type, however, as described in the sixth embodiment, the zoom lens system includes at the image side end a fixed lens component which has a relatively weak refractive power. Such a modification is also within the scope of the present invention.

Although the present invention has fully been described in connection with the preferred embodiment thereof with reference to the accompanying drawings, it is to be noted that various changes and modifications are apparent to those skilled in the art. Such changes and modifications are to be understood as being included within the scope for the present invention as defined by the appended claims.

TABLE 1

Embodiment 1
$f = 36.2\text{-}60.0\text{-}100.0 \quad F_{NO} = 4.6\text{-}6.5\text{-}8.2$

| | Radius of curvature | | Axial distance | Refractive index (Nd) | Abbe number ($\nu d$) |
|---|---|---|---|---|---|
| L1 | $r_1$ | 47.881 | $d_1$ 1.500 $N_1$ | 1.84666 $\nu_1$ | 23.83 |
| L2 | $r_2$ | 27.384 | $d_2$ 2.700 $N_2$ | 1.51680 $\nu_2$ | 64.20 |
| | $r_3$ | 110.966 | $d_3$ 0.150 | | |
| L3 | $r_4$ | 18.135 | $d_4$ 2.800 $N_3$ | 1.51680 $\nu_3$ | 64.20 |
| | $r_5$ | 48.373 | $d_5$ 2.000-8.063-16.062 | | |
| L4 | $r_6$ | −54.486 | $d_6$ 1.100 $N_4$ | 1.77250 $\nu_4$ | 49.77 |
| | $r_7$ | 10.994 | $d_7$ 0.423 | | |
| L5 | $r_8$ | 11.230 | $d_8$ 1.800 $N_5$ | 1.84666 $\nu_5$ | 23.83 |
| | $r_9$ | 31.443 | $d_9$ 3.000 | | |
| L6 | $r_{10}^*$ | 55.293 | $d_{10}$ 1.600 $N_6$ | 1.49140 $\nu_6$ | 57.82 |
| | $r_{11}$ | −28.507 | $d_{11}$ 1.446 | | |
| L7 | $r_{12}$ | −30.403 | $d_{12}$ 1.000 $N_7$ | 1.80518 $\nu_7$ | 25.43 |
| | $r_{13}$ | 26.093 | $d_{13}$ 0.296 | | |
| L8 | $r_{14}$ | 24.091 | $d_{14}$ 3.700 $N_8$ | 1.67100 $\nu_8$ | 51.73 |
| | $r_{15}$ | −11.620 | $d_{15}$ 13.396-7.614-2.511 | | |
| L9 | $r_{16}^*$ | −20.457 | $d_{16}$ 2.500 $N_9$ | 1.49140 $\nu_9$ | 57.82 |
| | $r_{17}$ | −17.750 | $d_{17}$ 1.950 | | |
| L10 | $r_{18}$ | −12.665 | $d_{18}$ 1.500 $N_{10}$ | 1.75450 $\nu_{10}$ | 51.57 |
| | $r_{19}$ | 75.931 | $d_{19}$ 2.500 $N_{11}$ | 1.84666 $\nu_{11}$ | 23.83 |
| L11 | $r_{20}$ | −170.741 | | | |

$\Sigma d = 45.360\text{-}45.642\text{-}48.538$

TABLE 2

Embodiment 2
$f = 36.2\text{-}60.0\text{-}100.0 \quad F_{NO} = 4.2\text{-}5.8\text{-}8.2$

| | Radius of curvature | | Axial distance | Refractive index (Nd) | Abbe number ($\nu_d$) |
|---|---|---|---|---|---|
| L1 | $r_1$ | 49.495 | $d_1$ 1.500 $N_1$ | 1.84666 $\nu_1$ | 23.83 |
| L2 | $r_2$ | 27.604 | $d_2$ 2.700 $N_2$ | 1.51680 $\nu_2$ | 64.20 |
| | $r_3$ | 92.133 | $d_3$ 0.150 | | |
| L3 | $r_4$ | 17.508 | $d_4$ 2.800 $N_3$ | 1.51680 $\nu_3$ | 64.20 |
| | $r_5$ | 52.614 | $d_5$ 2.000-8.293-13.162 | | |
| L4 | $r_6$ | −52.642 | $d_6$ 1.100 $N_4$ | 1.77250 $\nu_4$ | 49.77 |
| | $r_7$ | 10.928 | $d_7$ 0.496 | | |
| L5 | $r_8$ | 11.309 | $d_8$ 1.800 $N_5$ | 1.84666 $\nu_5$ | 23.83 |
| | $r_9$ | 30.212 | $d_9$ 3.000 | | |
| L6 | $r_{10}^*$ | 63.163 | $d_{10}$ 1.600 $N_6$ | 1.49140 $\nu_6$ | 57.82 |
| | $r_{11}$ | −28.565 | $d_{11}$ 0.911 | | |
| L7 | $r_{12}$ | −30.402 | $d_{12}$ 1.000 $N_7$ | 1.80518 $\nu_7$ | 25.43 |
| | $r_{13}$ | 26.150 | $d_{13}$ 0.678 | | |
| L8 | $r_{14}$ | 24.828 | $d_{14}$ 3.700 $N_8$ | 1.67100 $\nu_8$ | 51.73 |
| | $r_{15}$ | −11.737 | $d_{15}$ 14.849-8.556-3.687 | | |
| L9 | $r_{16}^*$ | −26.839 | $d_{16}$ 2.500 $N_9$ | 1.49140 $\nu_9$ | 57.82 |
| | $r_{17}$ | −19.399 | $d_{17}$ 1.940 | | |
| L10 | $r_{18}$ | −12.773 | $d_{18}$ 1.500 $N_{10}$ | 1.75450 $\nu_{10}$ | 51.57 |
| L11 | $r_{19}$ | 68.985 | $d_{19}$ 2.500 $N_{11}$ | 1.84666 $\nu_{11}$ | 23.83 |
| | $r_{20}$ | −253.503 | | | |

$\Sigma d = 45.724\text{-}46.724\text{-}46.724$

TABLE 3

Embodiment 3
$f = 36.2\text{-}60.0\text{-}100.0 \quad F_{NO} = 4.4\text{-}6.0\text{-}8.2$

| | Radius of curvature | | Axial distance | Refractive index (Nd) | Abbe number ($\nu_d$) |
|---|---|---|---|---|---|
| L1 | $r_1$ | 50.413 | $d_1$ 1.500 $N_1$ | 1.84666 $\nu_1$ | 23.83 |
| L2 | $r_2$ | 28.547 | $d_2$ 2.700 $N_2$ | 1.51680 $\nu_2$ | 64.20 |
| | $r_3$ | 117.067 | $d_3$ 0.150 | | |
| L3 | $r_4$ | 17.509 | $d_4$ 2.800 $N_3$ | 1.51680 $\nu_3$ | 64.20 |
| | $r_5$ | 53.444 | $d_5$ 2.000-8.846-14.470 | | |
| L4 | $r_6$ | −51.746 | $d_6$ 1.100 $N_4$ | 1.77250 $\nu_4$ | 49.77 |
| | $r_7$ | 10.906 | $d_7$ 0.529 | | |
| L5 | $r_8$ | 11.333 | $d_8$ 1.800 $N_5$ | 1.84666 $\nu_5$ | 23.83 |
| | $r_9$ | 29.859 | $d_9$ 3.000 | | |
| L6 | $r_{10}^*$ | 65.716 | $d_{10}$ 1.600 $N_6$ | 1.49140 $\nu_6$ | 57.82 |
| | $r_{11}$ | −28.678 | $d_{11}$ 0.740 | | |

TABLE 3-continued

Embodiment 3 f = 36.2-60.0-100.0    $F_{NO}$ = 4.4-6.0-8.2

| | Radius of curvature | | Axial distance | Refractive index (Nd) | | Abbe number ($v_d$) |
|---|---|---|---|---|---|---|
| L7 | $r_{12}$ −30.247 | $d_{12}$ | 1.000 | $N_7$ 1.80518 | $v_7$ | 25.43 |
| | $r_{13}$ 26.325 | $d_{13}$ | 0.800 | | | |
| L8 | $r_{14}$ 25.151 | $d_{14}$ | 3.700 | $N_8$ 1.67830 | $v_8$ | 48.97 |
| | $r_{15}$ −12.053 | $d_{15}$ | 14.846-8.000-2.376 | | | |
| L9 | $r_{16}$* −29.707 | $d_{16}$ | 2.500 | $N_9$ 1.49140 | $v_9$ | 57.82 |
| | $r_{17}$ −19.405 | $d_{17}$ | 1.936 | | | |
| L10 | $r_{18}$ −12.928 | $d_{18}$ | 1.500 | $N_{10}$ 1.78100 | $v_{10}$ | 44.55 |
| | $r_{19}$ 67.044 | $d_{19}$ | 2.500 | $N_{11}$ 1.8466 | $v_{11}$ | 23.83 |
| L11 | $r_{20}$ −179.717 | | | | | |

Σ d = 46.701-46.701-46.701

TABLE 4

Embodiment 4 f = 37.0-63.0-100.0    $F_{NO}$ = 4.9-7.2-8.2

| | Radius of curvature | | Axial distance | Refractive index (Nd) | | Abbe number ($v_d$) |
|---|---|---|---|---|---|---|
| L1 | $r_1$ 50.940 | $d_1$ | 1.500 | $N_1$ 1.84666 | $v_1$ | 23.83 |
| L2 | $r_2$ 30.290 | $d_2$ | 2.800 | $N_2$ 1.51680 | $v_2$ | 64.20 |
| | $r_3$ 107.036 | $d_3$ | 0.150 | | | |
| L3 | $r_4$ 18.588 | $d_4$ | 3.200 | $N_3$ 1.51680 | $v_3$ | 64.20 |
| | $r_5$ 49.760 | $d_5$ | 2.000-7.243-17.256 | | | |
| L4 | $r_6$ −36.036 | $d_6$ | 1.000 | $N_4$ 1.77250 | $v_4$ | 49.77 |
| | $r_7$ 11.996 | $d_7$ | 0.103 | | | |
| L5 | $r_8$ 11.391 | $d_8$ | 1.400 | $N_5$ 1.80518 | $v_5$ | 25.43 |
| | $r_9$ 79.932 | $d_9$ | 3.500 | | | |
| L6 | $r_{10}$* 56.570 | $d_{10}$ | 1.500 | $N_6$ 1.49140 | $v_6$ | 57.82 |
| | $r_{11}$ −28.758 | $d_{11}$ | 0.204 | | | |
| L7 | $r_{12}$ −17.752 | $d_{12}$ | 1.000 | $N_7$ 1.84666 | $v_7$ | 23.83 |
| | $r_{13}$ 30.917 | $d_{13}$ | 0.106 | | | |
| L8 | $r_{14}$ 23.479 | $d_{14}$ | 3.300 | $N_8$ 1.71060 | $v_8$ | 43.25 |
| | $r_{15}$ −10.530 | $d_{15}$ | 12.097-6.938-2.528 | | | |
| L9 | $r_{16}$* −18.618 | $d_{16}$ | 2.300 | $N_9$ 1.58340 | $v_9$ | 30.23 |
| | $r_{17}$ −19.528 | $d_{17}$ | 2.000 | | | |
| L10 | $r_{18}$ −13.064 | $d_{18}$ | 1.100 | $N_{10}$ 1.75450 | $v_{10}$ | 51.57 |
| | $r_{19}$ 52.432 | $d_{19}$ | 2.700 | $N_{11}$ 1.80518 | $v_{11}$ | 25.43 |
| L11 | $r_{20}$ −167.185 | | | | | |

Σ d = 41.959-42.044-47.646

TABLE 5

Embodiment 5 f = 36.2-61.6-97.8    $F_{NO}$ = 5.0-7.5-8.2

| | Radius of curvature | | Axial distance | Refractive index (Nd) | | Abbe number ($v_d$) |
|---|---|---|---|---|---|---|
| L1 | $r_1$ 49.731 | $d_1$ | 1.468 | $N_1$ 1.84666 | $v_1$ | 23.83 |
| L2 | $r_2$ 29.634 | $d_2$ | 2.739 | $N_2$ 1.51680 | $v_2$ | 64.20 |
| | $r_3$ 106.602 | $d_3$ | 0.147 | | | |
| L3 | $r_4$ 18.234 | $d_4$ | 3.131 | $N_3$ 1.51680 | $v_3$ | 64.20 |
| | $r_5$ 48.477 | $d_5$ | 1.957-6.197-17.256 | | | |
| L4 | $r_6$ −32.251 | $d_6$ | 0.978 | $N_4$ 1.77250 | $v_4$ | 49.77 |
| | $r_7$ 11.332 | $d_7$ | 0.106 | | | |
| L5 | $r_8$ 10.786 | $d_8$ | 1.500 | $N_5$ 1.80518 | $v_5$ | 25.43 |
| | $r_9$ 72.603 | $d_9$ | 3.424 | | | |
| L6 | $r_{10}$* 58.890 | $d_{10}$ | 1.468 | $N_6$ 1.49140 | $v_6$ | 57.83 |
| | $r_{11}$ −28.157 | $d_{11}$ | 0.202 | | | |
| L7 | $r_{12}$ −17.479 | $d_{12}$ | 0.978 | $N_7$ 1.84666 | $v_7$ | 23.83 |
| | $r_{13}$ 31.057 | $d_{13}$ | 0.109 | | | |
| L8 | $r_{14}$ 22.854 | $d_{14}$ | 3.000 | $N_8$ 1.72000 | $v_8$ | 43.90 |
| | $r_{15}$ −10.222 | $d_{15}$ | 11.689-6.812-2.473 | | | |
| L9 | $r_{16}$ −21.413 | $d_{16}$ | 1.957 | $N_9$ 1.58340 | $v_9$ | 30.23 |
| | $r_{17}$ −26.383 | $d_{17}$ | 1.957 | | | |
| L10 | $r_{18}$ −14.298 | $d_{18}$ | 1.174 | $N_{10}$ 1.77250 | $v_{10}$ | 49.77 |
| | $r_{19}$ 35.842 | $d_{19}$ | 3.400 | $N_{11}$ 1.80518 | $v_{11}$ | 25.43 |
| L11 | $r_{20}$ −196.693 | | | | | |

Σ d = 41.385-40.748-47.468

TABLE 6

Embodiment 6 f = 36.2-60.0-100.0    $F_{NO}$ = 4.5-6.4-8.2

| | Radius of curvature | | Axial distance | Refractive index (Nd) | | Abbe number ($v_d$) |
|---|---|---|---|---|---|---|
| L1 | $r_1$ 47.643 | $d_1$ | 1.500 | $N_1$ 1.84666 | $v_1$ | 23.83 |
| L2 | $r_2$ 27.405 | $d_2$ | 2.700 | $N_2$ 1.51680 | $v_2$ | 64.20 |
| | $r_3$ 107.344 | $d_3$ | 0.150 | | | |
| L3 | $r_4$ 18.089 | $d_4$ | 2.800 | $N_3$ 1.51680 | $v_3$ | 64.20 |
| | $r_5$ 48.311 | $d_5$ | 2.000-7.973-15.882 | | | |
| L4 | $r_6$ −54.430 | $d_6$ | 1.100 | $N_4$ 1.77250 | $v_4$ | 49.77 |
| | $r_7$ 10.997 | $d_7$ | 0.423 | | | |
| L5 | $r_8$ 11.229 | $d_8$ | 1.800 | $N_5$ 1.84666 | $v_5$ | 23.83 |
| | $r_9$ 31.493 | $d_9$ | 3.000 | | | |
| L6 | $r_{10}$* 56.220 | $d_{10}$ | 1.600 | $N_6$ 1.49140 | $v_6$ | 57.82 |
| | $r_{11}$ −28.453 | $d_{11}$ | 1.410 | | | |

TABLE 6-continued

Embodiment 6 f = 36.2-60.0-100.0    $F_{NO}$ = 4.5-6.4-8.2

| | Radius of curvature | | Axial distance | Refractive index (Nd) | | Abbe number ($\nu_d$) | |
|---|---|---|---|---|---|---|---|
| L7 | $r_{12}$ −30.244 | $d_{12}$ | 1.000 | $N_7$ | 1.80518 | $\nu_7$ | 25.43 |
| | $r_{13}$ 26.312 | $d_{13}$ | 0.243 | | | | |
| L8 | $r_{14}$ 23.561 | $d_{14}$ | 3.700 | $N_8$ | 1.67100 | $\nu_8$ | 51.73 |
| | $r_{15}$ −11.582 | $d_{15}$ | 13.047-7.441-2.511 | | | | |
| L9 | $r_{16}^*$ −20.040 | $d_{16}$ | 2.500 | $N_9$ | 1.49140 | $\nu_9$ | 57.82 |
| | $r_{17}$ −17.273 | $d_{17}$ | 1.950 | | | | |
| L10 | $r_{18}$ −12.516 | $d_{18}$ | 1.500 | $N_{10}$ | 1.75450 | $\nu_{10}$ | 51.57 |
| | $r_{19}$ 76.205 | $d_{19}$ | 2.500 | $N_{11}$ | 1.84666 | $\nu_{11}$ | 23.83 |
| L11 | $r_{20}$ −195.079 | $d_{20}$ | 1.500-16.105-34.536 | | | | |
| L12 | $r_{21}$ −309.388 | $d_{21}$ | 2.000 | $N_{12}$ | 1.51680 | $\nu_{12}$ | 64.20 |
| | $r_{22}$ −772.588 | | | | | | |

Σ = 48.423-63.395-84.805

TABLE 7

Embodiment 7 f = 36.2-60.0-97.8    $F_{NO}$ 4.5-6.1-8.2

| | Radius of curvature | | Axial distance | Refractive index (Nd) | | Abbe number ($\mu d$) | |
|---|---|---|---|---|---|---|---|
| L1 | $r_1$ 50.455 | $d_1$ | 1.500 | $N_1$ | 1.84666 | $\nu_1$ | 23.83 |
| L2 | $r_2$ 27.773 | $d_2$ | 2.700 | $N_2$ | 1.51680 | $\nu_2$ | 64.20 |
| | $r_3$ 82.0356 | $d_3$ | 0.150 | | | | |
| L3 | $r_4$ 17.229 | $d_4$ | 3.000 | $N_3$ | 1.51680 | $\nu_3$ | 64.20 |
| | $r_5$ 55.195 | $d_5$ | 2.000-8.885-4.083 | | | | |
| L4 | $r_6$ −50.145 | $d_6$ | 1.100 | $N_4$ | 1.77250 | $\nu_4$ | 49.77 |
| | $r_7$ 10.885 | $d_7$ | 0.594 | | | | |
| L5 | $r_8$ 11.355 | $d_8$ | 1.800 | $N_5$ | 1.84666 | $\nu_5$ | 23.83 |
| | $r_9$ 29.444 | $d_9$ | 1.000 | | | | |
| L6 | $r_{10}^*$ 88.700 | $d_{10}$ | 1.600 | $N_6$ | 1.49140 | $\nu_6$ | 57.82 |
| | $r_{11}$ −29.261 | $d_{11}$ | 0.666 | | | | |
| L7 | $r_{12}$ −30.017 | $d_{12}$ | 1.000 | $N_7$ | 1.80518 | $\nu_7$ | 25.43 |
| | $r_{13}$ 24.395 | $d_{13}$ | 1.391 | | | | |
| L8 | $r_{14}$ 28.165 | $d_{14}$ | 2.700 | $N_8$ | 1.67100 | $\nu_8$ | 51.73 |
| | $r_{15}$ −10.626 | $d_{15}$ | 14.849-7.964-2.766 | | | | |
| L9 | $r_{16}^*$ −45.790 | $d_{16}$ | 2.500 | $N_9$ | 1.49140 | $\nu_9$ | 57.82 |
| | $r_{17}$ −24.336 | $d_{17}$ | 1.932 | | | | |
| L10 | $r_{18}$ −13.830 | $d_{18}$ | 1.500 | $N_{10}$ | 1.75450 | $\nu_{10}$ | 51.57 |
| | $r_{19}$ 63.287 | | | | | | |
| L11 | | $d_{19}$ | 2.500 | $N_{11}$ | 1.84666 | $\nu_{11}$ | 23.83 |

TABLE 7-continued

Embodiment 7 f = 36.2-60.0-97.8    $F_{NO}$ 4.5-6.1-8.2

| | Radius of curvature | | Axial distance | Refractive index (Nd) | | Abbe number ($\mu d$) | |
|---|---|---|---|---|---|---|---|
| | $r_{20}$ −5498.128 | | | | | | |

Σ d = 44.482-44.481-44.482

TABLE 8

Embodiment 8 f = 36.2-61.6-97.8    $F_{NO}$ = 4.3-6.0-8.2

| | Radius of curvature | | Axial distance | Refractive index (Nd) | | Abbe number ($\nu_d$) | |
|---|---|---|---|---|---|---|---|
| L1 | $r_1$ 53.788 | $d_1$ | 1.468 | $N_1$ | 1.84666 | $\nu_1$ | 23.83 |
| L2 | $r_2$ 32.095 | $d_2$ | 2.739 | $N_2$ | 1.51680 | $\nu_2$ | 64.20 |
| | $r_3$ 84.928 | $d_3$ | 0.147 | | | | |
| L3 | $r_4$ 17.407 | $d_4$ | 3.131 | $N_3$ | 1.51680 | $\nu_3$ | 64.20 |
| | $r_5$ 54.772 | $d_5$ | 3.913-10.411-14.787 | | | | |
| L4 | $r_6$ −30.314 | $d_6$ | 0.981 | $N_4$ | 1.75450 | $\nu_4$ | 51.57 |
| | $r_7$ 11.162 | $d_7$ | 1.029 | | | | |
| L5 | $r_8$ 11.971 | $d_8$ | 1.500 | $N_5$ | 1.84666 | $\nu_5$ | 23.83 |
| | $r_9$ 28.636 | $d_9$ | 1.352 | | | | |
| L6 | $r_{10}^*$ 148.011 | $d_{10}$ | 1.468 | $N_6$ | 1.49140 | $\nu_6$ | 57.82 |
| | $r_{11}$ −23.895 | $d_{11}$ | 0.561 | | | | |
| L7 | $r_{12}$ −32.446 | $d_{12}$ | 0.978 | $N_7$ | 1.84666 | $\nu_7$ | 23.83 |
| | $r_{13}$ 53.706 | $d_{13}$ | 1.163 | | | | |
| | $r_{14}$ 43.785 | | | | | | |
| L8 | | $d_{14}$ | 2.500 | $N_8$ | 1.67000 | $\nu_8$ | 57.07 |
| | $r_{15}$ −10.737 | $d_{15}$ | 13.284-6.786-2.410 | | | | |
| L9 | $r_{16}^*$ −49.526 | $d_{16}$ | 2.200 | $N_9$ | 1.58340 | $\nu_9$ | 30.23 |
| | $r_{17}$ −39.566 | $d_{17}$ | 3.000 | | | | |
| L10 | $r_{18}$ −14.792 | $d_{18}$ | 1.174 | $N_{10}$ | 1.78100 | $\nu_{10}$ | 44.55 |
| | $r_{19}$ 76.905 | | | | | | |
| L11 | | $d_{19}$ | 3.400 | $N_{11}$ | 1.80518 | $\nu_{11}$ | 25.43 |
| | $r_{20}$ −241.538 | | | | | | |

Σ d = 45.988-45.988-45.988

TABLE 9

Embodiment 9 f = 36.2-61.6-97.8    $F_{NO}$ = 5.1-8.2-8.2

| | Radius of curvative | | Axial distance | Refractive index (Nd) | | Abbe number ($\nu$ d) | |
|---|---|---|---|---|---|---|---|
| L1 | $r_1$ 102.525 | $d_1$ | 1.468 | $N_1$ | 1.84666 | $\nu_1$ | 23.83 |
| L2 | $r_2$ 37.707 | $d_2$ | 2.739 | $N_2$ | 1.51823 | $\nu_2$ | 58.96 |
| | $r_3$ −532.388 | $d_3$ | 0.147 | | | | |
| L3 | $r_4$ 19.235 | $d_4$ | 3.131 | $N_3$ | 1.51823 | $\nu_3$ | 58.96 |
| | $r_5$ 59.524 | $d_5$ | 1.957-5.071-19.324 | | | | |
| | $r_6$ −27.735 | | | | | | |

TABLE 9-continued

Embodiment 9 f = 36.2-61.6-97.8    $F_{NO}$ = 5.1-8.2-8.2

| | Radius of curvature | | Axial distance | Refractive index (Nd) | | Abbe number ($\nu_d$) |
|---|---|---|---|---|---|---|
| L4 | | $d_6$ | 0.978 | $N_4$ 1.75450 | $\nu_4$ | 51.57 |
| | $r_7$ 10.726 | $d_7$ | 0.174 | | | |
| L5 | $r_8$ 11.414 | $d_8$ | 1.500 | $N_5$ 1.84666 | $\nu_5$ | 23.83 |
| | $r_9$ 46.568 | $d_9$ | 3.424 | | | |
| L6 | $r_{10}$* 35.498 | $d_{10}$ | 1.468 | $N_6$ 1.49140 | $\nu_6$ | 57.82 |
| | $r_{11}$ −27.311 | $d_{11}$ | 0.170 | | | |
| L7 | $r_{12}$ −17.618 | $d_{12}$ | 0.978 | $N_7$ 1.84666 | $\nu_7$ | 23.83 |
| | $r_{13}$ 48.023 | $d_{13}$ | 0.032 | | | |
| L8 | $r_{14}$ 30.722 | $d_{14}$ | 3.000 | $N_8$ 1.72000 | $\nu_8$ | 43.90 |
| | $r_{15}$ −11.079 | $d_{15}$ | 16.143-8.964-2.473 | | | |
| L9 | $r_{16}$ −37.450 | $d_{16}$ | 1.957 | $N_9$ 1.58340 | $\nu_9$ | 30.23 |
| | $r_{17}$ −78.296 | $d_{17}$ | 1.957 | | | |
| L10 | $r_{18}$ −21.511 | $d_{18}$ | 1.174 | $N_{10}$ 1.77250 | $\nu_{10}$ | 49.77 |
| | $r_{19}$ 28.553 | $d_{19}$ | 3.400 | $N_{11}$ 1.80741 | $\nu_{11}$ | 31.59 |
| L11 | $r_{20}$ −292.907 | | | | | |

$\Sigma d$ = 45.797-41.732-49.494

TABLE 10

Embodiment 10 f = 37.0-63.0-100.0    $F_{NO}$ = 5.1-7.6-8.2

| | Radius of curvature | | Axial distance | Refractive index (Nd) | | Abbe number ($\nu_d$) |
|---|---|---|---|---|---|---|
| L1 | $r_1$ 49.170 | $d_1$ | 1.500 | $N_1$ 1.84666 | $\nu_1$ | 23.83 |
| L2 | $r_2$ 30.506 | $d_2$ | 2.800 | $N_2$ 1.51680 | $\nu_2$ | 64.20 |
| | $r_3$ 108.846 | $d_3$ | 0.150 | | | |
| L3 | $r_4$ 18.317 | $d_4$ | 3.200 | $N_3$ 1.51680 | $\nu_3$ | 64.20 |
| | $r_5$ 43.207 | $d_5$ | 2.000-6.951-18.645 | | | |
| L4 | $r_6$ −21.905 | $d_6$ | 1.000 | $N_4$ 1.77250 | $\nu_4$ | 49.77 |
| | $r_7$ 10.811 | $d_7$ | 0.100 | | | |
| L5 | $r_8$ 12.722 | $d_8$ | 1.400 | $N_5$ 1.80518 | $\nu_5$ | 25.43 |
| | $r_9$ 412.402 | $d_9$ | 3.500 | | | |
| L6 | $r_{10}$ 47.403 | $d_{10}$ | 1.500 | $N_6$ 1.51728 | $\nu_6$ | 69.43 |
| | $r_{11}$ −20.724 | $d_{11}$ | 0.197 | | | |
| L7 | $r_{12}$ −44.823 | $d_{12}$ | 1.000 | $N_7$ 1.83350 | $\nu_7$ | 21.00 |
| | $r_{13}$ 79.857 | $d_{13}$ | 0.150 | | | |
| L8 | $r_{14}$ 39.586 | $d_{14}$ | 3.300 | $N_8$ 1.69680 | $\nu_8$ | 56.47 |
| | $r_{15}$ −18.541 | $d_{15}$ | 14.909-8.239-2.528 | | | |
| L9 | $r_{16}$ −20.383 | $d_{16}$ | 2.300 | $N_9$ 1.58340 | $\nu_9$ | 30.23 |
| | $r_{17}$ −17.537 | | | | | |

TABLE 10-continued

Embodiment 10 f = 37.0-63.0-100.0    $F_{NO}$ = 5.1-7.6-8.2

| | Radius of curvature | | Axial distance | Refractive index (Nd) | | Abbe number ($\nu_d$) |
|---|---|---|---|---|---|---|
| | | $d_{17}$ | 2.000 | | | |
| L10 | $r_{18}$ −12.354 | $d_{18}$ | 1.100 | $N_{10}$ 1.75450 | $\nu_{10}$ | 51.57 |
| | $r_{19}$ 50.160 | $d_{19}$ | 2.700 | $N_{11}$ 1.80741 | $\nu_{11}$ | 31.59 |
| L11 | $r_{20}$ −80.067 | | | | | |

$\Sigma d$ = 44.806-43.087-49.070

TABLE 11

Embodiment 11 f = 36.2-60.0-102.0    $F_{NO}$ = 4.1-6.9

| | Radius of curvature | | Axial distance | Refractive index (Nd) | | Abbe number ($\nu_d$) |
|---|---|---|---|---|---|---|
| L1 | $r_1$ 59.175 | $d_1$ | 1.200 | $N_1$ 1.84666 | $\nu_1$ | 23.82 |
| | $r_2$ 35.211 | $d_2$ | 0.700 | | | |
| L2 | $r_3$ 31.001 | $d_3$ | 4.400 | $N_2$ 1.51680 | $\nu_2$ | 64.20 |
| | $r_4$ −254.477 | $d_4$ | 0.150 | | | |
| L3 | $r_5$ 33.034 | $d_5$ | 2.000 | $N_3$ 1.51680 | $\nu_3$ | 64.20 |
| | $r_6$ 69.592 | $d_6$ | 2.900-9.218-20.503 | | | |
| L4 | $r_7$ −24.515 | $d_7$ | 2.000 | $N_4$ 1.75570 | $\nu_4$ | 27.21 |
| L5 | $r_8$ −16.555 | $d_8$ | 1.100 | $N_5$ 1.77250 | $\nu_5$ | 49.77 |
| | $r_9$ 13.880 | $d_9$ | 1.566 | | | |
| L6 | $r_{10}$ 56.612 | $d_{10}$ | 1.700 | $N_6$ 1.75000 | $\nu_6$ | 25.14 |
| | $r_{11}$ −30.290 | $d_{11}$ | 5.322 | | | |
| L7 | $r_{12}$ 21.600 | $d_{12}$ | 2.600 | $N_7$ 1.51680 | $\nu_7$ | 64.20 |
| | $r_{13}$ −31.062 | $d_{13}$ | 0.938 | | | |
| L8 | $r_{14}$ 75.649 | $d_{14}$ | 1.600 | $N_8$ 1.84666 | $\nu_8$ | 23.82 |
| | $r_{15}$ 16.878 | $d_{15}$ | 0.300 | | | |
| L9 | $r_{16}$ 22.445 | $d_{16}$ | 3.000 | $N_9$ 1.51728 | $\nu_9$ | 69.43 |
| | $r_{17}$ −16.404 | $d_{17}$ | 12.425-6.624-1.208 | | | |
| L10 | $r_{18}$ −62.637 | $d_{18}$ | 2.900 | $N_{10}$ 1.58340 | $\nu_{10}$ | 30.23 |
| | $r_{19}$ −25.772 | $d_{19}$ | 3.608 | | | |
| L11 | $r_{20}$ −10.929 | $d_{20}$ | 1.300 | $N_{11}$ 1.77250 | $\nu_{11}$ | 49.77 |
| | $r_{21}$ 76.447 | $d_{21}$ | 3.600 | $N_{12}$ 1.67339 | $\nu_{12}$ | 29.25 |
| L12 | $r_{22}$ −71.748 | | | | | |

$\Sigma d$ = 55.308-55.819-61.694

TABLE 12

Embodiment 12 f = 36.2-70.0-130.5    $F_{NO}$ = 4.57-7.45

| | Radius of curvature | | Axial distance | Refractive index (Nd) | | Abbe number ($\nu_d$) |
|---|---|---|---|---|---|---|
| L1 | $r_1$ 83.293 | $d_1$ | 1.500 | $N_1$ 1.84666 | $\nu_1$ | 23.83 |
| | $r_2$ 43.567 | $d_2$ | 0.699 | | | |

TABLE 12-continued

Embodiment 12
$f = 36.2$-$70.0$-$130.5$    $F_{NO} = 4.57$-$7.45$

| | | Radius of curvature | | Axial distance | Refractive index (Nd) | | Abbe number ($\nu_d$) |
|---|---|---|---|---|---|---|---|
| L2 | $r_3$ | 51.667 | $d_3$ | 3.800 | $N_2$ 1.51680 | $\nu_2$ | 64.20 |
| | $r_4$ | −101.160 | $d_4$ | 0.0150 | | | |
| L3 | $r_5$ | 23.493 | $d_5$ | 3.500 | $N_3$ 1.51680 | $\nu_3$ | 64.20 |
| | $r_6$ | 47.853 | $d_6$ | 2.500-2.828-25.425 | | | |
| L4 | $r_7$ | −419.822 | $d_7$ | 1.350 | $N_4$ 1.67339 | $\nu_4$ | 29.25 |
| | $r_8$ | −13.514 | $d_8$ | 1.082 | $N_5$ 1.75450 | $\nu_5$ | 51.57 |
| L5 | $r_9$ | 9.070 | $d_9$ | 1.936 | | | |
| L6 | $r_{10}$ | 13.712 | $d_{10}$ | 1.430 | $N_6$ 1.75000 | $\nu_6$ | 25.14 |
| | $r_{11}$ | 42.955 | $d_{11}$ | 4.316 | | | |
| L7 | $r_{12}$ | 368.362 | $d_{12}$ | 1.961 | $N_7$ 1.49140 | $\nu_7$ | 57.82 |
| | $r_{13}$ | −20.832 | $d_{13}$ | 0.595 | | | |
| L8 | $r_{14}$ | −44.498 | $d_{14}$ | 1.000 | $N_8$ 1.84666 | $\nu_8$ | 23.83 |
| | $r_{15}$ | 22.380 | $d_{15}$ | 1.007 | | | |
| L9 | $r_{16}$ | 28.282 | $d_{16}$ | 1.800 | $N_9$ 1.51680 | $\nu_9$ | 64.20 |
| | $r_{17}$ | −28.614 | $d_{17}$ | 0.100 | | | |
| L10 | $r_{18}$ | −311.955 | $d_{18}$ | 2.200 | $N_{10}$ 1.51680 | $\nu_{10}$ | 64.20 |
| | $r_{19}$ | −10.936 | $d_{19}$ | 17.338-9.335-1.911 | | | |
| L11 | $r_{20}$ | −46.401 | $d_{20}$ | 2.700 | $N_{11}$ 1.49140 | $\nu_{11}$ | 57.82 |
| | $r_{21}$ | −21.276 | $d_{21}$ | 3.541 | | | |
| L12 | $r_{22}$ | −11.681 | $d_{22}$ | 1.300 | $N_{12}$ 1.77250 | $\nu_{12}$ | 49.77 |
| | $r_{23}$ | 35.714 | | | | | |
| L13 | | | $d_{23}$ | 4.000 | $N_{13}$ 1.75000 | $\nu_{13}$ | 25.14 |
| | $r_{24}$ | −89.859 | | | | | |

$\Sigma d = 59.806$-$62.131$-$67.304$

TABLE 13

Embodiment 13
$f = 29.4$-$53.0$-$100.0$    $F_{NO} = 4.12$-$8.0$

| | | Radius of curvature | | Axial distance | Refractive index (Nd) | | Abbe number ($\nu_d$) |
|---|---|---|---|---|---|---|---|
| L1 | $r_1$ | 65.641 | $d_1$ | 1.200 | $N_1$ 1.84666 | $\nu_1$ | 23.83 |
| | $r_2$ | 35.698 | $d_2$ | 2.700 | $N_2$ 1.51680 | $\nu_2$ | 64.20 |
| L2 | $r_3$ | −316.395 | $d_3$ | 0.120 | | | |
| | $r_4$ | 19.249 | $d_4$ | 2.300 | $N_3$ 1.51823 | $\nu_3$ | 58.96 |
| | $r_5$ | 33.351 | | | | | |
| L3 | | | $d_5$ | 1.700-10.283-22.758 | | | |
| | $r_6$ | −45.214 | $d_6$ | 1.000 | $N_4$ 1.77250 | $\nu_4$ | 49.77 |
| | $r_7$ | 11.186 | $d_7$ | 0.325 | | | |
| L4 | $r_8$ | 11.162 | $d_8$ | 1.800 | $N_5$ 1.83350 | $\nu_5$ | 21.00 |
| L5 | $r_9$ | 25.964 | $d_9$ | 2.500 | | | |

TABLE 13-continued

Embodiment 13
$f = 29.4$-$53.0$-$100.0$    $F_{NO} = 4.12$-$8.0$

| | | Radius of curvature | | Axial distance | Refractive index (Nd) | | Abbe number ($\nu_d$) |
|---|---|---|---|---|---|---|---|
| L6 | $r_{10}$ | 734.263 | $d_{10}$ | 1.300 | $N_6$ 1.49140 | $\nu_6$ | 57.82 |
| | $r_{11}$ | −21.011 | $d_{11}$ | 1.150 | | | |
| | $r_{12}$ | −28.986 | | | | | |
| L7 | | | $d_{12}$ | 1.000 | $N_7$ 1.80518 | $\nu_7$ | 25.43 |
| | $r_{13}$ | 42.703 | $d_{13}$ | 0.015 | | | |
| | $r_{14}$ | 27.248 | | | | | |
| L8 | | | $d_{14}$ | 4.000 | $N_8$ 1.60000 | $\nu_8$ | 64.38 |
| | $r_{15}$ | −8.897 | $d_{15}$ | 12.992-7.292-2.100 | | | |
| | $r_{16}$ | −17.663 | | | | | |
| L9 | | | $d_{16}$ | 2.000 | $N_9$ 1.49140 | $\nu_9$ | 57.82 |
| | $r_{17}$ | −11.565 | $d_{17}$ | 1.711 | | | |
| | $r_{18}$ | −9.642 | | | | | |
| L10 | | | $d_{18}$ | 1.200 | $N_{10}$ 1.75450 | $\nu_{10}$ | 51.57 |
| | $r_{19}$ | 55.217 | | | | | |
| L11 | | | $d_{19}$ | 2.300 | $N_{11}$ 1.84666 | $\nu_{11}$ | 23.83 |
| | $r_{20}$ | −145.145 | | | | | |

$\Sigma d = 41.313$-$44.195$-$51.480$

TABLE 14

Embodiment 14
$f = 36.2$-$77.0$-$169.8$    $F_{NO} = 4.63$-$8.2$

| | | Radius of curvature | | Axial distance | Refractive index (Nd) | | Abbe number ($\nu_d$) |
|---|---|---|---|---|---|---|---|
| | $r_1$ | 62.696 | | | | | |
| L1 | | | $d_1$ | 1.500 | $N_1$ 1.84666 | $\nu_1$ | 23.83 |
| | $r_2$ | 38.698 | $d_2$ | 3.100 | $N_2$ 1.51680 | $\nu_2$ | 64.20 |
| L2 | $r_3$ | −430.048 | $d_3$ | 0.150 | | | |
| | $r_4$ | 25.615 | $d_4$ | 2.800 | $N_3$ 1.51680 | $\nu_3$ | 64.20 |
| L3 | $r_5$ | 45.867 | | | | | |
| | | | $d_5$ | 2.000-13.158-34.547 | | | |
| | $r_6$ | −47.839 | | | | | |
| L4 | | | $d_6$ | 1.100 | $N_4$ 1.77250 | $\nu_4$ | 49.77 |
| | $r_7$ | 10.635 | $d_7$ | 0.769 | | | |
| | $r_8$ | 10.846 | | | | | |
| L5 | | | $d_8$ | 2.000 | $N_5$ 1.70055 | $\nu_5$ | 27.58 |
| | $r_9$ | −83.303 | | | | | |
| L6 | | | $d_9$ | 1.000 | $N_6$ 1.77250 | $\nu_6$ | 49.77 |
| | $r_{10}$ | 30.980 | $d_{10}$ | 2.998 | | | |
| | $r_{11}$ | 69.968 | | | | | |
| L7 | | | $d_{11}$ | 1.600 | $N_7$ 1.49140 | $\nu_7$ | 57.82 |
| | $r_{12}$ | −22.206 | $d_{12}$ | 0.267 | | | |
| | $r_{13}$ | −81.132 | | | | | |
| L8 | | | $d_{13}$ | 1.000 | $N_8$ 1.84666 | $\nu_8$ | 23.83 |
| | $r_{14}$ | 25.136 | $d_{14}$ | 1.528 | | | |
| | $r_{15}$ | 30.699 | | | | | |
| L9 | | | $d_{15}$ | 4.000 | $N_9$ 1.51680 | $\nu_9$ | 64.20 |
| | $r_{16}$ | −9.152 | $d_{16}$ | 18.027-11.016-2.511 | | | |
| | $r_{17}$ | −19.378 | | | | | |
| L10 | | | $d_{17}$ | 2.200 | $N_{10}$ 1.49140 | $\nu_{10}$ | 57.82 |
| | $r_{18}$ | −16.169 | $d_{18}$ | 3.001 | | | |
| | $r_{19}$ | −10.946 | | | | | |
| L11 | | | $d_{19}$ | 1.500 | $N_{11}$ 1.77250 | $\nu_{11}$ | 49.77 |
| | $r_{20}$ | 67.858 | | | | | |
| L12 | | | $d_{20}$ | 3.500 | $N_{12}$ 1.75000 | $\nu_{12}$ | 25.14 |

TABLE 14-continued

Embodiment 14
f = 36.2-77.0-169.8    $F_{NO}$ = 4.63-8.2

| Radius of curvature | Axial distance | Refractive index (Nd) | Abbe number ($\nu_d$) |
|---|---|---|---|
| $r_{21}$  −72.316 | | | |
| $\Sigma$ d = 54.04-58.187-71.071 | | | |

Aspherical Coefficient

Embodiment 1
$r_{10}$: $A_4 = -0.25261 \times 10^{-3}$    $A_6 = 0.13264 \times 10^{-5}$
$A_8 = -0.14389 \times 10^{-6}$    $A_{10} = -0.77820 \times 10^{-10}$
$A_{12} = -0.30283 \times 10^{-11}$
$r_{16}$: $A_4 = -0.73124 \times 10^{-4}$    $A_6 = 0.46162 \times 10^{-6}$
$A_8 = -0.13250 \times 10^{-7}$    $A_{10} = 0.17648 \times 10^{-9}$
$A_{12} = -0.82995 \times 10^{-12}$

Embodiment 2
$r_{10}$: $A_4 = -0.28476 \times 10^{-3}$    $A_6 = 0.21778 \times 10^{-5}$
$A_8 = -0.14027 \times 10^{-6}$    $A_{10} = -0.66607 \times 10^{-10}$
$A_{12} = 0.30716 \times 10^{-11}$
$r_{16}$: $A_4 = 0.73338 \times 10^{-4}$    $A_6 = 0.31545 \times 10^{-6}$
$A_8 = -0.12740 \times 10^{-7}$    $A_{10} = 0.17035 \times 10^{-9}$
$A_{12} = -0.75925 \times 10^{-12}$

Embodiment 3
$r_{10}$: $A_4 = -0.26480 \times 10^{-3}$    $A_6 = 0.15451 \times 10^{-5}$
$A_8 = -0.14177 \times 10^{-6}$    $A_{10} = -0.69351 \times 10^{-10}$
$A_{12} = 0.30671 \times 10^{-11}$
$r_{16}$: $A_4 = 0.66667 \times 10^{-4}$    $A_6 = 0.37242 \times 10^{-6}$
$A_8 = -0.13112 \times 10^{-7}$    $A_{10} = 0.16514 \times 10^{-9}$
$A_{12} = -0.71339 \times 10^{-12}$

Embodiment 4
$r_{10}$: $A_4 = -0.32792 \times 10^{-3}$    $A_6 = -0.21904 \times 10^{-5}$
$A_8 = -0.10602 \times 10^{-6}$    $A_{10} = 0.51049 \times 10^{-10}$
$A_{12} = 0.32546 \times 10^{-11}$
$r_{16}$: $A_4 = 0.73134 \times 10^{-4}$    $A_6 = -0.17739 \times 10^{-6}$
$A_8 = 0.48737 \times 10^{-6}$    $A_{10} = -0.44751 \times 10^{-10}$
$A_{12} = 0.17248 \times 10^{-13}$

Embodiment 5
$r_{10}$: $A_4 = -0.37480 \times 10^{-3}$    $A_6 = -0.27472 \times 10^{-5}$
$A_8 = -0.12555 \times 10^{-6}$    $A_{10} = 0.55780 \times 10^{-10}$
$A_{12} = 0.41099 \times 10^{-11}$
$r_{16}$: $A_4 = 0.69067 \times 10^{-4}$    $A_6 = -0.36197 \times 10^{-6}$
$A_8 = 0.36949 \times 10^{-8}$    $A_{10} = -0.29251 \times 10^{-10}$
$A_{12} = -0.89148 \times 10^{-13}$

Embodiment 6
$r_{10}$: $A_4 = -0.25901 \times 10^{-3}$    $A_6 = 0.13633 \times 10^{-5}$
$A_8 = -0.14519 \times 10^{-6}$    $A_{10} = -0.83209 \times 10^{-10}$
$A_{12} = 0.30009 \times 10^{-11}$
$r_{16}$: $A_4 = 0.75180 \times 10^{-4}$    $A_6 = 0.40478 \times 10^{-6}$
$A_8 = -0.12670 \times 10^{-7}$    $A_{10} = 0.18149 \times 10^{-9}$
$A_{12} = -0.92009 \times 10^{-12}$

Embodiment 7
$r_{10}$: $A_4 = -0.36797 \times 10^{-3}$    $A_6 = 0.65573 \times 10^{-7}$
$A_8 = -0.14327 \times 10^{-6}$    $A_{10} = -0.69498 \times 10^{-10}$
$A_{12} = 0.30588 \times 10^{-11}$
$r_{16}$: $A_4 = 0.55671 \times 10^{-4}$    $A_6 = 0.67461 \times 10^{-7}$
$A_8 = 0.1336 \times 10^{-7}$    $A_{10} = 0.20500 \times 10^{-9}$
$A_{12} = -0.10217 \times 10^{-11}$

Embodiment 8
$r_{10}$: $A_4 = -0.37035 \times 10^{-3}$    $A_6 = 0.68474 \times 10^{-6}$
$A_8 = -0.13033 \times 10^{-6}$    $A_{10} = 0.20092 \times 10^{-9}$
$A_{12} = 0.96592 \times 10^{-12}$
$r_{16}$: $A_4 = 0.45722 \times 10^{-4}$    $A_6 = 0.60189 \times 10^{-7}$
$A_8 = -0.30351 \times 10^{-8}$    $A_{10} = 0.68773 \times 10^{-10}$
$A_{12} = -0.42398 = 10^{-12}$

Embodiment 9
$r_{16}$: $A_4 = 0.48419 \times 10^{-4}$    $A_6 = -0.20970 \times 10^{-6}$
$A_8 = 0.35563 \times 10^{-8}$    $A_{10} = -0.22868 \times 10^{-10}$
$A_{12} = 0.20713 \times 10^{-12}$

Embodiment 10
$r_{10}$: $A_4 = -0.22872 \times 10^{-3}$    $A_6 = 0.87387 \times 10^{-7}$
$A_8 = -0.11491 \times 10^{-6}$    $A_{10} = 0.11307 \times 10^{-9}$
$A_{12} = 0.45618 \times 10^{-11}$

Embodiment 11
$r_{18}$: $A_4 = 0.75563 \times 10^{-4}$    $A_6 = -0.67184 \times 10^{-6}$
$A_8 = 0.30595 \times 10^{-7}$    $A_{10} = -0.39646 \times 10^{-9}$
$A_{12} = 0.22223 \times 10^{-11}$

Embodiment 12
$r_{12}$: $A_4 = -0.16191 \times 10^{-3}$    $A_6 = -0.53868 \times 10^{-6}$
$A_8 = -0.23356 \times 10^{-7}$    $A_{10} = 0.18726 \times 10^{-10}$
$A_{12} = 0.14335 \times 10^{-11}$
$r_{20}$: $A_4 = 0.62940 \times 10^{-4}$    $A_6 = 0.12447 \times 10^{-6}$
$A_8 = 0.39834 \times 10^{-9}$    $A_{10} = -0.99231 \times 10^{-11}$
$A_{12} = 0.23279 \times 10^{-12}$

Embodiment 13
$r_{10}$: $A_4 = -0.51015 \times 10^{-3}$    $A_6 = -0.40816 \times 10^{-7}$
$A_8 = -0.45509 \times 10^{-6}$    $A_{10} = 0.82539 \times 10^{-9}$
$A_{12} = 0.35750 \times 10^{-10}$
$r_{16}$: $A_4 = 0.10466 \times 10^{-3}$    $A_6 = 0.14044 \times 10^{-6}$
$A_8 = 0.21183 \times 10^{-9}$    $A_{10} = -0.43643 \times 10^{-9}$
$A_{12} = 0.32580 \times 10^{-11}$

Embodiment 14
$r_{11}$: $A_4 = -0.41683 \times 10^{-3}$    $A_6 = -0.50878 \times 10^{-6}$
$A_8 = -0.18541 \times 10^{-6}$    $A_{10} = -0.23290 \times 10^{-9}$
$A_{12} = 0.25902 \times 10^{-11}$
$r_{17}$: $A_4 = 0.10052 \times 10^{-3}$    $A_6 = 0.11213 \times 10^{-7}$
$A_8 = 0.66800 \times 10^{-8}$    $A_{10} = -0.91648 \times 10^{-10}$
$A_{12} = 0.68257 \times 10^{-12}$

What is claimed is:

1. A compact zoom lens system with a high zoom ratio comprising from object side to image side:

a first lens unit of a positive refractive power;

a second lens unit of a positive refractive power with a first variable air space formed between the first and second lens units; and a third lens unit of a negative refractive power with a second variable air space formed between the second and third lens units;

wherein the first lens unit and the third lens units are shiftable from the image side to the object side and the second lens unit is shiftable so that the first variable air space increases and the second variable air space decreases in the zooming operation from the shortest focal length (fS) to the longest focal length (fL);

and wherein the third lens unit includes at least an aspherical surface and fulfills the following condition:

$$\frac{|X| - |X_0|}{C_0(N' - N)} > 0$$

$$0.20 < (L_2/FM) \cdot (fS/fL) < 0.50$$

wherein, $C_0$ represents the curvature of the standard spherical surface of the aspherical surface, X represents the distance along the optical axis from an intersection of the standard spherical surface and the optical axis of the lens system to the aspherical surface at the height from the optical axis Y and is expressed as the following equation:

$$X = X_0 + \sum_i A_{2i}Y^{2i}, X_0$$

represents the distance along the optical axis from the intersection to the standard spherical surface at the height Y and is expressed as the following equation: $X_0 = C_0Y^2/\{1+(1-C_0^2Y^2)\}$, $A_{2i}$ represents the aspherical coefficients, N represents the refractive index of the media at the object side of the aspherical surface, N' represents the refractive index of the media at the image side of the aspherical surface, $L_2$ represents the length from the surface of the object side end of the second lens unit to a film on the shortest focal length condition and FM represents the diagonal length of a frame of the film.

2. A compact zoom lens system as claimed in claim 1, wherein the lens system fulfills the following conditions:

$$0.10 < f_2/fL < 0.60$$

wherein, $f_2$ represents the focal length of the second lens unit, and fL represents the focal length of the whole lens system in the longest focal length condition.

3. A compact zoom lens system as claimed in claim 2, wherein the lens system fulfills the following conditions:

$$1.60 < \beta L_3/\beta S_3 < 5.00$$

$$0.08 < |f_3/fL| < 0.45$$

wherein, $\beta L_3$ represents the lateral magnification of the third lens unit in the longest focal length condition, $\beta S_3$ represents the lateral magnification of the third lens unit in the shortest focal length condition, and $f_3$ represents the focal length of the third lens unit.

4. A compact zoom lens system as claimed in claim 3, wherein the lens system fulfills the following conditions:

$$0.25 < (D_{12}L - D_{12}S)/fS < 1.10$$

wherein, $D_{12}L$ represents the airspace between the first and the second lens units in the longest focal length condition, and $D_{12}S$ represents the airspace between the first and the second lens units in the shortest focal length condition, and fS represents the focal length of the whole lens system in the shortest focal length condition.

5. A compact zoom lens system as claimed in claim 4, wherein the lens system fulfills the following conditions:

$$0.15 < (L_2 - L_2')/FM < 0.60$$

wherein, $L_2'$ represents the length from the surface of the image side end of the second lens unit to a film in the shortest focal length condition.

6. A compact zoom lens system as claimed in claim 5, wherein the lens system fulfills the following conditions:

$$0.15 < (L_2 - L_2')/FM < 0.45$$

7. A compact zoom lens system as claimed in claim 1, wherein the lens element including an aspherical surface fulfills the following conditions:

$$Nd < 1.6, \nu d < 60$$

wherein, Nd represents the refractive index of a lens element which includes an aspherical surface, and $\nu d$ represents the Abbe number of the lens element which includes the aspherical surface.

8. A compact zoom lens system as claimed in claim 7, wherein the lens element including the aspherical surface is made of a plastic.

9. A compact zoom lens system as claimed in claim 1, wherein the first lens unit and the third lens unit shift in a linked body in the zooming operation.

10. A compact zoom lens system with a high zoom ration comprising from object side to image side:
- a first lens unit of a positive refractive power;
- a second lens unit of a positive refractive power with a first variable air space formed between the first and second lens units; and
- a third lens unit of a negative refractive power with a second variable air space formed between the second and third lens units;
- wherein the first lens unit and the third lens units are shiftable from the image side to the object side and the second lens unit is shiftable so that the first variable air space increases and the second variable air space decreases in the zooming operation from the shortest focal length (fS) to the longest focal length (fL);
- and wherein the second lens unit includes at least an aspherical surface and fulfills the following condition:

$$\frac{|X| - |X_0|}{C_0(N' - N)} < 0$$

$$0.20 < (L_2/FM) \cdot (fS/fL) < 0.50$$

wherein, $C_0$ represents the curvature of the standard spherical surface of the aspherical surface, X represents the distance along the optical axis from an intersection of the standard spherical surface and the optical axis of the lens system to the aspherical surface at the height from the optical axis Y and is expressed as the following equation:

$$X = X_0 + \sum_i A_{2i}Y^{2i}, X_0$$

represent the distance along the optical axis from the intersection to the standard spherical surface at the height Y and is expressed as the following equation: $X_0 = C_0Y^2/\{1+(1-C_0^2Y^2)\}$, $A_{2i}$ represents the aspherical coefficients, N represents the refractive index of the media at the object side of the aspherical surface, N' represents the refractive index of the media at the image side of the aspherical surface, $L_2$ represents the length from the surface of the object side end of the second lens unit to a film on the shortest focal length condition and FM represents the diagonal length of a frame of the film.

11. A compact zoom lens system as claimed in claim 10, wherein the lens system fulfills the following condition:

$$0.10 < f_2/fL < 0.60$$

wherein, $f_2$ represents the focal length of the second lens unit, and fL represents the focal length of the whole lens system in the longest focal length condition.

12. A compact zoom lens system as claimed in claim 11, wherein the lens system fulfills the following conditions:

$$1.60 - \beta L_3/\beta S_3 < 5.00$$

$$0.08 < |f_3/fL| < 0.45$$

wherein, $\beta L_3$ represents the lateral magnification of the third lens unit in the longest focal length condition, $\beta S_3$ represents the lateral magnification of the third lens unit in the shortest focal length condition, and $f_3$ represents the focal length of the third lens unit.

13. A compact zoom lens system as claimed in claim 12, wherein the lens system fulfills the following condition:

$$0.25 < (D_{12}L - D_{12}S)/fS < 1.10$$

wherein, $D_{12}L$ represents the airspace between the first and the second lens units in the longest focal length condition, and $D_{12}S$ represents the airspace between the first and the second lens units in the shortest focal length condition, and fS represents the focal length of the whole lens system in the shortest focal length condition.

14. A compact zoom lens system as claimed in claim 13, wherein the lens system fulfills the following conditions:

$$0.15 < (L_2 - L_2')/FM < 0.60$$

wherein, $L_2'$ represents the length from the surface of the image side end of the second lens unit to a film in the shortest focal length condition.

15. A compact zoom lens system as claimed in claim 14, wherein the lens system fulfills the following conditions:

$$0.15 < (L_2 - L_2')/FM < 0.45$$

16. A compact zoom lens system as claimed in claim 10, wherein the lens element including an aspherical surface fulfills the following conditions:

$$Nd < 1.6, \nu d < 60$$

wherein, Nd represent the refractive index of a lens element which includes an aspherical surface, and $\nu d$ represents the Abbe number of the lens element which includes the aspherical surface.

17. A compact zoom lens system as claimed in claim 16, wherein the lens element including the aspherical surface is made of plastic.

18. A compact zoom lens system as claimed in claim 10, wherein the first lens unit and the third lens unit shift in a linked body in the zooming operation.

19. A compact zoom lens system as claimed in claim 10, wherein the third lens unit includes an aspherical surface.

20. A compact zoom lens system with a high zoom ratio comprising from object side to image side:
a first lens unit of a positive refractive power;
a second lens unit of a positive refractive power with a first variable air space formed between the first and second lens units; and
a third lens unit of a negative refractive power with a second variable air space formed between the second and third lens units;
wherein the first lens unit and the third lens units are shiftable from the image side to the object side and the second lens unit is shiftable so that the first variable air space increases and the second variable air space decreases in the zooming operation from the shortest focal length (fS) to the longest focal length (fL), while the third lens unit is shiftable to the image side in the focusing operation to the closer object;
and wherein the lens system fulfills the following conditions:

$$0.2 < \frac{(\beta L_3^2 - 1) \times fS^2}{(\beta S_3^2 - 1) \times fL^2} < 1.2$$

$$0.2 < \frac{(\beta L_3^2 - 1) \times fM^2}{(\beta M_3^2 - 1) \times fL^2} < 0.95$$

wherein, fL and fS represent the focal length of the whole lens system in the longest and shortest focal length conditions, fM represent the focal length of the whole lens system in the middle focal length condition defined by a formula $$\sqrt{fL \times fS} ,$$

$\beta M_3$ represents the lateral magnification of the third lens unit in the middle focal length condition, $\beta L_3$ represents the lateral magnification of the third lens unit in the longest focal length condition, and $\beta S_3$ represents the lateral magnification of the third lens unit in the shortest focal length condition.

21. A compact zoom lens system as claimed in claim 20, wherein the lens system further fulfills the following conditions:

$$0.8 < \frac{(\beta L_3^2 - 1) \times fS^2}{(\beta S_3^2 - 1) \times fL^2} < 1.2$$

$$0.8 < \frac{(\beta L_3^2 - 1) \times fM^2}{(\beta M_3^2 - 1) \times fL^2} < 0.95$$

22. A compact zoom lens system as claimed in claim 20, wherein the lens system fulfills the following conditions:

$$0.2 < \Delta dS/\Delta dL < 1.5$$

$$0.2 < \Delta dM/\Delta dL < 1.5$$

wherein, $\Delta dL$, $\Delta dM$ and $\Delta dS$ respectively represent the shifting amount of the focusing lens unit for the longest, middle and shortest focal length from the condition to focus on the infinity to the condition to focus on a closer object located at such an object distance that the magnification ratio for the longest focal length is 1/10.

23. A compact zoom lens system as claimed in claim 22, wherein the lens system further fulfills the following conditions:

$0.2 < \Delta dS/\Delta dL < 1.3$ $0.2 < \Delta dM/\Delta dL < 0.95$

24. A compact zoom lens system as claimed in claim 20, wherein the lens system includes at least an aspherical surface in the second lens unit or the third lens unit.

25. A compact zoom lens system as claimed in claim 24, wherein the third lens unit includes an aspherical surface and fulfills the following condition:

$$\frac{|X| - |X_0|}{C_0(N' - N)} > 0$$

wherein, $C_0$ represents the curvature of the standard spherical surface of the aspherical surface, X represents the distance along the optical axis from an intersection of the standard spherical surface and the optical axis of the lens system to the aspherical surface at the height from the optical axis Y and is expressed as the following equation: $X = X_0 + \Sigma A_{2i}Y^{2i}$, $X_0$ represents the distance along the optical axis from the intersection to the standard spherical surface at the height Y and is expressed as the following equation: $X_0 = C_0Y^2/\{1+(1-C_0^2Y^2)\}$, $A_{2i}$ represent the aspherical coefficients, N represents the refractive index of the media at the object side of the aspherical surface, and N' represents the refractive index of the media at the image side of the aspherical surface.

26. A compact zoom lens system as claimed in claim 20, wherein the first lens unit and the third lens unit shift in a linked body in the zooming operation.

27. A compact zoom lens system with a high zoom ration comprising from object side to image side:
 a first lens unit of a positive refractive power;
 a second lens unit of a positive refractive power with a first variable air space formed between the first and second lens units; and
 a third lens unit of a negative refractive power with a second variable air space formed between the second and third lens units;
 wherein the first lens unit and the third lens unit are shiftable from the image side to the object side and the second lens unit is shiftable so that the first variable air space increases and the second variable air space decreases in the zooming operation from the shortest focal length to the longest focal length, while the second lens unit is shiftable to the object side in the focusing operation to the closer object; and wherein the lens system fulfills the following conditions:

$$0.5 < \frac{(\beta L_2^2 - 1) \times \beta S_2^2 \times fL}{(\beta S_2^2 - 1) \times \beta L_2^2 \times fS} < 1.5$$

$$0.4 < \frac{(\beta L_2^2 - 1) \times \beta M_2^2 \times fL}{(\beta M_2^2 - 1) \times \beta L_2^2 \times fM} < 1.2$$

wherein, fL and fS represent the focal length of the whole lens system in the longest and shortest focal length conditions, fM represent the focal length of the whole lens system in the middle focal length condition defined by a formula $$\sqrt{fL \times fS},$$

$\beta M_3$ represents the lateral magnification of the third lens unit in the middle focal length condition,
 $\beta L_3$ represents the lateral magnification of the third lens unit in the longest focal length condition, and
 $\beta S_3$ represents the lateral magnification of the third lens unit in the shortest focal length condition.

28. A compact zoom lens system as claimed in claim 27, wherein the lens system further fulfills the following conditions:

$0.6 < (\Delta dS/\Delta dL) \cdot (fL/fS) < 4.0$ $0.4 < (\Delta dM/\Delta dL) \cdot (fL/fM) < 3.5$ wherein, $\Delta dL$, $\Delta dM$ and $\Delta dS$ respectively represent the shifting amount of the focusing lens unit for the longest, middle and shortest focal length from the condition to focus on the infinity to the condition to focus on a closer object located at such an object distance that the magnification ratio from the longest focal length is 1/10.

29. A compact zoom lens system as claimed in claim 28, wherein the lens system further fulfills the following conditions:

$0.6 < (\Delta dS/\Delta dL) \cdot (fL/fS) < 1.5$ $0.4 < (\Delta dM/\Delta dL) \cdot (fL/fM) < 1.25$ 30. A compact zoom lens system as claimed in claim 27, wherein the lens system includes at least an aspherical surface in the second lens unit or the third lens unit.

31. A compact zoom lens system as claimed in claim 30, wherein the second lens unit includes an aspherical surface and fulfills the following condition:

$$\frac{|X| - |X_0|}{C_0(N' - N)} < 0$$

wherein, $C_0$ represents the curvature of the standard spherical surface of the aspherical surface, X represents the distance along the optical axis from an intersection of the standard spherical surface and the optical axis of the lens system to the aspherical surface at the height from the optical axis Y and is expressed as the following equation: $X = X_0 + \Sigma A_{2i}Y^{2i}$, $X_0$ represents the distance along the optical axis from the intersection to the standard spherical surface at the height Y and is expressed as the following equation : $X_0 = C_0Y^2/\{1+(1-C_0^2Y^2)\}$, $A_{2i}$ represent the aspherical coefficients, N represents the refractive index of the media at the object side of the aspherical surface, and N' represents the refractive index of the media at the image side of the aspherical surface.

32. A compact zoom lens system as claimed in claim 27, wherein the first lens unit and the third lens unit shift in a linked body in the zooming operation.

33. A compact zoom lens system as claimed in claim 27, wherein the second lens unit has a diaphragm located at the image side or the object side thereof.

34. A compact zoom lens system as claimed in claim 33, wherein the lens system fulfills the following condition:

$0.03 < (L_2 - L_2')/fL < 0.30$ wherein, $L_2$ represents the length from the surface of the object side end of the second lens unit to a film and $L_2'$ represents the length from the surface of the image side end of the second lens unit to a film in the shortest focal length condition.

35. A compact zoom lens system as claimed in claim 34, wherein the lens system further fulfills the following condition:

$$0.03 < (L_2 - L_2')/fL < 0.18$$

36. A compact zoom lens system with a high zoom ratio comprising from object side to image side:
   a first lens unit of a positive refractive power;
   a second lens unit of a positive refractive power having a diaphragm located at the image side or the object side thereof and having a first variable air space formed between the first and second lens units; and
   a third lens unit of a negative refractive power with a second variable air space formed between the second and third lens units;
   wherein the first lens unit and the third lens units are shiftable from the image side to the object side and the second lens unit is shiftable so that the first variable air space increases and the second variable air space decreases in the zooming operation from the shortest focal length to the longest focal length, while the second lens unit is shiftable to the object side in the focusing operation to the closer object;
   and wherein the lens system fulfills the following conditions:

$$0.6 < (\Delta dS/\Delta dL) \cdot (fL/fS) < 1.5$$

$$0.4 < (\Delta dM/\Delta dL) \cdot (fL/fM) < 1.25$$

wherein, $\Delta dL$, $\Delta dM$ and $\Delta dS$ respectively represent the shifting amount of the focusing lens unit for the longest, middle and shortest focal length from the condition to focus on the infinity to the condition to focus on a closer object located at such an object distance that the magnification ratio for the longest focal length is 1/10.

37. A compact zoom lens system with a high zoom ratio comprising from object side to image side;
   a first lens unit of a positive refractive power;
   a second lens unit, with an aspherical surface, of a positive refractive power having a diaphragm located at the image side or the object side thereof and having a first variable air space formed between the first and second lens units; and
   a third lens unit of a negative refractive power with a second variable air space formed between the second and third lens units;
   wherein the first lens unit and the third lens units are shiftable in a linked body from the image side to the object side and the second lens unit is shiftable so that the first variable air space increases and the second variable air space decreases in the zooming operation from the shortest focal length to the longest focal length, while the second lens unit is shiftable to the object side in the focusing operation to the closer object and a shifting amount thereof for the closer object in the longest focal length condition is larger than that in the shortest focal length condition.

38. A compact zoom lens system with a high zoom ratio comprising from object side to image side:
   a first lens unit of a positive refractive power;
   a second lens unit of a positive refractive power with a first variable air space formed between the first and second lens units; and
   a third lens unit of a negative refractive power with a second variable air space formed between the second and third lens units;
   wherein the first lens unit and the third lens units are shiftable from the image side to the object side and the second lens unit is shiftable so that the first variable air space increases and the second variable air space decreases in the zooming operation from the shortest focal length to the longest focal length;
   and wherein the second and third lens units include at least an aspherical surface and fulfill the following condition:

$$\frac{|X| - |X_0|}{C_0(N' - N)} < 0$$

wherein, $C_0$ represents the curvature of the standard spherical surface of the aspherical surface, X represents the distance along the optical axis from an intersection of the standard spherical surface and the optical axis of the lens system to the aspherical surface at the height from the optical axis Y and is expressed as the following equation:

$$X = X_0 + \sum_i A_{2i} Y^{2i}, X_0$$

represents the distance along the optical axis from the intersection to the standard spherical surface at the height Y and is expressed as the following equation: $X_0 = C_0 Y^2 / \{1 + (1 - C_0^2 Y^2)\}$, $A_{2i}$ represents the aspherical coefficients, N represents the refractive index of the media at the object side of the aspherical surface, and N' represents the refractive index of the media at the image side of the aspherical surface.

* * * * *